United States Patent [19]

Shinohara et al.

[11] Patent Number: 5,740,306
[45] Date of Patent: Apr. 14, 1998

[54] DIGITAL SIGNAL RECORDING DEVICE AND PLAYBACK DEVICE

[75] Inventors: Junko Shinohara; Sadayuki Inoue; Tatsuo Yamasaki; Ken Onishi, all of Tokyo, Japan

[73] Assignee: Mitsubishi Denki Kabushiki Kaisha, Tokyo, Japan

[21] Appl. No.: 588,903

[22] Filed: Jan. 19, 1996

[30] Foreign Application Priority Data

| Jan. 25, 1995 | [JP] | Japan | 7-009870 |
| Feb. 3, 1995 | [JP] | Japan | 7-017056 |
| Sep. 4, 1995 | [JP] | Japan | 7-226703 |

[51] Int. Cl.$^6$ ............................................. H04N 5/91
[52] U.S. Cl. ................................................ 386/67; 386/46
[58] Field of Search .............................. 386/67, 68, 75, 386/129, 46, 70, 87, 109, 111, 7, 6, 33, 80, 35, 40; 360/32; H04N 5/91

[56] References Cited

U.S. PATENT DOCUMENTS

| 4,963,991 | 10/1990 | Honjo | 386/1 |
| 5,282,049 | 1/1994 | Hatakenaka et al. | 386/46 |
| 5,355,229 | 10/1994 | Arano et al. | |
| 5,377,051 | 12/1994 | Lane et al. | 360/33.1 |
| 5,418,658 | 5/1995 | Kwon | 360/48 |
| 5,499,106 | 3/1996 | Arano et al. | |

FOREIGN PATENT DOCUMENTS

| 0367264 | 5/1990 | European Pat. Off. |
| 0600690 | 6/1994 | European Pat. Off. |

OTHER PUBLICATIONS

International Workshop on HDTV '93, Proceedings vol. II, Ottawa, Canada (1993).

*Primary Examiner*—Robert Chevalier

[57] ABSTRACT

In a digital signal recording and playback device, the transmission rate of input transport packets is identified. A recording mode, a rate at which data is to be recorded, is set on the basis of the identified transmission rate. Intra-frame or intra-field coded digital video data is extracted from the transport packets, and the extracted intra-frame or intra-field coded digital video data is reconstructed to generate special playback data. A recording format is generated such that the input transport packets and special playback data will be recorded at predefined positions on a track of a recording medium. The number of repetitions of the special playback data to be recorded on the recording medium or the recording format is varied depending on the recording mode. Because of the improvement in the recording rate of the fast playback data, the playback picture quality during fast playback can be improved.

20 Claims, 50 Drawing Sheets

FIG. 7

| SYSTEM MODE | 25Mbps | 12.5Mbps | 8.33Mbps | 6.25Mbps |
|---|---|---|---|---|
| TAPE *<br>TRAVEL SPEED | 1 | 1/2 | 1/3 | 1/4 |

\* : WITH TPAE TRAVEL SPEED AT 25 Mbps BEING ASSUMED TO BE " 1 "

W : ONE TRACK DATA RECORDING TIME

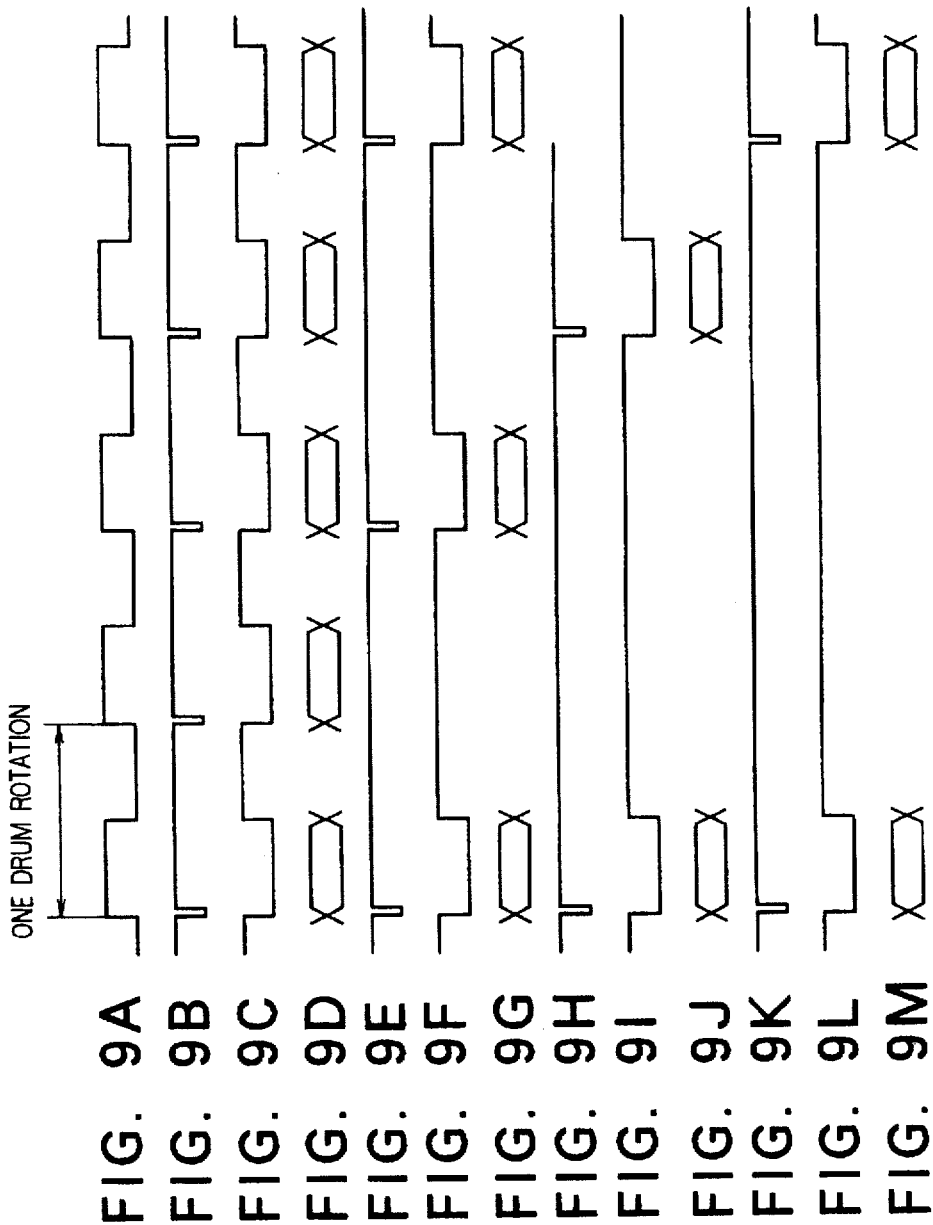

FIG. 13A
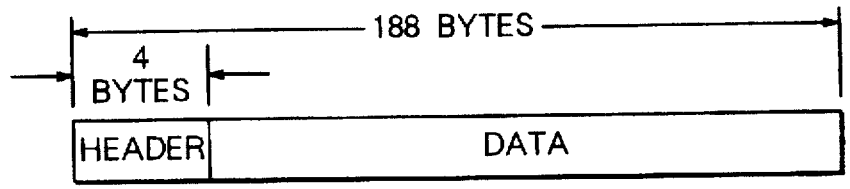
FIG. 13B
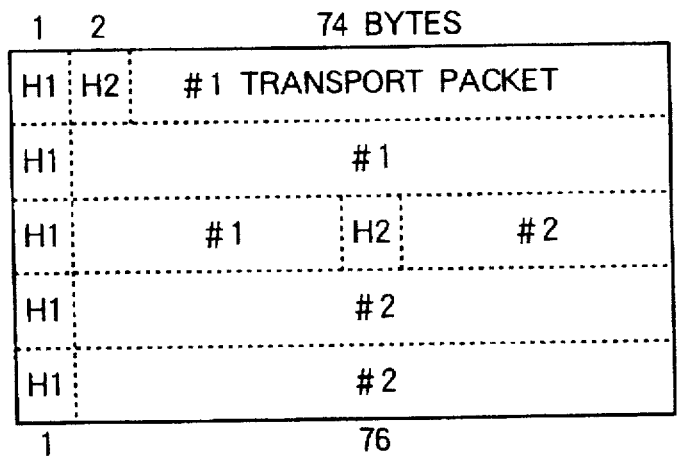
FIG. 14
| RECORDING MODE \ AREA | 4× SPEED AREA | 18× SPEED AREA |
|---|---|---|
| 25Mbps | 4<br>62 | 18<br>10.9 |
| 12.5Mbps | 4<br>124 | 17<br>23.3 |
| 8.33Mbps | 6<br>111.6 | 16.5<br>36 |
| 6.25Mbps | 8<br>106.3 | 18<br>43.8 |
UPPER LINE : FAST PLAYBACK SPEED
LOWER LINE : NUMBER OF SYNC BLOCKS OBTAINED

FIG. 20

| | 25Mbps RECORDING MODE | | 12.5Mbps RECORDING MODE | | 8.33Mbps RECORDING MODE | | 6.25Mbps RECORDING MODE | |
|---|---|---|---|---|---|---|---|---|
| | B0 AREA | A0 TO A4 AREAS | B0 AREA | A0 TO A4 AREAS | B0 AREA | A0 TO A4 AREAS | B0 AREA | A0 TO A4 AREAS |
| SPECIAL PLAYBACK SPEED | 4 | 18 (8.5) | 4 | 17 | 6 | 16.5 | 8 | 18 |
| NUMBER OF REPETITIONS OF SPECIAL PLAYBACK DATA | 4T×2 | 4T×9 | 4T×1 | 4T×8.5 | 4T×1 | 4T×5.5 | 4T×1 | 4T×4.5 |
| PLAYBACK CONTROL | SPEED& PHASE (SPEED) | SPEED& PHASE (SPEED) | SPEED& PHASE | SPEED | SPEED& PHASE | SPEED | SPEED& PHASE | SPEED |
| PLAYBACK DATA RATE DURING FAST PLAYBACK (Mbps) | 2.31 | 2.31 (1.09) | 2.31 | 1.16 | 2.31 | 1.16 | 2.31 | 1.16 |

4T : TRACK FORMAT

FIG. 31

| RECORDING MODE \ AREA | 4× SPEED AREA | 18× SPEED AREA |
|---|---|---|
| 25Mbps (STANDARD) | 4<br>62 | 18<br>10.94 |
| 12.5Mbps (1/2) | 8<br>53.14 | 36<br>10.63 |
| 8.33Mbps (1/3) | 12<br>50.73 | 54<br>10.53 |
| 6.25Mbps (1/4) | 16<br>49.6 | 72<br>10.48 |

UPPER LINE : FAST PLAYBACK SPEED
LOWER LINE : NUMBER OF SYNC BLOCKS OBTAINED

A20~A24 : 36× SPEED PLAYBACK DATA RECORDING AREA (5SB)

B20 : 8× SPEED PLAYBACK DATA RECORDING AREA (25SB)

A40~A44: 72× SPEED PLAYBACK DATA RECORDING AREA (5SB)

B40: 16× SPEED PLAYBACK DATA RECORDING AREA (25SB)

| RECORDING MODE | FORMATS FOR RESPECTIVE RECORDING MODES EMPLOYED? EMPLOYED | NOT EMPLOYED |
|---|---|---|
| (STANDARD) | 18<br>1.805 | 8.5<br>0.852 |
| (1/2) | 36<br>1.805 | 17<br>0.852 |
| (1/3) | 54<br>1.805 | 25.5<br>0.852 |
| (1/4) | 72<br>1.805 | 34<br>0.852 |

UPPER LINE : FAST PLAYBACK SPEED
LOWER LINE : PLAYBACK RATE (Mbps)

FIG. 55
PRIOR ART
<4× SPEED>
<9× SPEED>
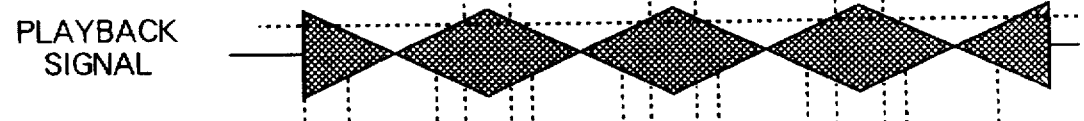
<17× SPEED>
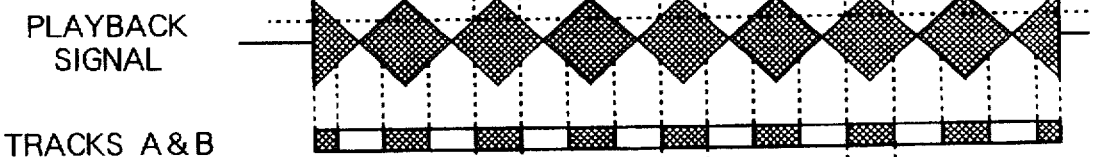

FIG. 57
PRIOR ART
CASE 1
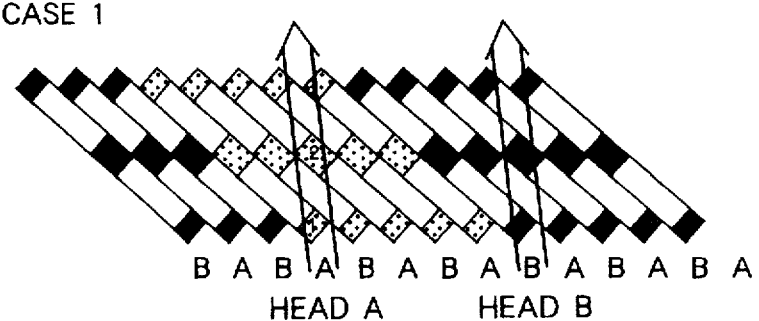
CASE 2
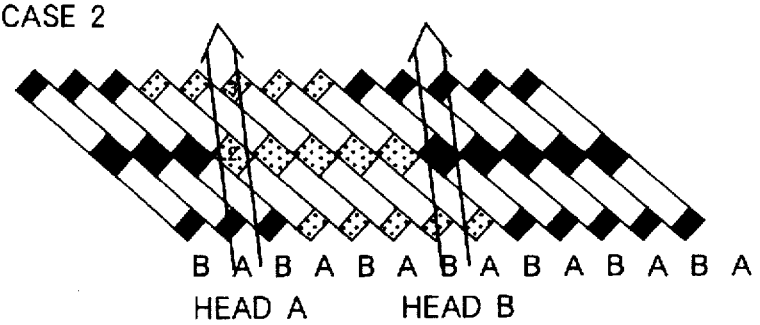
FIG. 58
PRIOR ART
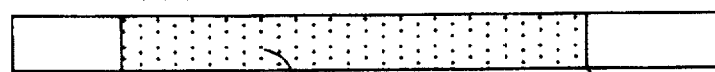
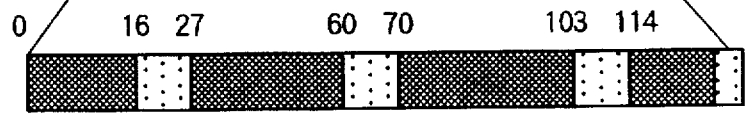

DIGITAL SIGNAL RECORDING DEVICE AND PLAYBACK DEVICE

BACKGROUND OF THE INVENTION

The present invention relates to a digital signal recording device, such as a digital video tape recorder (hereinafter referred to as digital VTR) having a track by which a digital video signal and digital audio signal are recorded in predefined areas on slanted tracks, a digital, digital disk player or the like, in which the digital video signal and the digital audio signal are input in the form of bit stream, and the bit stream is recorded, and a digital signal playback device for reproducing a recording media having been recorded using the digital signal recording device.

FIG. 50 shows a pattern of tracks in a typical consumer digital VTR. In FIG. 50, slanted tracks are formed on magnetic tape. One track is divided into a video area in which a digital video signal is recorded and an audio area in which a digital audio signal is recorded.

There are two methods for recording video and audio signals in this type of consumer digital VTR. One of the methods is what is called a baseband recording method, wherein an analog video signal and audio signal are received as inputs, subjected to high-efficiency encoding in order to lower a data rate, and then recorded. The other method is what is called a transparent recording method, wherein a bit stream transmitted digitally is recorded.

For recording an advanced television (hereinafter ATV) signal discussed in the U.S. and a digital video broadcasting (hereinafter DVB) signal studied in Europe, the latter transparent recording method is suitable. The reason is that the ATV or DVB signal is a signal that has already been compressed digitally. A high-efficiency encoder and decoder are therefore unnecessary. Besides, since the ATV or DVB signal is recorded as it is, picture quality deterioration does not occur. A drawback of the transparent recording method is that the quality of a picture reproduced in special playback mode such as fast playback, still, or slow mode is unsatisfactory. Especially in fast playback mode, almost no picture can be reproduced from slanted tracks on which a bit stream is recorded as it is.

A digital VTR for recording the ATV signal is in "A Recording Method of ATV data on a Consumer Digital VCR" presented during "International Workshop on HDTV 1993" held on Ottawa, Canada on Oct. 26 to 28t, 1993. The contents of the presentation will be described as a prior art.

According to the basic specifications for a prototype of a consumer digital VTR, in a standard definition (SD) mode, if a data rate for recording of a digital video signal is 25 Mbps and a field frequency is 60 Hz, one image frame is recorded in video areas on ten tracks. In this case, if the data rate of an ATV signal ranges from 17 to 18 Mbps, the ATV signal can be recorded in the SD mode by transparent recording.

FIGS. 51A and 51B show the scanning traces of a rotary head in normal and fast playback modes in a digital VTR. In the drawing, adjoining tracks are scanned obliquely alternately by rotary heads having different azimuths. In normal playback mode, the tape travel speed is identical to the one in recording mode. The rotary heads therefore trace along recording tracks as shown in FIG. 51A. In fast playback mode, however, the tape speed is different from the one in recording mode. The rotary heads therefore trace, traversing several tracks and reproduce data from portions of the tracks having identical azimuth. FIG. 51B shows tile case of 5× speed fast playback.

With a bit stream conforming to an MPEG2 recommendations (a bit stream of an ATV or DVB signal conforms to the MPEG2 recommendations), intra-frame coded blocks alone can be decoded independently, without the necessity of referring to other frames. Assuming that an MPEG2-conforming bit stream is recorded continually on tracks, in fast playback mode, intra-coded data are separated or extracted from data intermittently reproduced, and used to reconstruct pictures. At this time, the reproduced areas of screens are not contiguous to one another, but fractions of blocks spread over the screens. Moreover, since a bit stream is variable-length encoded, it is not guaranteed that all areas of each screen are updated cyclically. A certain area thereof may not be updated for a prolonged period of time. As a result, the picture quality for fast playback becomes unsatisfactory and is unacceptable for a consumer digital VTR.

FIG. 52 is a block diagram showing the configuration of a bit stream recording device permitting fast playback. Herein, a video area on each track is divided into main areas in which all bit streams serving ATV signals are recorded and duplication areas in which important parts (high priority (HP) data) of the bit streams used to construct pictures in fast playback mode are recorded. In fast playback mode, since intra-coded blocks alone are valid, the intra-coded blocks are recorded in the duplication areas. For reducing the amount of of data further, low-frequency components are extracted from all the intra-coded blocks and recorded as the HP data. In FIG. 52, reference numeral 1 denotes an input terminal through which a bit stream is input. Reference numeral 2 denotes an output terminal through which a bit stream is output. Reference numeral 3 denotes an output terminal through which HP data is output. Reference numeral 4 denotes a variable-length decoder. Reference numeral 5 denotes a counter. Reference numeral 6 denotes a data extractor. Reference numeral 7 denotes an end-of-block (HOB) appending circuit.

An MPEG2-conforming bit stream is input through the input terminal 1, output through the output terminal 2 as it is, and then recorded continually in main areas. A bit stream received through the input terminal 1 is also supplied to the variable-length decoder 4. The syntax of the MPEG2-conforming bit stream is then analyzed, and intra pictures are detected. The counter 5 produces timing pulses. The data extractor 6 extracts low-frequency components from all blocks of the intra pictures. The EOB appending circuit 7 appends EOBs. In this way, HP data is generated. The HP data is then recorded in duplication areas.

FIG. 53 is a schematic diagram showing a system formed of a conventional digital VTR during normal playback and fast playback. In the normal playback mode, all bit streams recorded in the main areas are reproduced, and sent to an MPEG2-conforming decoder located outside the digital VTR. The HP data is discarded. By contrast, in the fast playback mode, the HP data alone is read from the duplication areas, collected, and then sent to the decoder. The bit streams recorded in the main areas are discarded.

Next, the positions of a main area and duplication area on each track will be described. FIG. 54 shows an example of the scanning traces by a rotary head in fast playback mode. When the tape speed is an integral multiple of a speed in normal playback mode, if phase lock is effected, scanning head is phase-lock controlled, the head scanning is in synchronism with the identical azimuth tracks. The locations of data to be reproduced are therefore fixed. In FIG. 54, assuming that components of a playback signal whose output levels are equal to or higher than−6 dB are reproduced, data from areas of tracks crosshatched in FIG.

54 can be reproduced by one head. FIG. 54 shows an example of 9x speed playback. At a 9x speed, reading of the signal in the regions crosshatched in FIG. 54 is guaranteed. The HP data should therefore be recorded in the areas of tracks crosshatched in FIG. 54. However, at other multiplied speeds, it is not guaranteed that the reproduction of the signal is not guaranteed. The areas in which the HP data recorded must therefore be positioned so that HP data can be read at several tape speeds.

FIG. 55 shows examples of areas scanned by a head at three tape speeds at which the head is in synchronism with the identical azimuth tracks. There are overlapping regions which are scanned at several tape speeds. The duplication areas are selected from among the overlapping regions, to ensure that the HP data can be read out at the different tape speeds. FIG. 55 shows the case of 4x, 9x and 17x speeds. The scanned areas are identical to those scanned at −2x, −7x, and −15x tape speeds.

It is impossible for a head to travel the same areas of tracks at several tape speeds. This is because the number of tracks traversed by a head differs between different tape speeds. Besides, it is necessary that the scanning is started at any identical azimuth track. FIG. 56 shows examples of scanning traces of a rotary head at different tape speeds. In FIG. 56, areas 1, 2, and 3 are selected from among the overlapping regions for the 5x and 9x speeds. The same HP data is recorded repeatedly on nine tracks, so that the HP data can be read out at both 5x and 9x speeds.

FIG. 57 shows examples of scanning traces of by rotary heads at a 5x speed. As is seen from the drawing, the HP data is recorded repeatedly on the same number of tracks as the speed multiplier (ratio of the fast playback tape speed to the recording tape speed), so that the HP data is read out by the rotary heads that are in synchronism with the identical azimuth tracks. In other words, the HP data is repeated for the number of tracks identical with the speed multiplier of the maximum playback tape speed it is thus ensured that the duplicated HP data can be read out at several tape speeds in forward and reverse directions.

FIG. 58 shows a structure of a track in a conventional digital VTR. Herein, one track is composed of main areas and duplication areas. In a consumer digital VTR, a video area on each track is composed of 135 sync blocks. The main areas are composed of 97 sync blocks, and the duplication areas are composed of 32 sync blocks. The duplication areas are selected to be the overlapping areas for 4x, 9x, and 17x speeds in FIG. 55. In this case, the data rate for the main areas is about 17.46 Mbps. As for the duplication areas, since the same data is recorded repeatedly seventeen times, the data rate is about 338.8 kbps.

Because the conventional consumer digital VTR has the aforesaid configuration, and the special playback data is recorded several times in the duplication areas, so that the data rate for recording of special playback data is markedly low. Especially in slow playback mode or fast playback mode, the quality of the reproduced picture is poor. For example, when two intra frames are produced per second, the data rate of data for the intra-coding of an ATV signal is estimated to be about 3 Mbps. In the prior art, data can be recorded at a rate of not more than about 340 kbps. The reproduced picture quality is therefore markedly low.

As for the aforesaid DVB signal, the data rate for recording varies depending on the program. Specifically, a data rate permitting the same picture quality as the one provided by the current PAL or SECAM system ranges from 5 to 5.5 Mbps. A data rate permitting a "studio quality" is about 9 Mbps. When a record signal having a plurality of recording data rates is recorded in the digital VTR, the following problem occurs. That is, assuming that a program received at 9 Mbps is recorded in the digital VTR, since the recording data rate in the main areas is 17.46 Mbps as mentioned above, nothing is recorded in the areas of about 8.5 Mbps. Thus, the use efficiency of the magnetic tape is very poor.

SUMMARY OF THE INVENTION

The present invention has been achieved to solve the problems discussed above, and its object is to improve the quality of a playback picture in fast playback mode by raising the recording data rate of fast playback data.

Another object of the present invention is to provide a digital signal recording device which can efficiently record multi-rate record signals on a recording medium, and a digital signal playback device for reproducing data from the above-mentioned recording medium.

A digital signal recording device according to the present invention is a digital signal recording device having a plurality of recording modes including at least a standard recording mode, and transparent-recording a digital video signal which is intra-frame or -field, or inter-frame or -field coded and input in the form of transport packets, and a digital audio signal, on a recording medium, and comprising:

a transmission rate identifying means for identifying a transmission rate of the input transport packets;

a recording mode setting means for setting a recording mode for the digital signal recording device on the basis of a result of transmission rate identification;

a data extracting means for extracting the intra-frame or -field coded digital video signal from the transport packets;

a special playback data generating means for generating special playback data by reconstructing the intra-frame or -field coded digital video signal, having been extracted by the data extracting means; and a record data format generating means for generating recording format such that the input transport packets and the special playback data are recorded at predefined positions on tracks;

wherein when the record data is generated by the record data format generating means, the recording format generating means is so controlled that the number of repetitions of the special playback data recorded on the recording medium is varied depending on the recording mode.

In the above recording device, when the recording format is generated, the recording format generating means is so controlled that the special playback data is positioned along scanning traces which a head scans at a fast playback speed for the standard recording mode.

Another digital signal recording device according to the present invention is a digital signal recording device having a plurality of recording modes including at least a standard recording mode, and transparent-recording a digital video signal which is intra-frame or -field, or inter-frame or -field coded and input in the form of transport packets, and a digital audio signal, on a recording medium, and comprising:

a transmission rate identifying means for identifying a transmission rate of the input transport packets;

a recording mode setting means for setting a recording mode for the digital signal recording device on the basis of a result of transmission rate identification;

a data extracting means for extracting the intra-frame or -field coded digital video signal from the transport packets;

a special playback data generating means for generating special playback data by reconstructing the intra-frame or -field coded digital video signal, having: been extracted by the data extracting means; and a record data format generating means for generating recording format such that the input transport packets and the special playback data are recorded at predefined positions on tracks;

wherein when the record data is generated by the record data format generating means, the recording format generating means is so controlled that the recording format of the special playback data recorded on the recording medium is varied depending on the recording mode.

In the above recording device, when the recording format is generated, the recording format generating means is so controlled that the special playback data is positioned along scanning traces which a head scans at a fast playback speed for each recording mode.

In the above recording device, when the recording format is generated, the recording format generating means is so controlled that the special playback data is positioned along scanning traces which a head scanning a subcode area also scans, at a fast playback speed for each recording mode.

In either of the above recording devices, the special playback data may be generated in the form of transport packets.

In either of the above recording devices, when sync block format is generated, two transport packets may be used to form five sync blocks.

A digital signal playback device according to the present invention is a digital signal playback device reproducing a recording medium on which special playback data extracted from record data is recorded in predetermined areas repeatedly a plurality of times, and having a plurality of recording modes including a standard recording mode, comprising:

a recording mode detecting means for detecting a recording mode from a playback signal; and a recording medium travel speed control means for controlling the travel speed of the recording medium on the basis of the result of detection of the recording mode, wherein when the recording medium having been recorded at a travel speed 1/K times the speed for the standard recording mode, during a fast playback, the recording medium travel speed control means is so controlled that a driving speed for the recording medium is set substantially at a $\{\pm K^{*}(N+\frac{1}{2})\}x$ speed (where N denotes a positive integer, and $2^{*}K^{*}(N+\frac{1}{2}) \leq M^{*}K$ (M denotes the number of repetitions of each special playback data) is satisfied).

Another digital signal playback device according to the present invention is a digital signal playback device reproducing a recording medium on which special playback data extracted from record data is recorded in predetermined areas, and having a plurality of recording modes including a standard recording mode, comprising:

a recording mode detecting means for detecting a recording mode from a playback signal;

a recording medium travel speed control means for controlling the travel speed of the recording medium on the basis of the result of detection of the recording mode; and a tracking control means for controlling tracking such that the head scans a subcode area during fast playback at a predefined travel speed for the above recording mode.

BRIEF DESCRIPTION OF THE DRAWINGS

FIG. 7 shows recording modes of a digital VTR for recording a multi-rate signal.

FIGS. 9A to 9M show the timing of control signals sent from a recording timing setting circuit in respective recording modes.

FIGS. 13A and 13B show a transport packet in an input bit stream and record sync blocks recorded on a magnetic tape.

FIG. 14 shows the numbers of sync blocks per track, which can be reproduced at respective fast playback speeds, for tile respective recording modes.

FIG. 20 shows the fast playback speeds, umbers of repetitions of special playback data, control methods of the servo system in fast playback mode, and playback data rates for special playback for the respective recording modes according to an embodiment of the present invention.

FIG. 31 shows the number of sync blocks per track which can be reproduced at respective fast playback speeds in the second embodiment.

FIG. 55 is a diagram for explaining the overlapping areas between a plurality of fast playback speeds in the prior art.

FIG. 57 shows the scanning traces of two rotary heads during 5x speed playback in the conventional digital VTR.

FIG. 58 shows a structure of an arrangement in a track in the conventional digital VTR.

DETAILED DESCRIPTION OF THE PREFERRED EMBODIMENTS

First Embodiment

Figure 1:
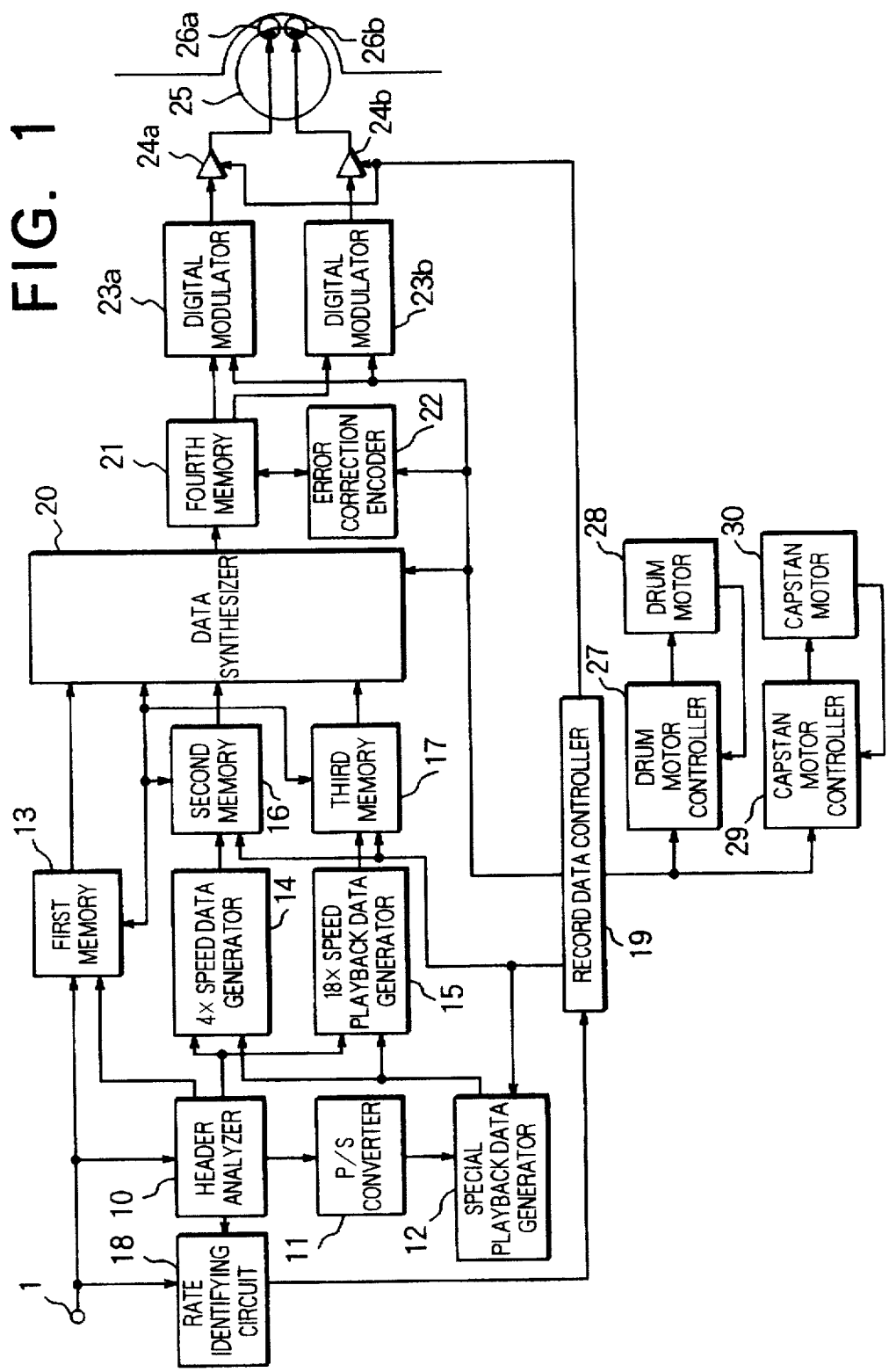
FIG. 1 is a block circuit diagram showing a recording system in a digital VTR of the first embodiment of the present invention.

FIG. 1 is a block diagram showing the configuration of a recording system for a digital VTR in accordance with the first embodiment of the present invention. In FIG. 1, reference numeral 1 denotes an input terminal through which transport packets are input. Reference numeral 10 denotes a header analyzing circuit for detecting a transport header in a transport packet, detecting headers such as a sequence header and picture header in a bit stream, and separating intra-frame or -field coded (hereinafter referred to as "intra-coded") data. Reference numeral 11 denotes a parallel-to-serial converting circuit for performing parallel-to-serial conversion on the input transport packets to obtain a bit stream of one bit. Reference numeral 12 denotes a special playback data generator for separating a bit stream representing an intra-frame or -field coded picture (hereinafter referred to as intra-picture) on the basis of the header information detected by the header analyzer 10, and generating special playback data to be reproduced at respective fast playback speeds (4x and 18x speeds in a 25 Mbps recording mode according to the First Embodiment). Reference numeral 13 denotes a first memory in which transport packets received through the input terminal 1 are stored temporarily and data is transformed according to a sync block format shown in FIG. 13B when the data is output (the details will be described later). Reference numeral 14 denotes a 4x speed data generator for generating 4×-speed special playback transport packets using 4x speed playback data produced by the special playback data generator 12. Reference numeral 15 denotes an 18x speed data generator for producing 18×-speed special playback transport packets using 18x speed playback data produced by the special playback data generator 12. In the first embodiment, as will be described later, four kinds of recording modes are available. The respective recording modes support different fast playback speeds. Hereinafter, lower-speed fast playback data will be regarded as 4x speed playback data, and higher-speed fast playback data will be regarded as 18x speed playback data.

Reference numeral 16 denotes a second memory in which 4x speed playback data received in the form of transport packets is stored temporarily and data is transformed according to a sync block format when the data is output (See FIGS. 13A and 13B. The details will be described later). Reference numeral 17 denotes a third memory in which 18x speed playback data received in the form of transport packets is stored temporarily and data is transformed according to a sync block format when the data is output (See FIGS. 13A and 13B. The details will be described later). Reference numeral 18 denotes a rate identifying circuit for detecting a transmission rate of input transport packets. Reference numeral 19 denotes a record data controller for setting a recording mode for the digital VTR on the basis of a recording data rate provided by the rate identifying circuit 18, and outputting various control signals according to the resultant set record mode.

Reference numeral 20 denotes a data synthesizer for rearranging input transport packets sent from the first memory 13 and various kinds of special playback data sent from the second memory 16 and third memory 17 into a predetermined order of sync blocks (the various kinds of data are arranged according to a sync block format shown in FIG. 13B in the first memory 13, second memory 16, and third memory 17 and then input). Reference numeral 21 denotes a fourth memory. Reference numeral 22 denotes an error-correction encoder for appending a horizontal error-correcting code (C1 check code) and vertical error-correcting code (C2 check defined under the defined under the SD standards, to record data stored in the fourth memory 21. Reference numerals 23a and 23b denote digital modulators for digitally modulating record data with error-correcting codes have been appended thereto, which is output from the fourth memory 21. ID information and sync information are appended to each sync block data when the sync block data is supplied to each of the digital modulators Reference numerals 23a and 23b. Reference numerals 24a and 24b denote recording amplifiers. 25 denotes a rotary drum. Reference numeral 26a denotes a rotary head for recording or reproducing data on or from track A. Reference numeral 26a denotes a rotary head for recording or reproducing data on or from track B. Reference numeral 27 denotes a drum motor controller for controlling a drum motor 28. Reference numeral 29 denotes a capstan motor controller for controlling a capstan motor 30.

Figure 2:
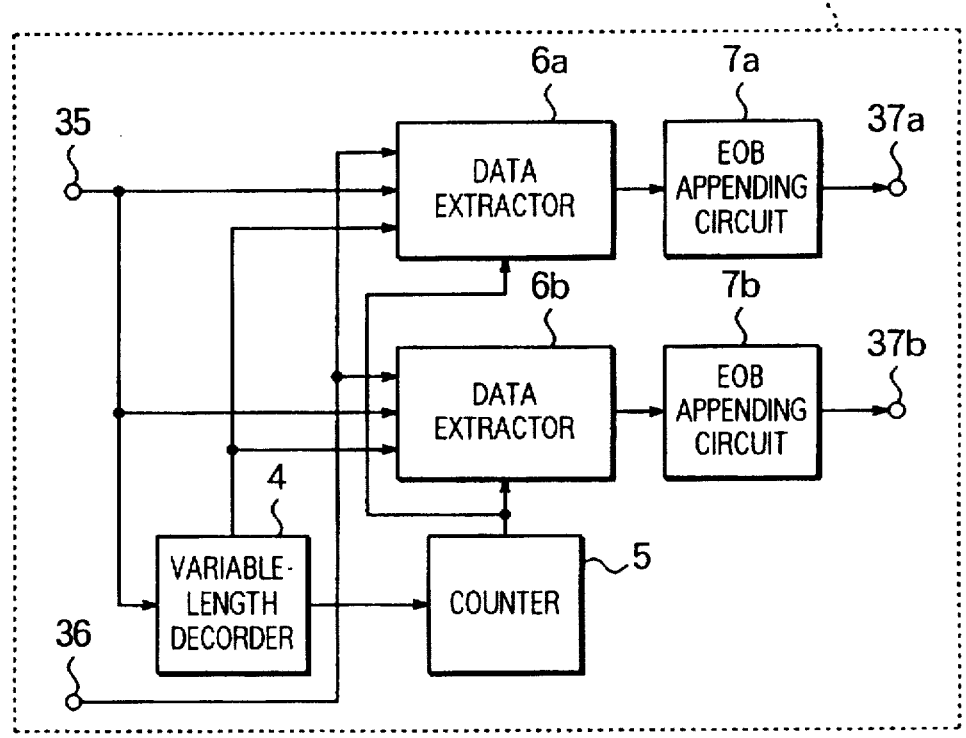
FIG. 2 is a block diagram showing an example of the configuration of a special playback data generator in the first embodiment.
Figure 52:
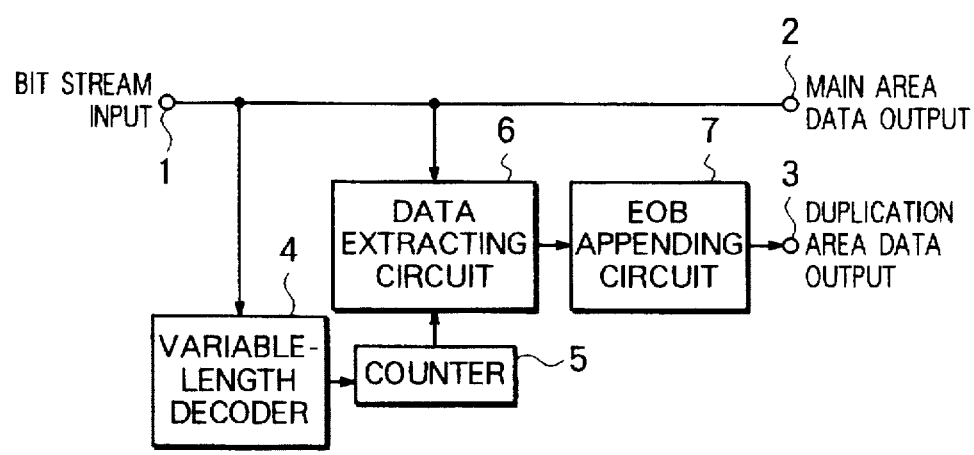
FIG. 52 is a block circuit diagram showing a conventional bit stream recording/playback device capable of fast playback.
Figure 53:
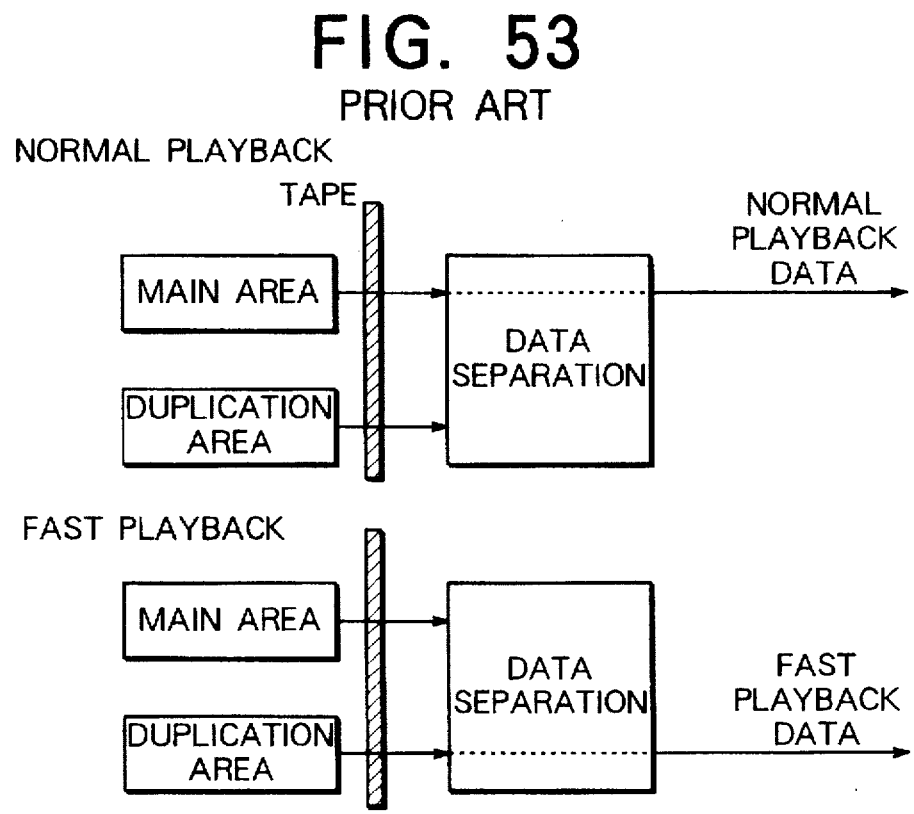
FIG. 53 schematically illustrate normal playback and fast playback in the conventional digital VTR.
Figure 54:
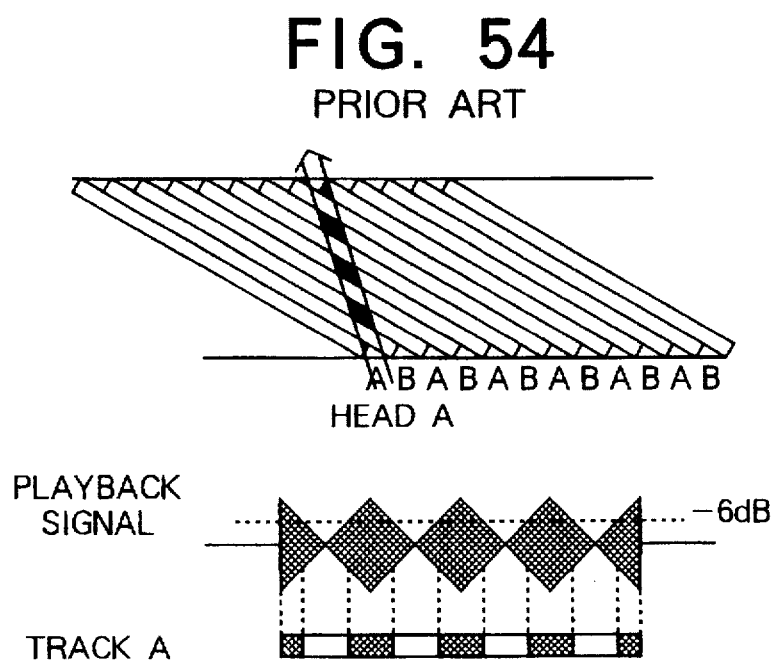
FIG. 54 shows the typical scanning trace of a rotary head in fast playback.
Figure 56:
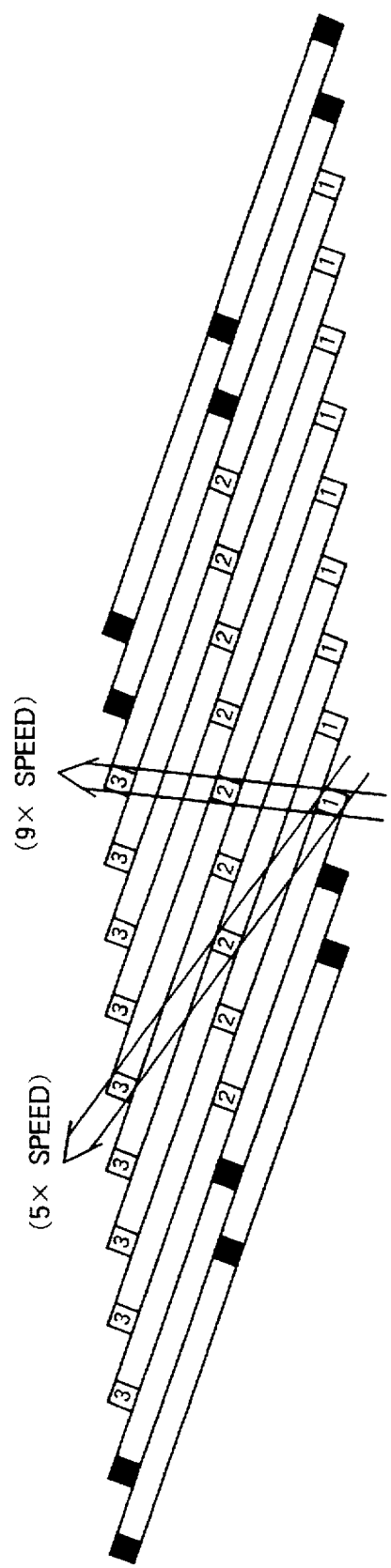
FIG. 56 shows the scanning traces of a rotary head at 5x and 9x speeds in the conventional digital VTR.

FIG. 2 is a block diagram showing an example of the configuration of the special playback data generator 12. Components having the same reference numerals as those in the prior art example shown in FIG. 52 are of the same configuration and operation. Reference numeral 35 denotes an input terminal through which a bit stream of intra-frame or -field coded data (hereinafter referred to as "intra data") is input. Reference numeral 36 denotes an input terminal for input of a control signal sent from the record data controller 19. Reference numeral 37a denotes an output terminal for output of 4x speed playback data. Reference numeral 37b denotes an output terminal for output of 18x speed playback data. Reference numeral 4 denotes a variable-length decoder for variable-length decoding the input intra-data. Reference numeral 5 denotes a counter. Reference numeral 6a denotes a data extractor for extracting 4x speed playback data from the bit stream of the input intra data. Reference numeral 6b denotes a data extractor for extracting 18x playback data. 78 denotes an EOB appending circuit for appending an EOB (End of Block) code to the end of each DCT block of the 4x speed playback data. Reference numeral 7b denotes an EOB appending circuit for appending an EOB code to the end of each DCT block of the 18x speed playback data.

Figure 3:
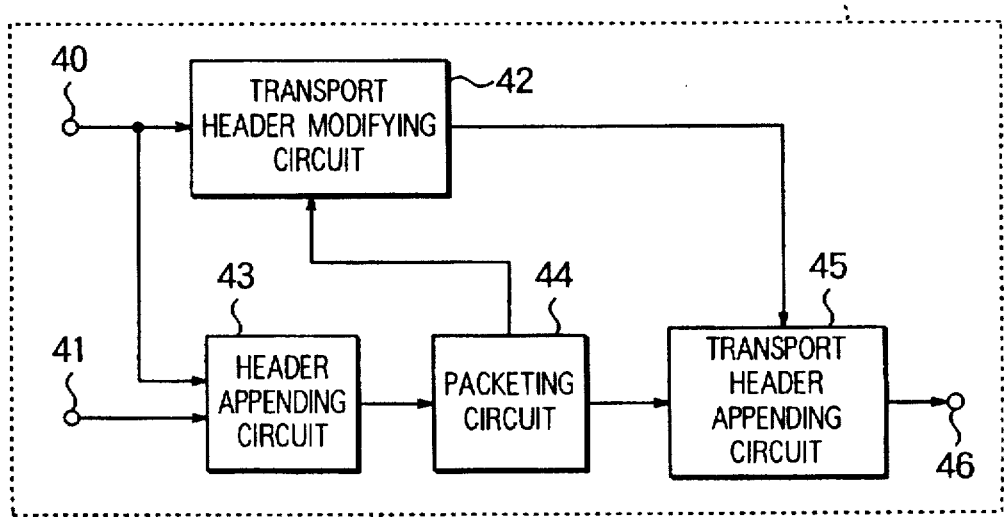
FIG. 3 is a block diagram showing an example of of a 4x speed data generator in the first embodiment.

FIG. 3 is a block diagram showing an example of the 4x speed data generator 14. The 4x speed data generator 14 and 18x speed data generator 15 have the same circuit configuration, and the detailed description of the 18x speed data generator 15 will therefore be omitted. Reference numeral 40 denotes an input terminal for input of header information of a transport header, sequence header, picture header, and the like, which is output from the header analyzer 10, and additional information including a quantization table. Reference numeral 41 denotes an input terminal for input of 4x speed playback data from the special playback data generator 12. Reference numeral 42 denotes a transport header modifying circuit for modifying a transport header fed through the input terminal 40 and outputting a resultant transport header. Reference numeral 43 denotes a header appending circuit for appending, to the 4x speed playback data produced by the special playback data generator 12, header information of a sequence header, picture header, and the like, having been detected by the header analyzer 10 as well as the additional information (quantization table information and the like) needed to decode the 4x speed playback data. Reference numeral 44 denotes a packeting circuit for performing serial-to-parallel conversion on the bit stream fed from the header appending circuit 43 to produce data in which one byte is composed of eight bits, and for collecting 184 bytes of data, to construct the data part of transport packets. Reference numeral 45 denotes a transport header appending circuit for appending a transport header fed by the transport header modifying circuit 42, to each transport packet fed from the packeting circuit 44.

Figure 4:
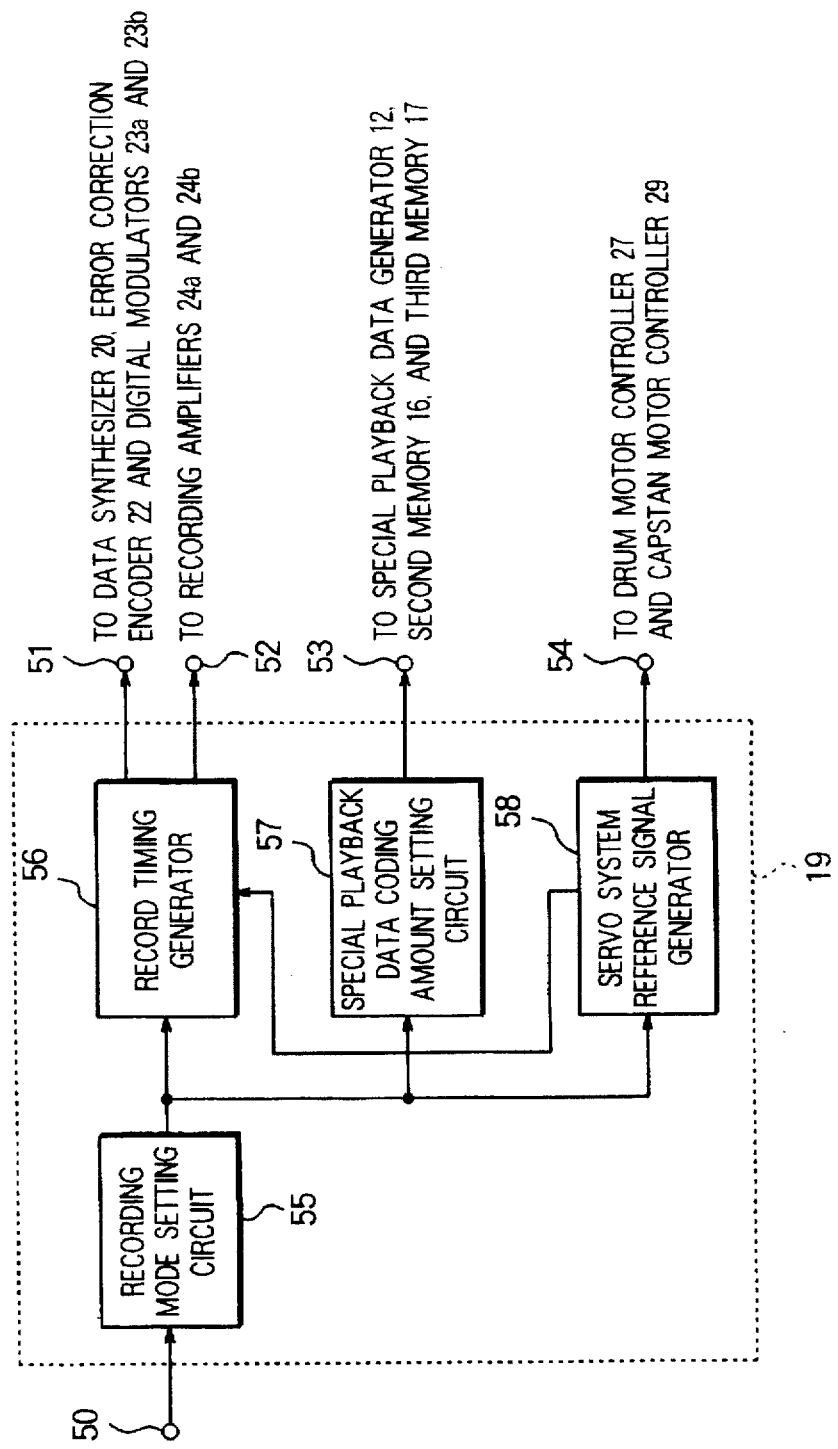
FIG. 4 is a block diagram showing an example of circuitry of a record data controller in the first embodiment.

FIG. 4 is a block diagram showing an example of the record data controller 19. In the drawing, reference numeral 50 denotes an input terminal for input of a recording data rate from the rate identifying circuit 18. Reference numerals 51, 52, 53, and 54 denote output terminals for output of various kinds of control signals. Reference numeral 55 denotes a recording mode setting circuit for setting a recording mode for the digital VTR on the basis of recording data rate information received through the input terminal 50. Reference numeral 56 denotes a recording timing generator for outputting a control signal used to generate a control signal, such as a timing signal and the like, to the data synthesizer 20, error-correction encoder 22, and digital modulators 23a and 23b, and outputting a recording control signal used to control recording of record data on magnetic tape to the recording amplifiers 24a and 24. Reference numeral 57 denotes a special playback data coding amount setting circuit for outputting a coding amount control signal used to control coding amount of various kinds of special playback data according to a recording mode signal sent from the recording mode setting circuit 55.

Figure 5:
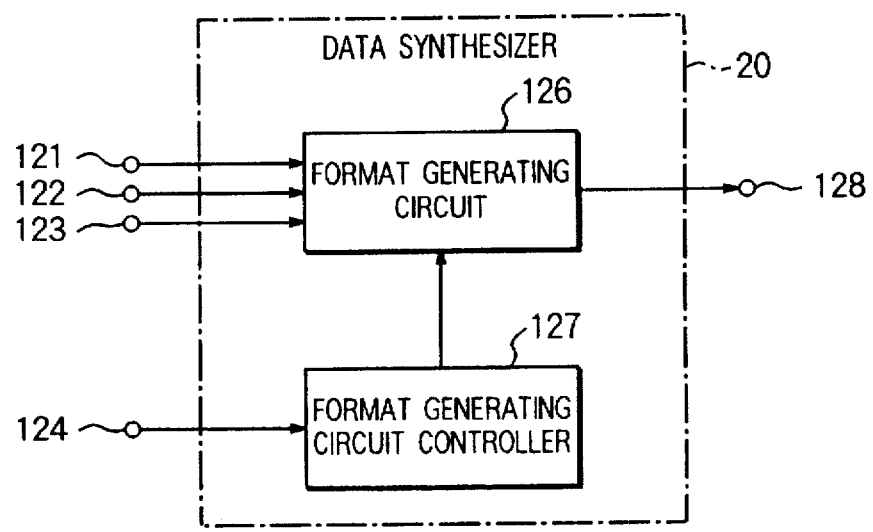
FIG. 5 is a block diagram showing an example of circuitry of a data synthesizer in the first embodiment.

FIG. 5 is a block diagram showing an example of the data synthesizer 20. In the drawing, reference numerals 121, 122, and 123 denote input terminals for input of data from the first memory 13, second memory 16, and third memory 17, respectively. Reference numeral 124 denotes an input terminal for input of a sync block information signal for generating a recording format which is different for each of the recording modes, which is output from the record data controller 19. Reference numeral 126 denotes a format generating circuit for generating recording format pre-defined for each of the recording modes. Reference numeral 127 denotes a format generating circuit controller for controlling the format generating circuit 126 according to a sync block information signal. Reference numeral 128 denotes an output terminal for output of data to the fourth memory 121.

Figure 6A:
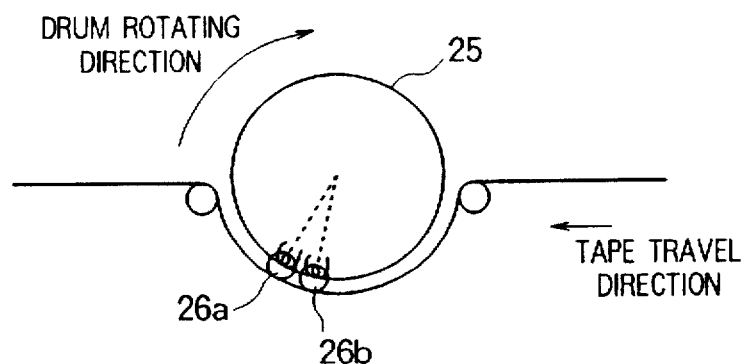
FIGS. 6A and 6B are schematic diagrams slowing the locations of rotary heads of respective channels on a typical rotary drum employed in a digital VTR for recording a multi-rate signal, and how the signals; are recorded on a magnetic tape using a digital VTR having the above rotary head arrangement.
Figure 6B:
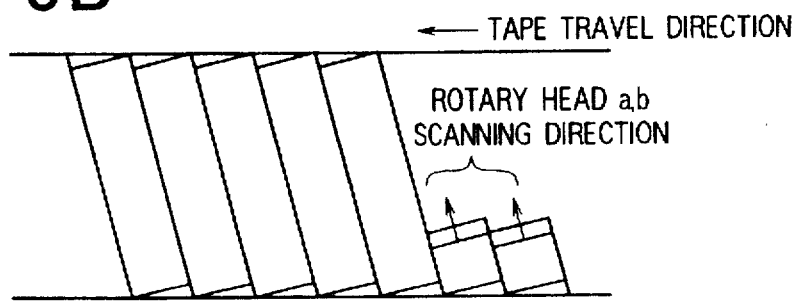

FIG. 6A shows an example of the locations of the rotary heads 26a and 26a on the rotary drum 25 in the digital VTR for recording a multi-rate bit stream. FIG. 63 shows the scanning traces followed by the rotary heads 26a and 26a when the digital VTR having the rotary heads located as shown in FIG. 6A is used to record data on magnetic tape. In the first embodiment, record data is recorded on magnetic tape while the rotary drum 25 shown in FIG. 6A is rotated at 9000 rpm. When the rotary heads 26a and 26a are used to record data, the rotary heads 26a and 26a that are mutually adjacent as shown in FIG. 63 record data on magnetic tape substantially concurrently.

FIG. 7 shows recording modes of the digital VTR for recording a multi-rate bit stream in accordance with the first embodiment. The first embodiment will be described on the assumption that the digital VTR have four recording modes; 25 Mbps, 12.5 Mbps, 8.33 Mbps, and 6.5 Mbps recording modes.

FIGS. 8A to 8D show the timing of recording data in respective recording modes in the first embodiment. FIGS. 9A to 9M show control signals output from the recording timing signal generator 56 in the respective recording modes.

Figure 10A:
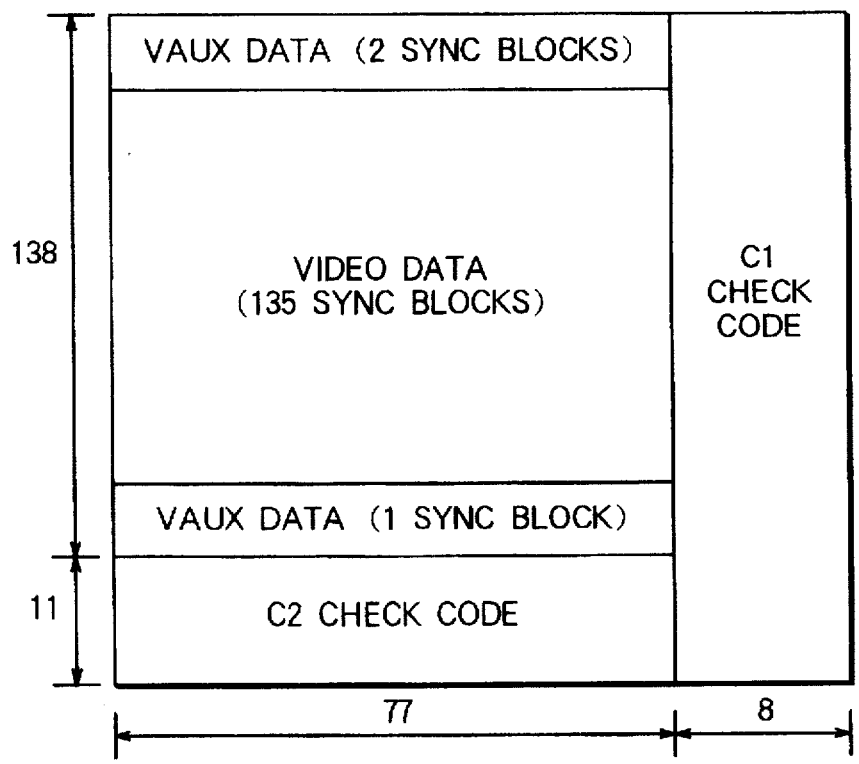
FIGS. 10A and 10B show a data format of a video signal recording area within one track, of a video signal conforming to the SD standards.
Figure 10B:
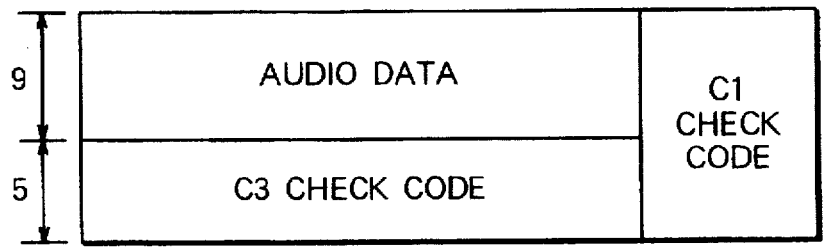

FIGS. 10A and 10B show configuration of error-correcting codes that are appended to a video signal and audio signal and defined under the SD standards. The SD standards stipulate that the error-correcting codes are composed of a (85, 77, 9) Reed-Solomon code as appended to a video signal in a recording direction (C1 check code) and a (149, 138, 12) Reed-Solomon code appended in a vertical direction (C2 check code). The error-correcting codes appended to an audio signal are composed of a (85, 77, 9) Reed-Solomon code, similar to that for the video signal, appended a recording direction (C1 check code), and a (14, 9, 6) Reed-Solomon code appended in the vertical direction (C3 check code).

Figure 11:
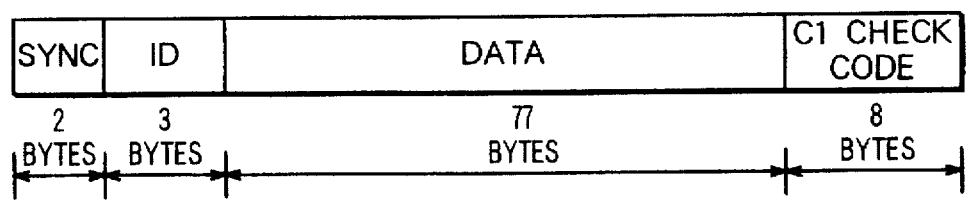
FIG. 11 shows the structure of a sync block conforming to the SD standards.

FIG. 11 shows a structure of one sync block according to the SD standards. The SD standards stipulate that data in a sync block is, as shown in FIG. 11, 90 bytes long. The five leading bytes are assigned to a sync pattern and ID signal, while the eight trailing bytes are assigned to an error-correcting code (C1 check code).

Figure 12:
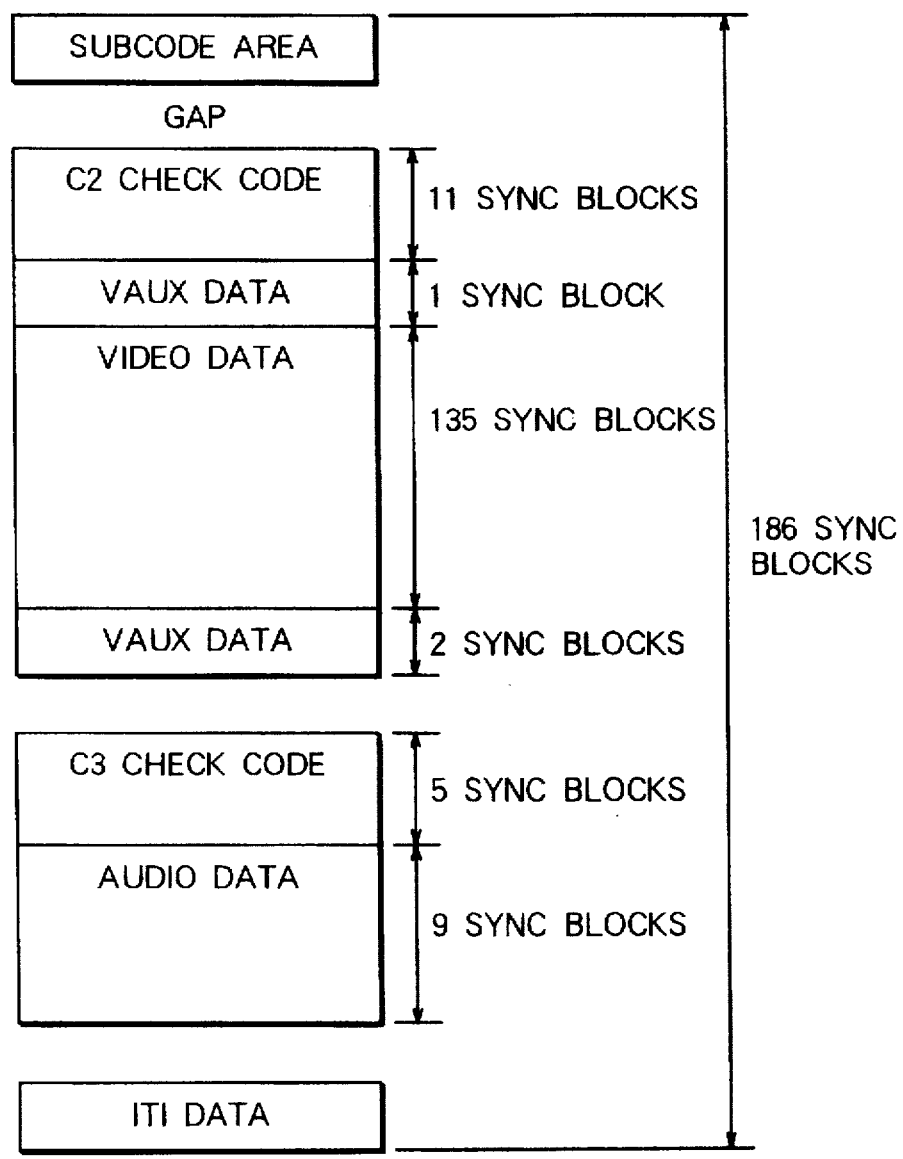
FIG. 12 shows a recording format within one track which is conforming to the SD standards.

FIG. 12 shows a recording format within one track defined by the SD standards. According to the SD standards, an area on a track for recording video data is composed of 149 sync blocks, as shown in FIG. 12 (or 10). Of the 149 sync blocks, three sync blocks are used as a VAUX data recording area, and eleven sync blocks are used as an error-correcting code recording area (C2 check code). One sync block is 90 bytes long, as shown in FIG. 11. The five leading bytes are assigned to a sync pattern and ID signal, and the eight trailing bytes are assigned to an error-correcting code (C1 check code). Data that can be recorded in one sync block is therefore 77 bytes long.

FIGS. 13A and 13B show a sync block format in accordance with the first embodiment. FIG. 13A shows a transport packet contained in an input bit stream (or data). FIG. 13B shows a recording sync block to be recorded on magnetic tape. A bit stream received through the input terminal 1 contains a digital video signal, digital audio signal, and digital data concerning the video and audio signals. The digital signals and data are transmitted the form of a transport packet shown in FIG. 13A. Each packet is composed of a header of four bytes long and a data part of 184 bytes long.

According to the first embodiment, a bit stream is detected in units of a transport packet. Two detected transport packets are transformed into a record data block composed of five sync blocks (a sync block format), as shown in FIG. 13B, and then recorded. In FIG. 13B, H1 denotes a first header, and H2 denotes a second header. The header H1 is identification data indicating a sync block number among the five sync blocks (a data area in each sync block contains data of 77 bytes long as shown in FIG. 11). The header H2 is identification data, such as the one indicating video data or audio data. A sync byte appended to the start of each transport header may not be recorded. However, the description is continued on the assumption that the whole data in each transport packet is recorded.

FIG. 14 shows the numbers of sync blocks whose data can be acquired from one at each set fast playback speed when data that has been recorded in each recording mode is reproduced from magnetic tape in fast playback mode. Numerical values in FIG. 14 represent numbers of sync blocks whose data can be reproduced from one track at each playback speed by means of rotary heads each having a width of 10 micrometers (note that a track pitch under the SD standards is 10 micrometers). Calculation was conducted on the assumption that the number of sync blocks per track (equivalent to 180°) is 186 and the parts of the playback signal whose output levels is equal to or higher than—6 dB are acquired, as in the prior art.

Figure 15:
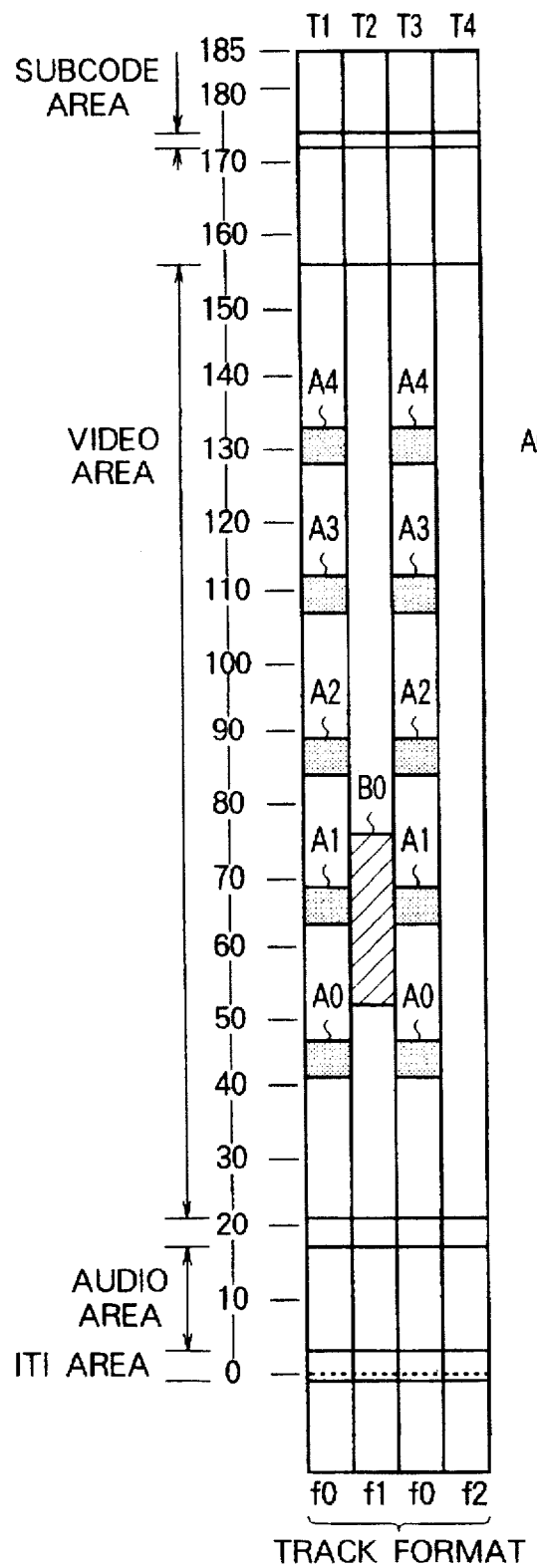
FIG. 15 shows a track format of four track period including the arrangement of special playback data recording areas for the standard recording mode in the first embodiment.
Figure 16:
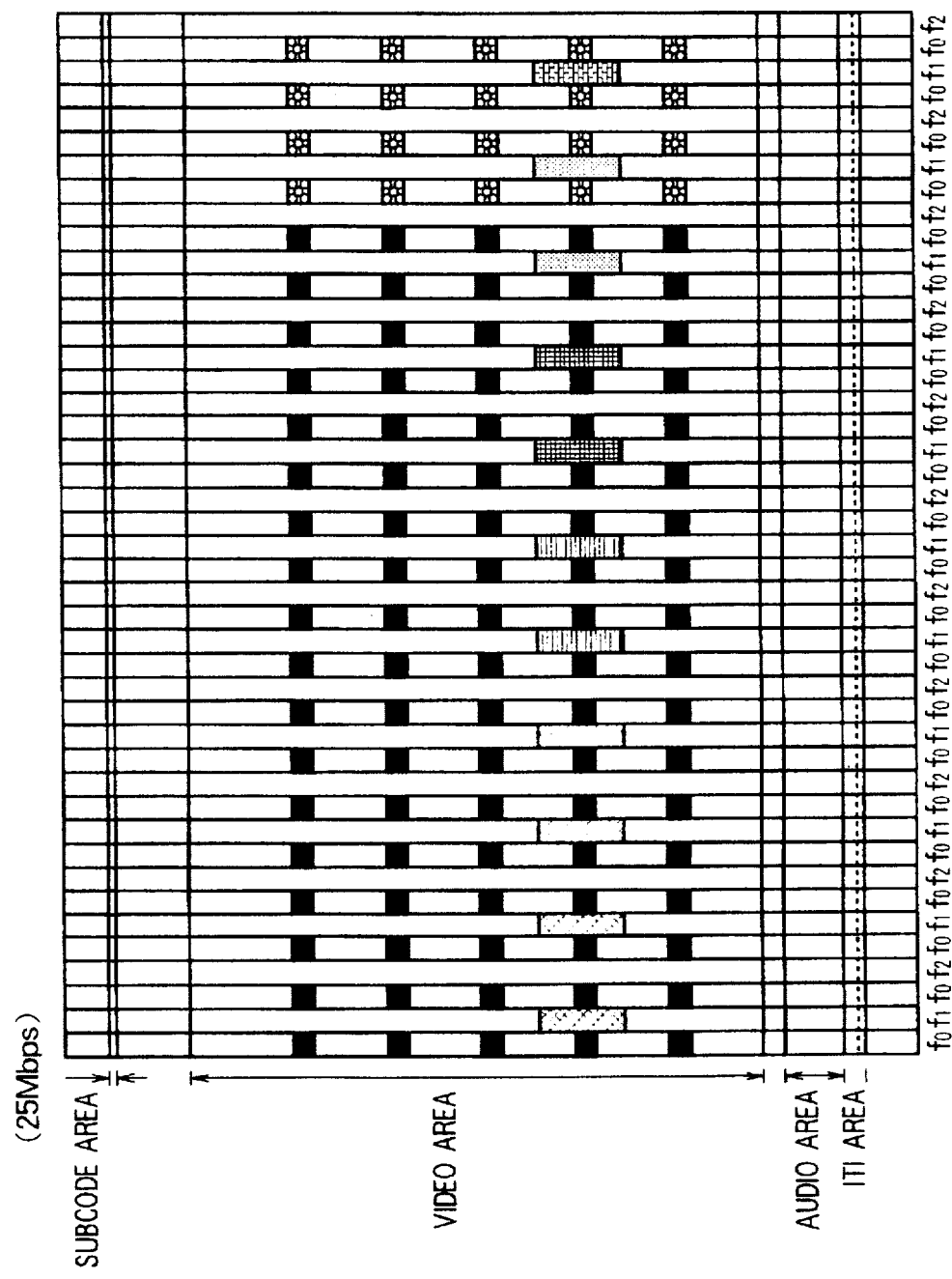
FIG. 16 shows a recording format on a magnetic tape for the 25 Mbps recording mode in an embodiment of the present invention.
Figure 17:
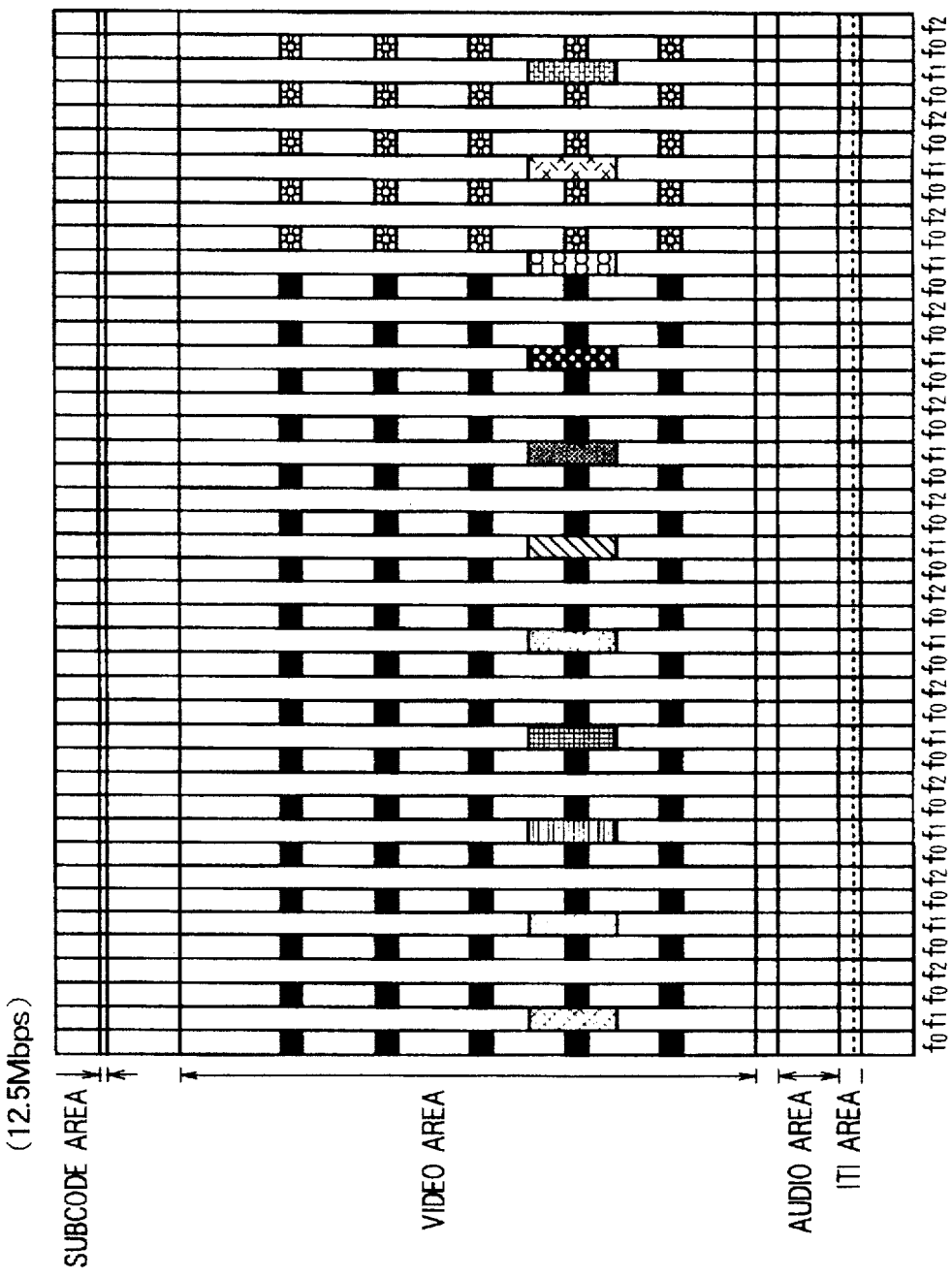
FIG. 17 shows a recording format on a magnetic tape for the 12.5 Mbps in an embodiment of the present invention.
Figure 18:
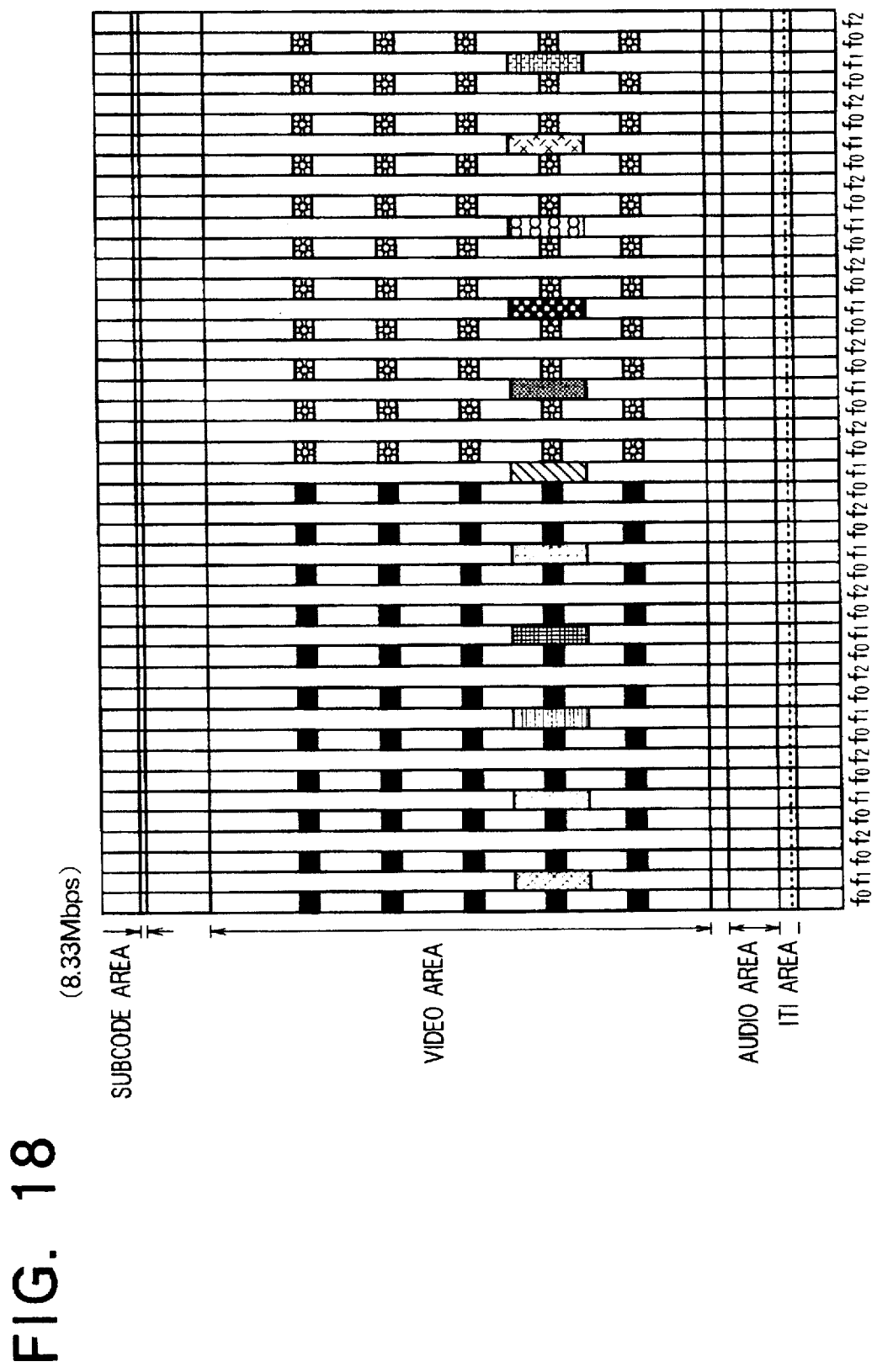
FIG. 18 shows a recording format on a magnetic tape for the 8.33 Mbps recording mode in an embodiment of the present invention.
Figure 19:
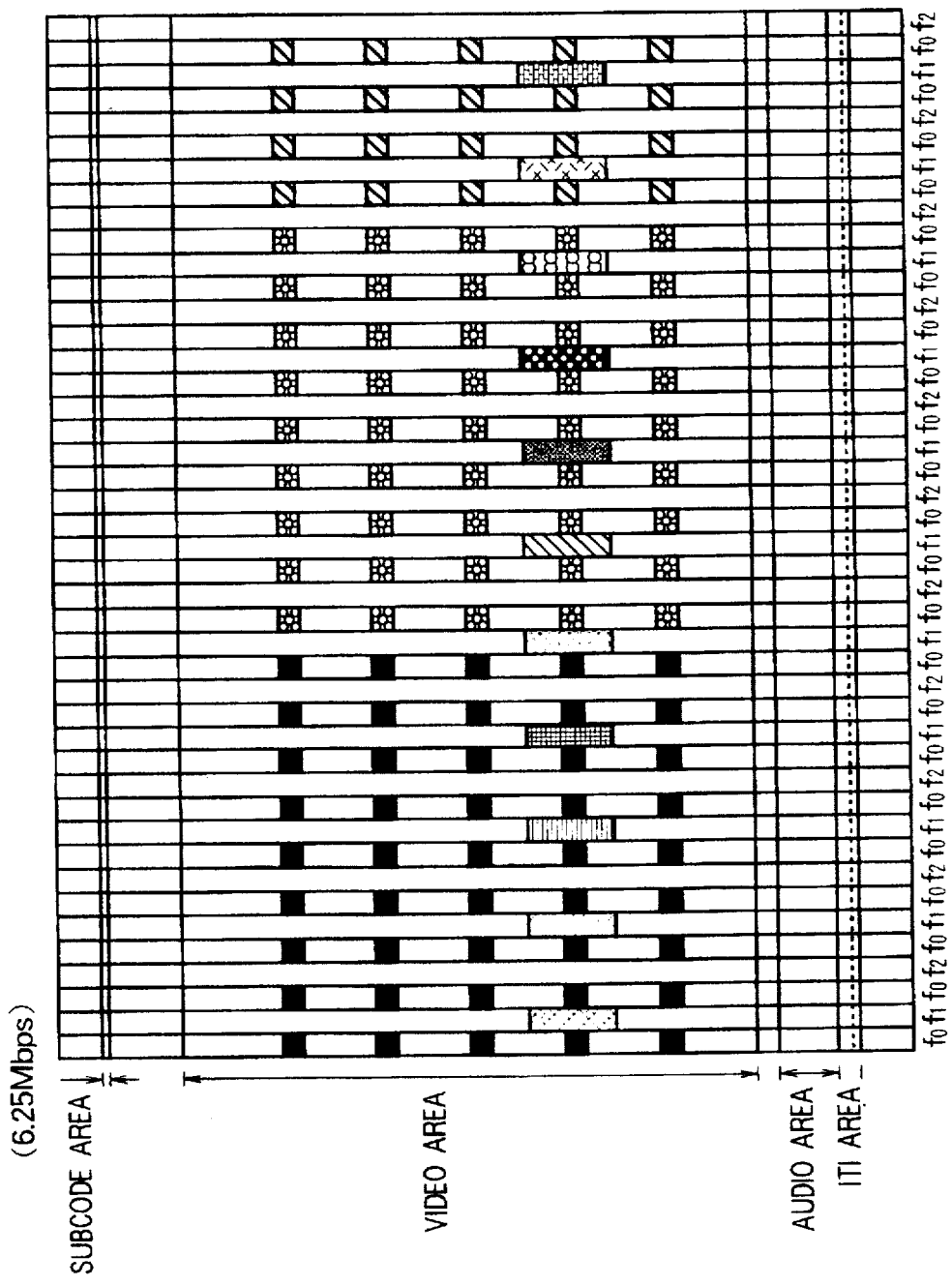
FIG. 19 shows a recording format on a magnetic tape for the 6.5 Mbps recording mode in an embodiment of the present invention.

FIG. 15 shows an example of a recording format in the first embodiment. As illustrated, recording areas for the bit stream (hereinafter referred to as normal playback data) and special playback data recording areas are defined repeatedly in cycles of four tracks. Hereinafter, each set of four tracks is called a track format. FIG. 16 shows the arrangement of data in cycles of four tracks (data in the track formats), shown in FIG. 15, on magnetic tape in the 25 Mbps recording mode. FIG. 17 shows the arrangement of data in track formats shown in FIG. 15, on magnetic tape in the 12.5 Mbps recording mode. FIG. 18 shows: the arrangement of data in track formats shown in FIG. 15 in the 8.33 Mbps recording mode. FIG. 19 shows the arrangement of data in track formats shown in FIG. 15 in the 6.5 Mbps recording mode. In any of the recording modes, the track pitch is 10 micrometers, conforming to the SD standards. However, the angles of tracks are different between recording formats because of the differences in tape travel speed.

FIG. 20 shows the fast playback speeds, the number of repetitions of special playback data, servo system control methods for fast playback, and data rates for fast playback in relation to areas A0 to A4 and B0 and respective recording modes in the first embodiment. In the first embodiment, the number of repetitions of special playback data recorded in special playback data recording areas shall be different between the recording modes.

Referring to FIGS. 6A, 6B to 8D, an example of a data recording method employed in a digital VTR for recording a multi-rate signal will be described below. As described previously, a digital VTR according to this first embodiment offers four recording modes; 25 Mbps recording mode (hereinafter referred to as "standard recording mode"), 12.5 Mbps recording mode (hereinafter referred to as "(½)x speed recording mode), 8.33 Mbps recording mode (hereinafter referred to as (⅓)x speed recording mode), and 6.5 Mbps recording mode (hereinafter referred to as (¼)x speed recording mode). Referring to FIG. 6A, the rotary heads 26a and 26a are juxtaposed and attached to the rotary drum 25. The magnetic tape is wound substantially 180° around the rotary drum 25. In the first embodiment, the rotary drum 25 is driven at 9000 rpm (fixed) irrespective of the recording mode.

Figure 8A:
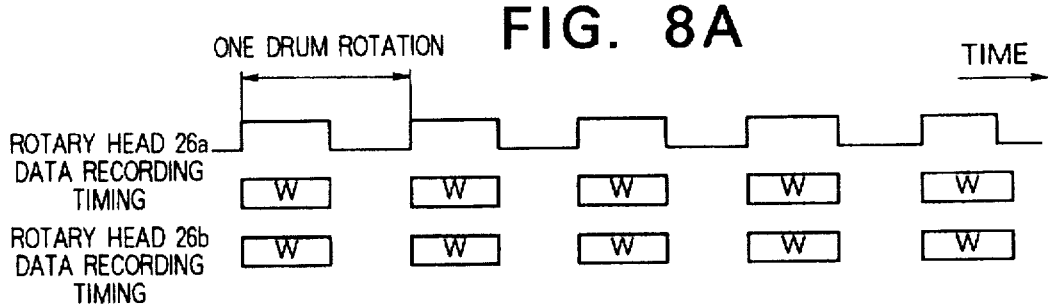
FIGS. 8A to 8D show the timing of recording record data in respective recording modes.
Figure 32:
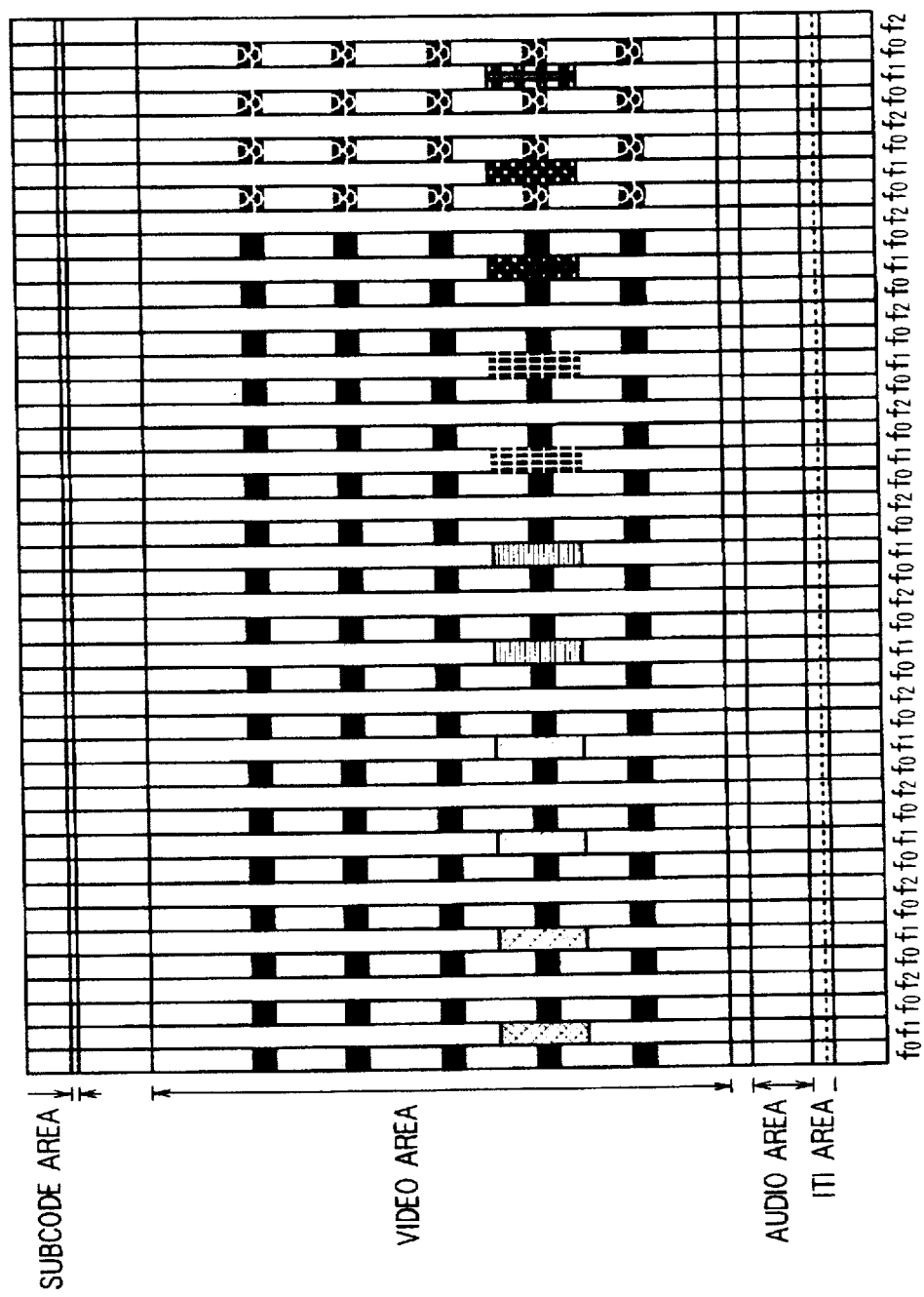
FIG. 32 shows recording pattern on a magnetic tape for the case of the standard recording mode in the second embodiment.

First, the standard recording mode (25 Mbps recording mode) will be described briefly with reference to FIG. 8A. In the standard recording mode, the magnetic tape is driven at a standard magnetic tape travel speed stipulated under the SD standards. As illustrated, the record signals for two channels are recorded on the magnetic tape substantially simultaneously by means of the rotary heads 26a and 26a every rotation of the rotary drum 25 (See FIG. 63). FIG. 32 shows a recording track pattern on the magnetic tape in the standard recording mode. In the drawing, the track pitch is 10 m. Details of the recording track pattern will be described later.

Figure 8B:
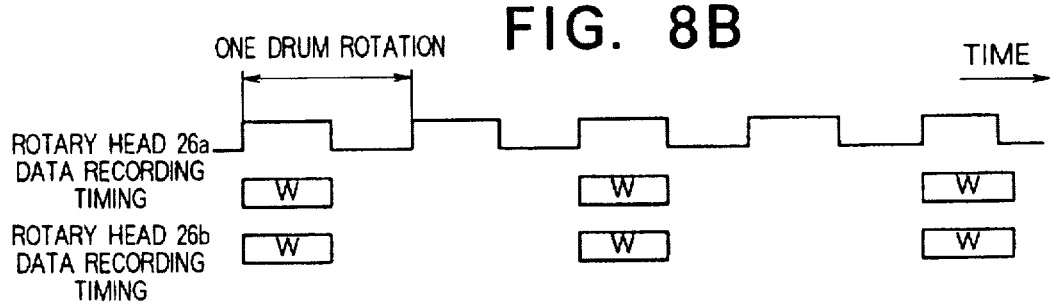

Similarly, the (½)x speed recording mode (12.5 Mbps recording mode) will be described briefly. The rotary drum 25 is driven at 9000 rpm in the same manner as in the standard recording mode. The magnetic tape travel speed 1s however a half that in the standard recording mode. If the data were recorded every rotation of the rotary drum 25 in the same way as in the standard recording mode, since the magnetic tape travel speed is half, the data recorded previously by the rotary head 26b would be overwritten by the rotary head 26a. This is because the track pitch is 10 μm irrespective of the recording mode, as mentioned above. In the (½)x speed recording mode, therefore, as shown in FIG. 8B, the rotary heads 26a and 26a record data of the recording signals of the two channels, and the data for one track for each of the two channels is recorded substantially concurrently on the magnetic tape every two rotations (see FIG. 6B).

Figure 8C:
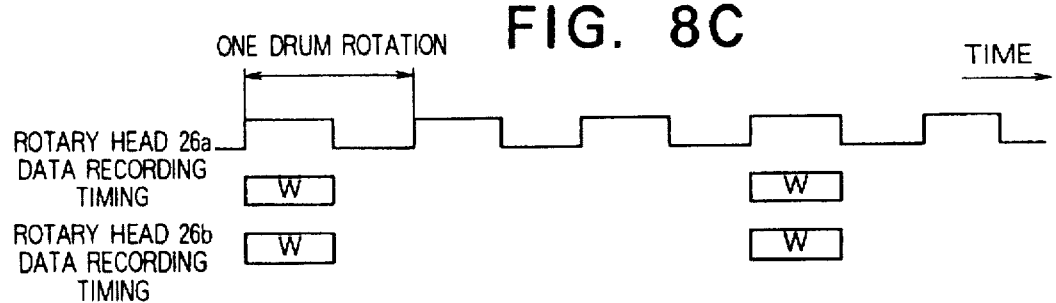

Next, the (⅓)x speed recording mode (8.33 Mbps recording mode) will be described. The rotary drum 25 is driven at 9000 rpm in the same manner as in the standard recording mode. However, the magnetic tape travel speed is ⅓ of that in the standard recording mode. If data were recorded every rotation of the rotary drum 25 in the same way as in the standard recording mode, since the magnetic tape travel speed is ⅓ of that in the standard recording mode, previously-recorded data would be overwritten by the rotary heads 26a and 26b. In (⅓)x speed recording mode, therefore, as shown in FIG. 8C, the rotary heads 26a and 26a record the recording signals of the two channels, and the data for one track for each of the two channels is recorded on the magnetic tape substantially concurrently every three rotations of the rotary drum 25 (See FIG. 6B).

Figure 8D:
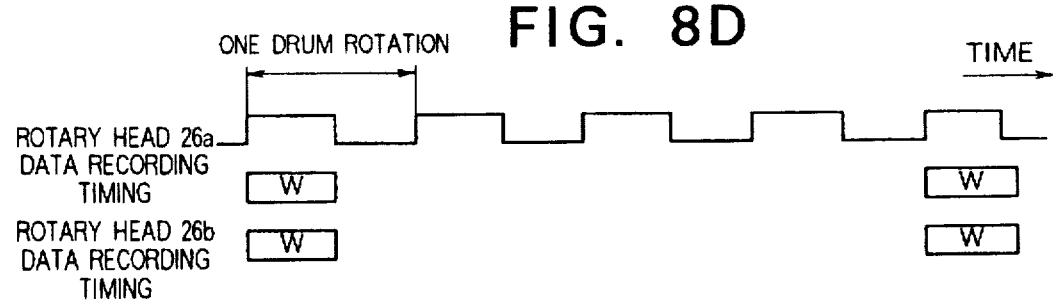

Next, the (¼)x speed recording mode (6.5 Mbps recording mode) will be described. The rotary drum 25 is driven at 9000 rpm in the same manner as in the standard recording mode. However, the magnetic tape travel speed is ¼ of that in the standard recording mode. If data were recorded every rotation of the rotary drum 25 in the same way as in the standard recording mode, since the magnetic tape travel speed is ¼ of that in the standard recording, mode, previously-recorded data would be overwritten by the rotary heads 26a and 26b. In (¼)x speed recording mode, therefore, as shown in FIG. 8D, the rotary heads 26a and 26a record recording signals of the two channels and the data for one track for each of the two channels are recorded on the magnetic tape substantially concurrently every four rotations of the rotary drum 25 (See FIG. 6B).

Next, the recording formats in the recording modes in the first embodiment will be described in conjunction with FIGS. 14 to 20. In the Following description, the tracks recorded by the rotary head 26a are called A tracks, while the tracks recorded by the rotary head 26a are called B tracks. In FIG. 15, T1 denotes a first track recorded by the rotary head 26a of channel A. T2 denotes a second track recorded by the rotary head 26b of channel B. T3 denotes a third track recorded by the rotary head 26a of channel A. T4 denotes a fourth track recorded by the rotary head 26a of channel B. In the first embodiment, data is recorded on the magnetic tape in units (track formats) of four tracks consisting of the first to fourth tracks. f0, f1, and f2 set forth under the tracks in FIG. 15 indicate the kinds of pilot signals recorded on the tracks as reference signals for use in tracking control during playback. In the first embodiment, the normal playback data and special playback data are recorded in a video area composed of the 135 sync blocks, excluding the C2 check code and VAUX data recording areas within the video area.

Referring to FIG. 15, A0 to A4 denote positions off the 18x speed playback data recording areas on magnetic tape. Each of the 18x speed playback data recording areas (A0 to A4) is five sync blocks long. Five 18x speed playback data recording areas are defined on each off the A tracks (T1 and T3). The same data is recorded in areas bearing the same reference numeral.

B0 denotes a position of a 4x speed playback data recording area on the magnetic tape. The 4x speed playback data recording area is 25 sync blocks long. The 4x speed playback data recording area is defined at one location on a track T2 as illustrated.

The numbers of sync blocks allotted to the data recording areas are determined on the basis of the data shown in FIG. 14. As will be seen from FIG. 14, 62 sync blocks of the data recorded in the 25 Mbps recording mode can be obtained from one track during the 4x speed playback. 124 sync blocks of the data recorded in the 12.5 Mbps recording mode can be obtained during the 4x speed playback. 112 sync blocks of data recorded in the 8.33 Mbps recording mode is obtained during the 6x speed playback. 106 sync blocks of the data recorded in the 6.5 Mbps recording mode can be obtained during the 8x speed playback. (The B0 area should therefore be not more than 62 sync blocks.) During the 18x speed playback, 10.9 sync blocks can be obtained per track. (Each of A0 to A4 areas should therefore be not more than 10.9 sync blocks.) FIG. 15 shows how data is arranged on magnetic tape for the respective special playback speeds. (During the 17x speed playback of data recorded in the 12.5 Mbps recording mode, the 16.5x speed playback of data recorded in the 8.33 Mbps recording mode, and the 18x speed playback of data recorded in the 6.5 Mbps recording mode, tape travel control alone is executed, and phase control is not, as shown in FIG. 20, according to the first embodiment. The numbers of sync blocks obtained in these recording modes are not counted in allocating the data recording areas. How to obtain the special playback data recorded in the respective recording modes will be described in detail when the playback system is explained.)

The data is recorded on the magnetic tape by repeatedly recording the track format shown in FIG. 15. The recording formats for the respective recording modes will next be described.

FIG. 16 shows a recording format of the first embodiment for the 25 Mbps recording mode. According to the first embodiment, when data is recorded in the 25 Mbps recording mode, 4x speed playback is performed using information in B0 area. The information in A0 to A4 areas is reproduced in the 18x speed fast playback mode. In this case, as shown in FIG. 20, the same special playback data is recorded in B0 area repeatedly for two track formats. In areas A0 to A4, the same data is recorded repeatedly for nine track formats. In other words, as for the data in the area B0, the same data is recorded twice in cycles of eight tracks. As for the data in areas A0 to A4, tile same data is recorded eighteen times in cycles of 36 tracks. In FIG. 16, the same special playback data is recorded in areas A0 Co A4 and B0 shaded with the same patterns.

When data is recorded in the 25 Mbps recording mode, a servo system that will be described later controls the travel speed of the magnetic tape and the phases of rotary heads so as to achieve fast playback. The data in the areas A0 to A4 can be reproduced also at a 8.5x speed. In this case, the servo system controls only the travel speed of the magnetic tape (See FIG. 20).

Likewise, FIG. 17 shows a recording format of the first embodiment for the 12.5 Mbps recording mode. In the first embodiment, when data is recorded in the 12.5 Mbps recording mode, 4x speed playback is effected using the information in the area B0. 17x speed playback is effected using the information in the areas A0 to A4. As shown in FIG. 20, special playback data recorded in area B0 is different between from one track format to another. In areas A0 to A4, the same special playback data is recorded repeatedly for 8.5 track formats. Accordingly, as for the areas B0, the same special playback data is recorded in cycles of four tracks. As for the areas A0 to A4, the same data is recorded repeatedly seventeen times in cycles of 34 tracks. The same special playback data is recorded in areas A0 to A4 and B0 shaded with the same patterns in FIG. 17.

When data is recorded in the 12.5 Mbps recording mode, a servo system that will be described later controls the travel speed of the magnetic tape and the phases of the rotary heads so as to achieve the 4x speed playback. For the 17x speed playback, the servo system controls only the travel speed of the magnetic tape (See FIG. 20).

FIG. 18 shows a recording format of the first embodiment for the 8.33 Mbps recording mode. In the first embodiment, when data is recorded in the 8.33 Mbps recording mode, a 6x speed playback is performed using the information in area B0, and 16.5x speed playback is performed using the information in areas A0 to A4. As shown in FIG. 20, the special playback data recorded in area B0 is different from one track format to another. In areas A0 to A4, the same special playback data is recorded repeatedly for 5.5 track formats. Accordingly, as for the area B0, the same special playback data is recorded in cycles of four tracks as shown in FIG. 18. As for the areas A0 to A4, the same data is recorded repeatedly eleven times in cycles of 22 tracks. The same special playback data is recorded in areas A0 to A4 and B0 shaded with the same patterns in FIG. 18.

When the data is recorded in the 8.33 Mbps recording mode, a servo system that will be described later controls the travel speed of the magnetic tape and the phases of the rotary heads so as to achieve the 6x speed fast playback mode. For the 16.5x speed playback, the servo system controls only the travel speed of the magnetic tape (See FIG. 20).

FIG. 19 shows a recording format of the first embodiment for the 6.5 Mbps recording mode. In the first embodiment, when data is recorded in the 6.5 Mbps recording mode, the 8x speed playback is performed using the information in area B0, and the 18x speed playback is performed using the information in areas A0 to A4. As shown in FIG. 20, the special playback data recorded in area B0 is different from one trace format to another, while, in areas A0 to A4, the same special playback data is recorded repeatedly for 4.5 track formats. Accordingly, as for the area B0, the same special playback data is recorded once in cycles of four tracks, and as for areas A0 to A4, the same data is recorded repeatedly nine times in cycles of eighteen tracks. The same special playback data is recorded in areas A0 to A4 and B0 shaded with the same patterns in FIG. 19. (Incidentally, in the first embodiment, special playback data for ten transport packets is recorded in areas A0 to A4, two transport packets in each of the areas A0 to A4, in any of the recording modes).

When the data is recorded in the 6.5 Mbps recording mode, a servo system that will be described later controls the travel speed of the magnetic tape and the phases of rotary heads so as to achieve the 8x speed playback. For the 18x speed playback, the servo system controls only the travel speed of the magnetic tape. Operations in fast playback modes will be described in detail in conjunction with a playback system later (See FIG. 20).

According to the data arrangement (recording format) of one track format shown in FIG. 15, when the data is recorded in the 25 Mbps recording mode, the rotary heads 26a and 26b scan an ITI area and subcode area on the magnetic tape at 4x and 18x speeds (details will be described later). Based on the pilot signals f0, f1, and f2, tracking can be controlled at the ITI areas in the special playback mode. In addition, additional information including time information and music-item-number information can be reproduced from the subcode areas. Data recorded in the subcode areas can be reproduced during the 17x speed playback for reproducing data recorded in the 12.5 Mbps recording mode, during the 16.5x speed playback for reproducing data recorded in the 8.33 Mbps recording mode, or during the 18x speed playback for reproducing data recorded in the 6.5 Mbps recording mode.

Next, the operations of the recording system will be described using FIGS. 1 to 20. Transport packets received through the input terminal 1 are supplied to the header analyzer 10, first memory 13, and rate identifying circuit 18. The header analyzer 10 detects transport headers from the input transport packets, analyzes the transport headers, separates a program association table (PAT) and a program map table (PMT) from the transport packets, and detects a program ID (PIP) of a program to be recorded in the digital VTR. The PIP information is supplied to the first memory 13 and rate identifying circuit 18.

Based on the detected PIP, the header analyzer 10 extracts transport packets containing the video data that represents the program to be recorded. The header analyzer 10 then analyzes data in the transport packets, and extracts header information such as a sequence header, picture header, and slice header, and based on the header information, intra picture data is extracted from the transport packets. At the same time, the various header information appended to the intra picture data and the additional information appended to the header information are also extracted.

The sequence header is header information provided in a bit stream serving as a video signal, and contains identification information indicating either MPEG1 or MPEG2, an aspect ratio of the picture, and a transmission rate of the picture. The picture header is a header appended to the start of each frame or field to indicate the start of each frame. In addition, a mode signal representing a coding mode and a quantization table are appended. According to the MPEG2, one frame of data is transmitted, a screen of one frame (field) is divided into a plurality of slices and then transmitted. The slice header therefore indicates the start of each slice. (For details of the headers, refer to the draft of the MPEG2 recommendations).

The header information and the accompanying additional information (for example, quantization table information) detected by the header analyzer 10 are supplied to the parallel-to-serial converter 11, first memory 13, 4x speed data generator 14, 18x speed data generator 15, and rate identifying circuit 18. The intra picture data extracted by the header analyzer 10 is supplied to the parallel-to-serial converter 11.

Based on the PID of the program to be recorded sent from the header analyzer 10, the rate identifying circuit 18 extracts the transport packets of the program to be recorded from the transport packets received through the input terminal 1. In the extracted transport packet, header information appended to the video data, audio data, and digital data concerning the video and audio data is analyzed to detect the transmission rate of the data. The recording data rate of the data representing the program to be recorded is then supplied to the record data controller 19. The transmission rate of the video data only may be detected concurrently with header analysis of video data performed by the header analyzer 10.

The recording data rate of the data representing the program detected by the rate identifying circuit 18 is supplied to the record data controller 19. Referring to FIG. 4, the operations of the record data controller 19 will be described. The recording data rate received through the input terminal 50 is supplied to the recording mode setting circuit 55, and a recording mode optimum for recording the program is then selected from among the four recording modes described above. For example, when the recording data rate of a program is 5.5 Mbps, the 6.5 Mbps recording mode is selected. When the data rate is 9.0 Mbps, the 12.5 Mbps recording mode is selected.

The output of the recording mode setting circuit 55 is supplied to the recording timing signal generator 56, special playback data coding amount set-ting circuit 57, and servo system reference signal generator 58. The servo system reference signal generator 58 generates a reference signal, tape travel speed information, track identification signal (for example, a track number, and frequencies of pilot signals recorded in cycles of four tracks) which are needed to control the rotation phase of the rotary drum 25. In the first embodiment, the rotating speed of the rotary drum 25 is 9000 rpm in any of the recording modes, in response to the recording mode signal, the special playback data coding amount setting circuit 57 outputs coding amount control information concerning the special playback data to be recorded in areas B0 and A0 to A4 (See FIG. 15), to the special playback data generator 12, second memory 16, and third memory 17.

The recording timing signal generator 56 generates various control signals on the basis of the selected recording mode, and the reference signal sent from tile servo system reference signal generator 58 and used to control the rotation phase of the rotary drum 25. The details will be described later.

The intra picture data (hereinafter referred to as intraframe; the following description relates to the case where data coded frame by frame is recorded) detected by the header analyzer 10 is subjected to parallel-to-serial conversion at the parallel-to-serial converter 11 into a bit stream of one bit. The intra frame bit stream which is serial data of one bit is supplied to the special playback data generator 12. The operations of the special playback data generator 12 will be described in conjunction with FIG. 2. According to the MPEG2 image compression a signal is subjected to discrete cosine transform (hereinafter referred to as DCT) in units of a block (hereinafter referred to as DCT block) of 8 lines by 8 pixels; data resulting from the DCT (DCT coefficients) is quantized; the resultant DCT coefficients are read sequentially from low-frequency components of the signal, on which the power spectrum of the signal is concentrated, by zigzag scanning; and then run-length encoding is performed, in which runs of zero are encoded. The run-length encoded data is then subjected to two-dimensional variable-length encoding, whereby the transmission data rate is lowered.

The serial data representing an intra picture and being received through the input terminal 35 is supplied to the variable-length decoder 4, data extractor 6a, and data extractor 6b. The variable-length decoder 4 decodes the input bit stream. In the first embodiment, the input bit stream is not decoded completely during the variable-length decoding, but only the run length and code length of the variable-length code words are detected and output. This contributes to a reduction in size of the circuitry. (Needless to say, the variable-length decoding may be carried out completely.) The counter 5 counts the number of DCT coefficients in one decoded DCT block, on the basis off the run length, and outputs the count value to the data extractors 6a and 6b.

Based on the coding amount control information (the number of DCT coefficients transmitted) concerning the 4x speed playback data, which is output from the special playback data coding amount setting circuit 57 through the input terminal 36 (in the first embodiment, a signal to be recorded in area B0 is called 4x playback data for convenience sake. Likewise, signals to be recorded in areas A0 to A4 are called 18x playback data for convenience sake), and the count value sent from the counter 5, the data extractor 6a extracts variable-length code words constituting the 4x speed playback data to be transmitted. For determining the timing of extracting data, the number of decoded DCT coefficients sent from the counter 5 is compared with the coding amount control information received through the input terminal 36. The control is so made that the variable-length code words are transmitted up to the point when the number of the DCT coefficients reaches the coding amount control information. The demarcation between the variable-length code words is detected on the basis of coding length information sent from the variable-length decoder 4.

Similarly, the data extractor 6b extracts variable-length code words constituting the 18x speed playback data on the basis of the coding amount control information concerning the 18x speed playback data and the information sent from the counter 5 and variable-length decoder 4. The EOB appending circuits 7a and 7b appends an EOB code to the end of each DCT block of the extracted data, and the resultant data is then output through the output terminals 37a and 37b. The start of each DCT block is detected by the variable-length decoder 4, and supplied to the counter 5 and data extractors 6a and 6b.

The number of DCT coefficients for which data is extracted may be the same or different -From one recording mode to another, or from one speed multiplier to another. When the number of DCT coefficients extracted is different from one recording mode to another, or from one speed multiplier to another, the number of DCT blocks to be recorded in a special playback transport packet is different. The number of areas in which special playback data can be recorded is limited as mentioned above. If each of the special playback data recording areas for each of the special playback speeds is composed of the same number of sync blocks, increase in the number of recorded DCT coefficients per DCT block will be accompanied with increase in the special playback data recording areas, and hence increase in the length of the period (hereinafter referred to as refresh cycle) of updating the fast playback picture data during fast playback. The playback picture quality is increased with increase in the number of recorded DCT coefficients per DCT block. By contrast, when the number of recorded DCT coefficients per DCT block is decreased, the amount of each special playback data for one frame is decreased, and the special playback data recording area is reduced, and the refresh of the fast playback is shortened. The playback picture quality is poorer as the number of the recorded DCT coefficients is reduced. The recording mode, and the amount of data to be extracted for each recording mode, or each speed multiplier are determined through the trade-off between the length of the refresh cycle and the picture quality.

The 4x speed playback data and 18x speed playback data sent from the special playback data generator 12 are supplied to the 4x speed data generator 14 and 18x speed data generator 15, respectively. The subsequent processing is the same between the different playback speeds (4x and 18x speeds), so that the subsequent description is made only of the generation of 4x speed playback data. The operations of the 4x speed data generator 14 will be described with reference to FIG. 3. The 4x speed data generator 14 generates 4x speed playback transport packets in accordance with transport header information and various header information (including additional information) fed by the header analyzer 10 as well as the 4x speed playback data sent from the special playback data generator 12. The transport header information received through the input terminal 40 is modified by the transport header modifying circuit 42. Specifically, on the basis of the intra information from the header analyzing circuit 10, the header information indicating the continuity of transport packets and residing in a transport header of a transport packet carrying an intra picture is rewritten. The header appending circuit 43 appends header information representing a sequence header, picture header, slice header and the like as well as information (a coding mode flag, quantization table information, or the like) needed to decode special playback data and contained in the headers, to a special playback bit stream produced by the special playback data generator 12.

The special playback data with header information having been appended thereto is serial-to-parallel converted at the packeting circuit 44, into data in which one byte consists of eight bits. The data obtained by the serial-to-parallel conversion is divided into units of 184 bytes, whereby data parts of the transport packets are constructed. During the serial-to-parallel conversion, "0" data is inserted before each header information so that each header information will be fitted in four bytes as stipulated under the MPEG2 recommendations (each header information is composed of 32 bits, and when a transport packet is produced, a header of the transport packet must be fitted in four bytes of the transport packet). Specifically, when the header information extends over five bytes, "0" information is inserted in front of the header so that the header information will be fitted in the four bytes. The transport header information sent from the transport header modifying circuit 42 is appended to transport packet data of 184 bytes long which is constructed by the packeting circuit 44. The resultant data is then output. Reading of the header information from the transport header modifying circuit 42 is performed in accordance with a timing signal sent from the packeting circuit 44. The 4x speed playback data produced by the 4x speed data generator 14 is output in the form of transport packets to the second memory 16.

Description has been made on how to form transport packets of the 4x speed playback data. The same applies to 18x speed playback data. The 18x speed playback data sent from the special playback data generator 12 is supplied to the 18x speed data generator 15. In the 18x speed data generator 15, the header appending circuit 43 appends headers and additional information according to header information sent from the header analyzer 10. Thereafter, the packeting circuit 44 performs serial-to-parallel, conversion as mentioned above, to construct data parts of transport packets. The transport header appending circuit 45 then appends modified transport headers sent from the transport header modifying circuit 42. Finally, data is output in the form of transport packets to the third memory 17.

The special playback transport packets sent from the 4x speed data generator 14 and 18x speed data generator 15 are supplied to the second memory 16 and third memory 17, respectively. At this time, in the second memory 16 and third memory 17, a storage area is allocated to the special playback data constituting one frame according to the coding amount information sent from the record data controller 19. In the second and third memories 16 and 17, the input data is stored in the storage area in the form of transport packets. Thus, special playback data constituting one frame (or field) is constructed.

The special playback data constituting one frame, which is constructed in the second memory 16 and third memory 17 respectively, is read in units of two special playback transport packets in response to a data request signal sent from the data synthesizer 20, and then transformed into data of five sync blocks as shown in FIG. 13B, and the special playback data is supplied to the data synthesizer 20. At this time, header information H1 and H2 is appended as shown in FIG. 13B.

The transport packets received through the input terminal 1 are supplied to the first memory 13 and stored therein. The input data is read from the first memory 13 in response to a control signal (data request signal) sent from the data synthesizer 20. At this time, the data fed in units of two transport packets is transformed into data for five sync blocks as shown in FIG. 13B. In the same way as the special playback data, the header information H1 and H2 are appended, when the sync block data is output from the first memory 13.

The data synthesizer 20 produces record data formats in response to a control signal sent from the recording timing signal generator 56. The operations for producing record data format will be described below. Responsive to the recording mode supplied from the recording mode setting circuit 55, the recording timing signal generator 56, supplies the data synthesizer 20, with the number of repetitions of special playback data, and a track identification signal and track number for identifying one of a group of four tracks. Based on the number of data repetitions, the data synthesizer 20 sets the number of repetitions for each of 4x speed playback data and 18x speed playback data. On the basis of a reference signal for controlling the rotation phase of the rotary drum 25 and sent from the servo system reference signal generator 58 as well as the recording mode, the recording timing signal generator 56 outputs a data generation start signal to each of the data synthesizer 20 and error-correction encoder 22. FIGS. 9A to 9M show waveforms of control signals sent from the recording timing signal generator 56 in various recording modes.

FIG. 9A shows a reference signal for controlling the rotation phase of the rotary drum 25 and sent from the servo system reference signal generator 58. FIG. 9B shows a data generation start signal for the 25 Mbps recording mode. FIG. 9C shows a data recording timing signal supplied to the recording amplifiers 24a and 24b in the 25 Mbps recording mode. (Actually, the recording timing signal supplied to the recording amplifier 24b lags behind the recording timing signal supplied to the recording amplifier 24a by a time corresponding to a distance between the rotary heads (normally, about five sync blocks.) FIG. 9D shows the data recording timings of respective channels in the 25 Mbps recording mode. As illustrated, in the 25 Mbps recording mode, various control signals are output every rotation of the rotary drum 25, and data is recorded on the magnetic tape.

FIG. 9E shows a data generation start signal for the 12.5 Mbps recording mode. FIG. 9F shows a data recording timing signal supplied to the recording amplifiers 24a and 24b in the 12.5 Mbps recording mode. FIG. 9G shows the recording data timing of respective channels in the 12.5 Mbps recording mode. As illustrated, in the 12.5 Mbps recording mode, various control signals are output every two rotations of the rotary drum 25, and data is recorded on the magnetic tape.

FIG. 9H shows a data generation start signal for the 8.33 Mbps recording mode. FIG. 9I shows a data recording timing signal supplied to the recording amplifiers 24a and 24b in the 8.33 Mbps recording mode. FIG. 9J shows the recording data timing of respective channels in the 8.33 Mbps recording mode. As illustrated, in the 8.33 Mbps recording mode, various control signals are output every three rotations of the rotary drum 25, and data is recorded on the magnetic tape.

FIG. 9K shows a data generation start signal for the 6.25 Mbps recording mode. FIG. 9L shows a a data recording timing signal supplied to the recording amplifiers 24a and 24b in the 6.25 Mbps recording mode. FIG. 9M shows the recording data timing of respective channels in the 6.25 Mbps recording mode. As illustrated, in the 6.5 Mbps recording mode, various control signals are output every four rotations of the rotary drum 25, and data is recorded on the magnetic tape. (In reality, as mentioned above, the recording timing signal to supplied to the recording amplifier 24b lags behind the recording timing signal supplied to the recording amplifier 24a by a time corresponding to a distance between the rotary heads (normally, about five sync blocks).)

The data synthesizer 20 produces record data formats in accordance with the control signals. First, when a data generation start signal is input, the type of the special playback data to be recorded on a track of each channel and areas in which the special playback data is recorded are set on the basis of a track number of the track which is recorded next and a track identification number within one track format. At this time, the number of repetitions of the special playback data to be reproduced at each speed is checked. If the special playback data has been repeatedly recorded a given number of times, a data request signal indicating that the next special playback data should be read from the memory containing special playback data is output.

To be more specific, when the 18x speed playback data has been recorded repeatedly eighteen times in the 25 Mbps recording mode, a data request signal indicating that the next special playback data in the amount of 25 sync blocks should be output is supplied to the third memory 27. The 25 sync blocks of 18x speed playback data, read from the third memory 17, is temporarily stored in the 18x speed playback data memory provided in the data synthesizer 20. Likewise, when the 4x speed playback data has been recorded repeatedly twice in the 25 Mbps recording mode, a data request signal indicating that the next special playback data in the amount of 25 sync blocks should be output is supplied to the second memory 16. The 25 sync blocks of 4x speed playback data, read from the second memory 16 is temporarily stored in the 4x speed playback data memory provided in the data synthesizer 20. When the number of repetitions is not larger than a given number, the record data is produced using special playback data for each speed and stored in the data synthesizer 20. The same applies to the other recording modes. However, the number of repetitions for each special playback data varies depending on the recording mode.

When the checking of the number of repetitions of each special playback data is completed, data arrangement on one track is set according to the track identification signals. The track identification signals are identification signals for identifying the tracks T1 to T4 shown in FIG. 15. In the first embodiment, data is recorded on two tracks substantially simultaneously. The track identification signal therefore indicates either of the track T1 to T3. First, data arrangement on a track recorded by the rotary head 26a is set. When the data arrangement on a track is set, special playback data for each speed is read in sync block units from the first memory 13 and data synthesizer 20, and record data for one track is thus produced and then output to the fourth memory 21. When the generation of the record data for one track, to be recorded by the rotary head 26a is completed, generation of data for one track to be recorded by the rotary head 26a is conducted in the same manner.

The record data for two tracks, which has been generated by the data synthesizer 20, is temporarily stored in the fourth memory 21. Error-correcting codes conforming to the SD standards is then generated by the error-correction encoder 22 and appended to the record data of each channel stored in the fourth memory 21. The error-correction encoder 22 (See FIGS. 10A and 10B) outputs a reading control signal to the fourth memory 21, so that the data for two tracks and having the error-correction codes appended will be read substantially simultaneously in response to a data generation start signal sent from the recording timing generator 56. In response to the reading control signal, the record data for one track of each channel is read from the fourth memory 21. At this time, track formats conforming to the SD standards are generated. Specifically, a spacing of five bytes long is interposed between sync blocks to permit a sync signal and ID signal to be appended. Moreover, an ITI area and subcode area are preserved and a given gap is interposed between data. The rearranged data is then output. The output of the fourth memory 21 is supplied to the digital modulators 23a and 23b.

The digital modulators 23a and 23b append a sync signal and ID signal to the start of each sync block. In the First embodiment, the identification signal indicating the recording mode is recorded as the ID signal. The data with the ID signal appended is modulated digitally and supplied to the recording amplifiers 24a and 24. The digital modulation is achieved on the basis of the track identification information sent from the recording timing signal generator 56. The digitally-modulated data fed to the recording amplifiers 24a and 24b is amplified and recorded on the magnetic tape by means of the rotary heads 26a and 26b.

Next, the operations of the servo system will be described. The reference signal used to control the rotary drum 25 and sent from the servo system reference signal generator 58 is supplied to the drum motor controller 27. The drum motor controller 27 controls the drum motor according to the reference signal and the rotation phase information concerning the rotary heads 26a and 26b which is output from the drum motor 28, so that the drum motor rotates at 9000 rpm. The drum motor 28 is driven by a driving voltage applied by the drum motor controller 27. The rotation phase of the rotary drum 25 is supplied from the drum motor 28 to the drum motor controller 27.

Similarly, the capstan motor controller 29 controls the capstan motor 30 according to the reference signal used to control the rotary drum 25, the recording mode, and the rotation information (information on the travel speed of the magnetic tape) concerning the capstan motor which is output from the capstan motor 30. The travel speeds of the magnetic tape for the respective recording modes are shown in FIG. 7. That is, control is so made that, if the travel speed in the 25 Mbps recording mode is assumed to be 1, the speed in the 12.5 Mbps recording mode is ½, the speed in the 8.33 Mbps recording mode is ⅓, and the speed in the 6.5 Mbps recording mode is ¼. The capstan motor controller 29 outputs the driving voltage for use in driving the capstan motor 30 on the basis of the reference signal used to control the rotary drum 25 and the rotation information concerning the capstan motor, so that the tape travel speed will be set as mentioned above in accordance with the specific recording mode. The rotation information of the capstan motor is supplied from the capstan motor 30 to the capstan motor controller 29.

Figure 21:
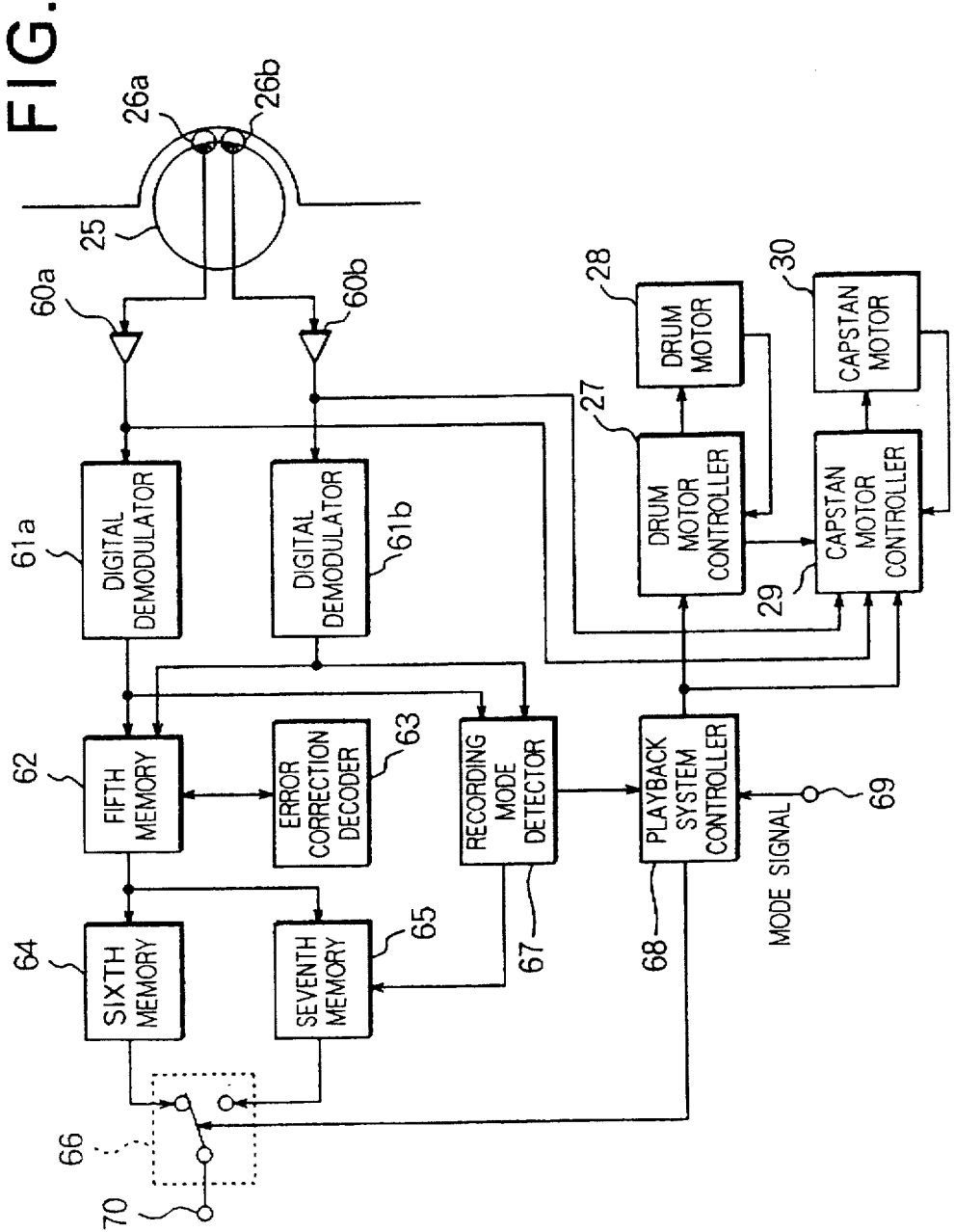
FIG. 21 is a block circuit diagram showing the playback system in a digital VTR of the first embodiment.

Next, description will be made of the configuration of a playback system of a digital VTR for reproducing data from the magnetic tape on which data is recorded according to the aforesaid recording format. FIG. 21 is a block diagram showing the configuration of the playback system of this embodiment. Components bearing the same reference numerals as those in FIG. 1 are of the same configuration and operations. In FIG. 21, reference numerals 60a and 60b denote playback amplifiers. Reference numerals 61a and 61b denote digital demodulators. Reference numeral 62 denotes a fifth memory. Reference numeral 63 denotes an error-correction decoder for correcting or detecting errors in a playback digital signal, using C1 and C2 check codes. Reference numeral 64 denotes a sixth memory for storing a playback digital signal for normal playback. Reference numeral 65 denotes a seventh memory for storing special playback data. 66 denotes a switch for selecting an output of the sixth memory 64 or an output of the seventh memory 65 according to a select signal sent from a playback system controller 68 that will be described later. Reference numeral 67 denotes a recording mode detector for detecting the recording mode, in which data was recorded, from the digitally demodulated playback digital signal. Reference numeral 68 denotes a playback system controller for producing a reference signal used to control the drum motor 28 and capstan motor 30 on the basis of the mode signal received through an input terminal 69 and the detected recording mode, and for outputting a select signal to the switch 66. Reference numeral 69 denotes an input terminal through which a mode signal is input. Reference numeral 70 denotes an output terminal.

Prior to describing the operations of the playback system, the operations of the digital VTR in the first embodiment for fast playback using 4x speed playback data (data recorded in area B) will be described. Fast playback using 4x playback data is shown in FIG. 20, wherein both the travel speed of the magnetic tape and the phases of the rotary heads 26a and 26a are controlled.

Figure 22:
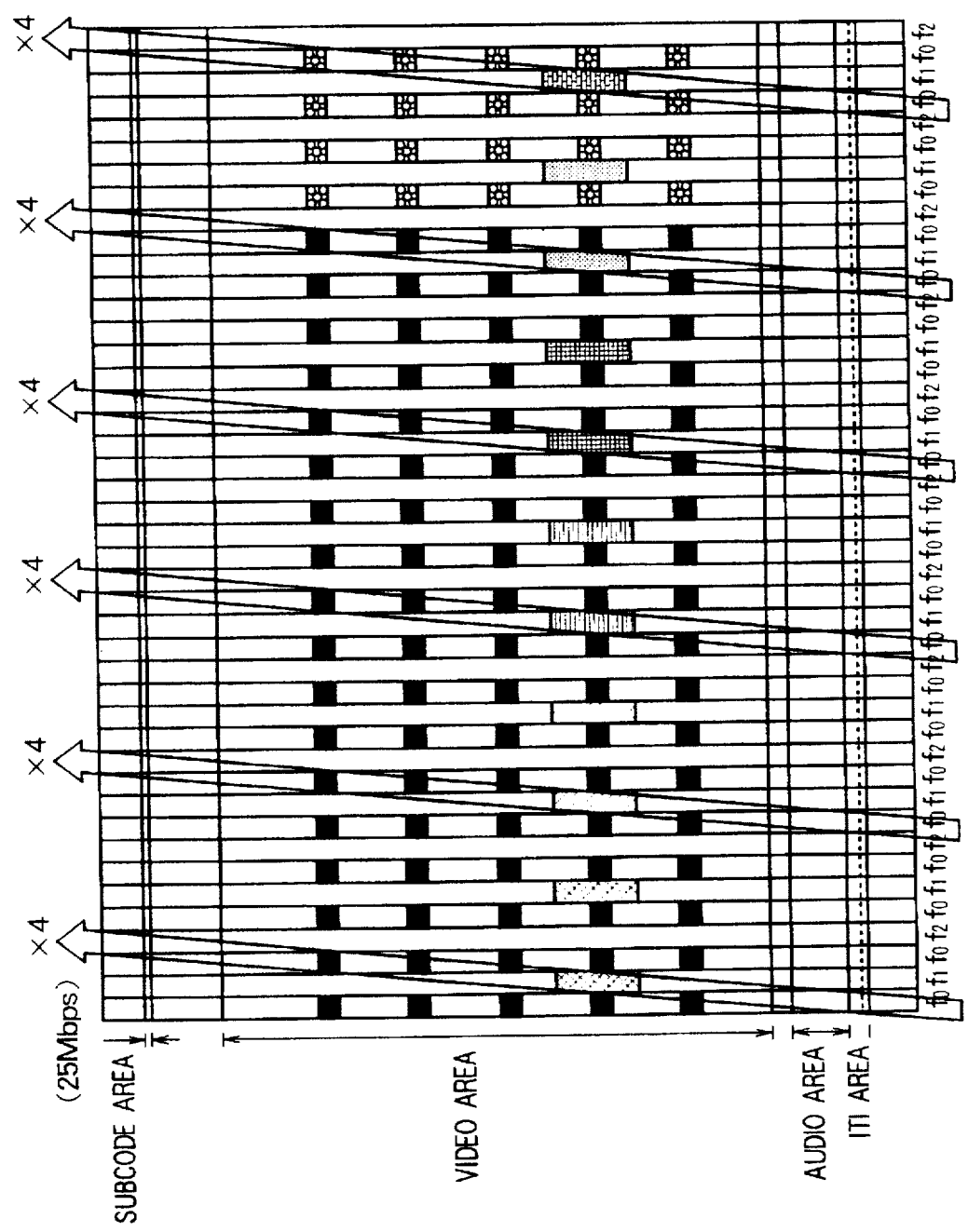
FIG. 22 shows the relationship between the scanning traces of a rotary head for the case when a magnetic tape having been recorded in the 25 Mbps recording mode in accordance with an embodiment of the present invention is reproduced at a 4x speed, and a track pattern.

FIG. 22 shows the scanning traces by the rotary head 26b when data recorded in the 25 Mbps recording mode is reproduced from the magnetic tape at a 4x speed. As illustrated, when data is recorded in the 25 Mbps recording mode, as described previously, the 4x speed playback data is recorded in channel-B tracks. As described previously, the same data is recorded repeatedly for two track formats (the same data is recorded in two recording areas). When the phase of the rotary head 26b is controlled so that the rotary head 26b will provide a maximum playback output at the center of area B0, the whole of the 4x speed playback data can be reproduced as shown in FIG. 22. When data recorded in tile 25 Mbps recording mode is reproduced from the magnetic tape at the 4x speed, as shown in FIG. 22, the rotary head 27b can reproduce data from a subcode area. Moreover, tracking can be controlled at an ITI area.

Figure 23:
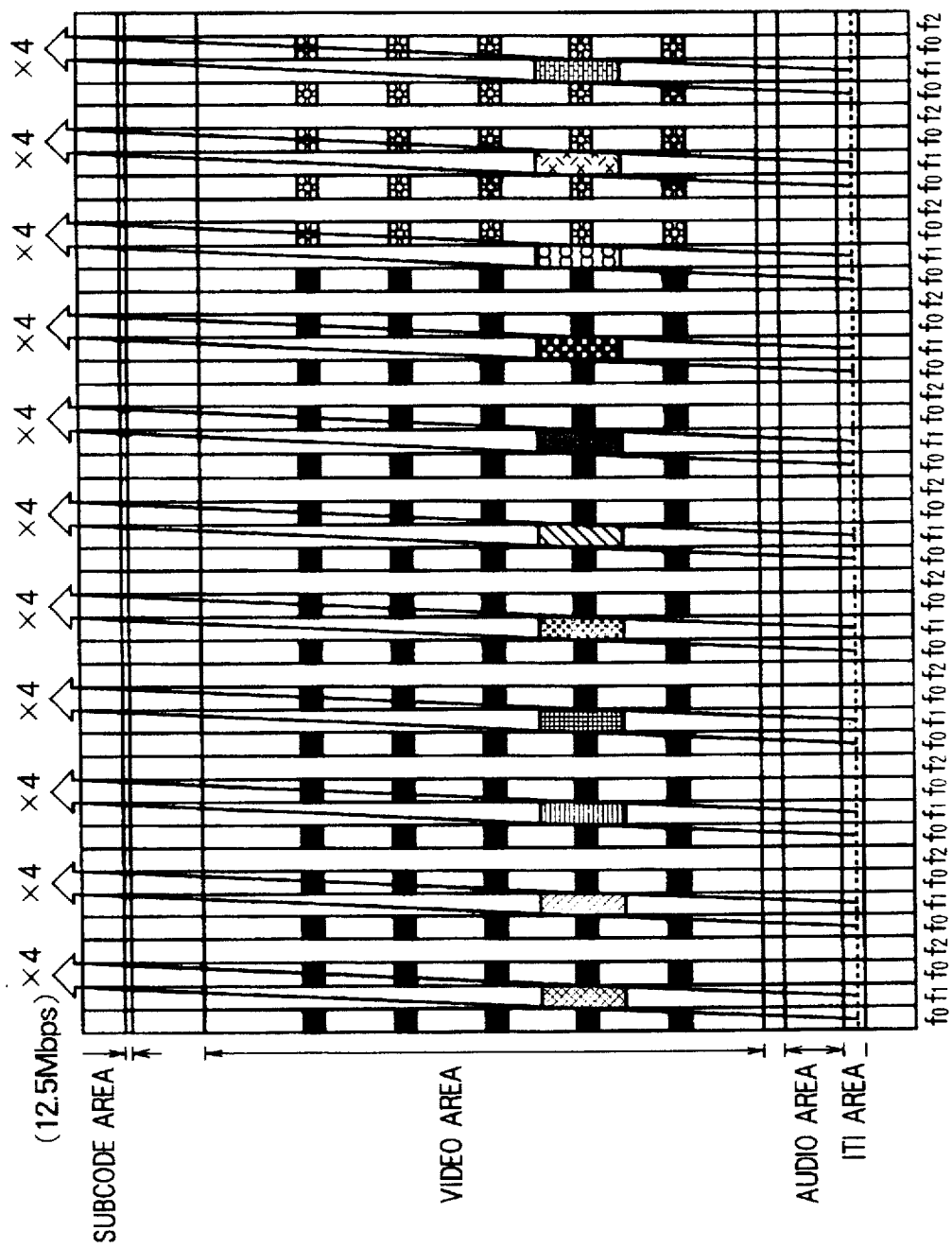
FIG. 23 shows the relationship between the scanning traces of a rotary head for the case when a magnetic tape having been recorded in the 12.5 Mbps recording mode in accordance with an embodiment of the present invention is reproduced at a 4x speed, and a track pattern.

FIG. 23 shows the scanning traces by the rotary head 26a when data recorded in the 12.5 Mbps recording mode is reproduced from the magnetic tape at a 4x speed. As illustrated, when data is recorded in the 12.5 Mbps recording mode, as described previously, the 4x speed playback data is different from track format to another. When the phase of the rotary head 26a is controlled so that the rotary head 26b will provide a maximum playback output at the center of area B0, the whole of 4x speed playback data can be reproduced as shown in FIG. 23.

Figure 24:
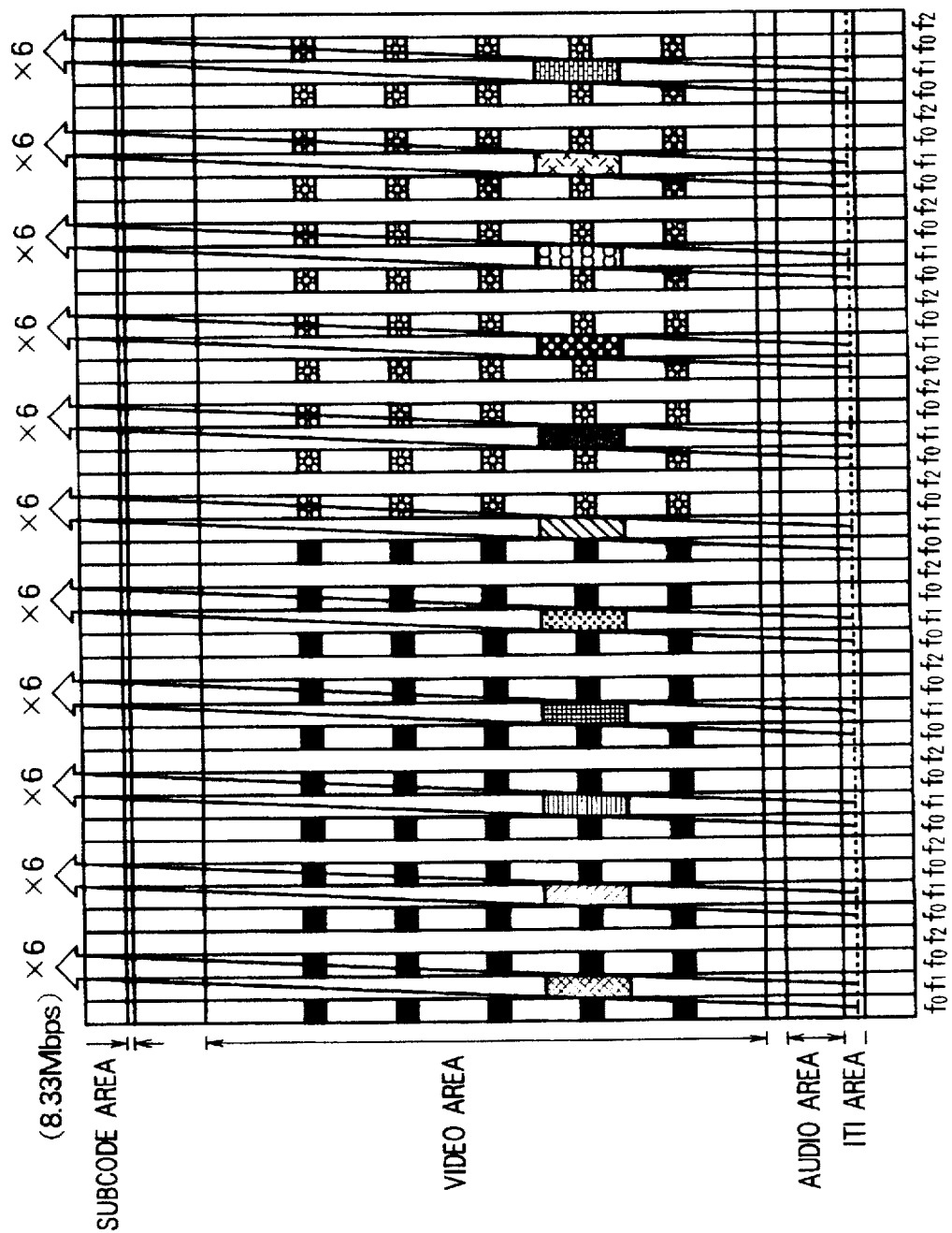
FIG. 24 shows the relationship between the scanning traces of a rotary head for the case when a magnetic tape having been recorded in the 8.33 Mbps recording mode in accordance with an embodiment of the present invention is reproduced at a 6x speed, and a track pattern.

FIG. 24 shows the scanning traces by the rotary head 26a when data recorded in the 8.33 Mbps recording mode is reproduced from the magnetic tape at a 6x speed. As illustrated, when data is recorded in the 8.33 Mbps recording mode, as described previously, the 4x speed playback data is different from one track format to another. When the phase of the rotary head 26a is controlled so that the rotary head 26a will provide a maximum playback output at the center of area B0, the whole of 4x speed playback data can be reproduced as shown in FIG. 24.

Figure 25:
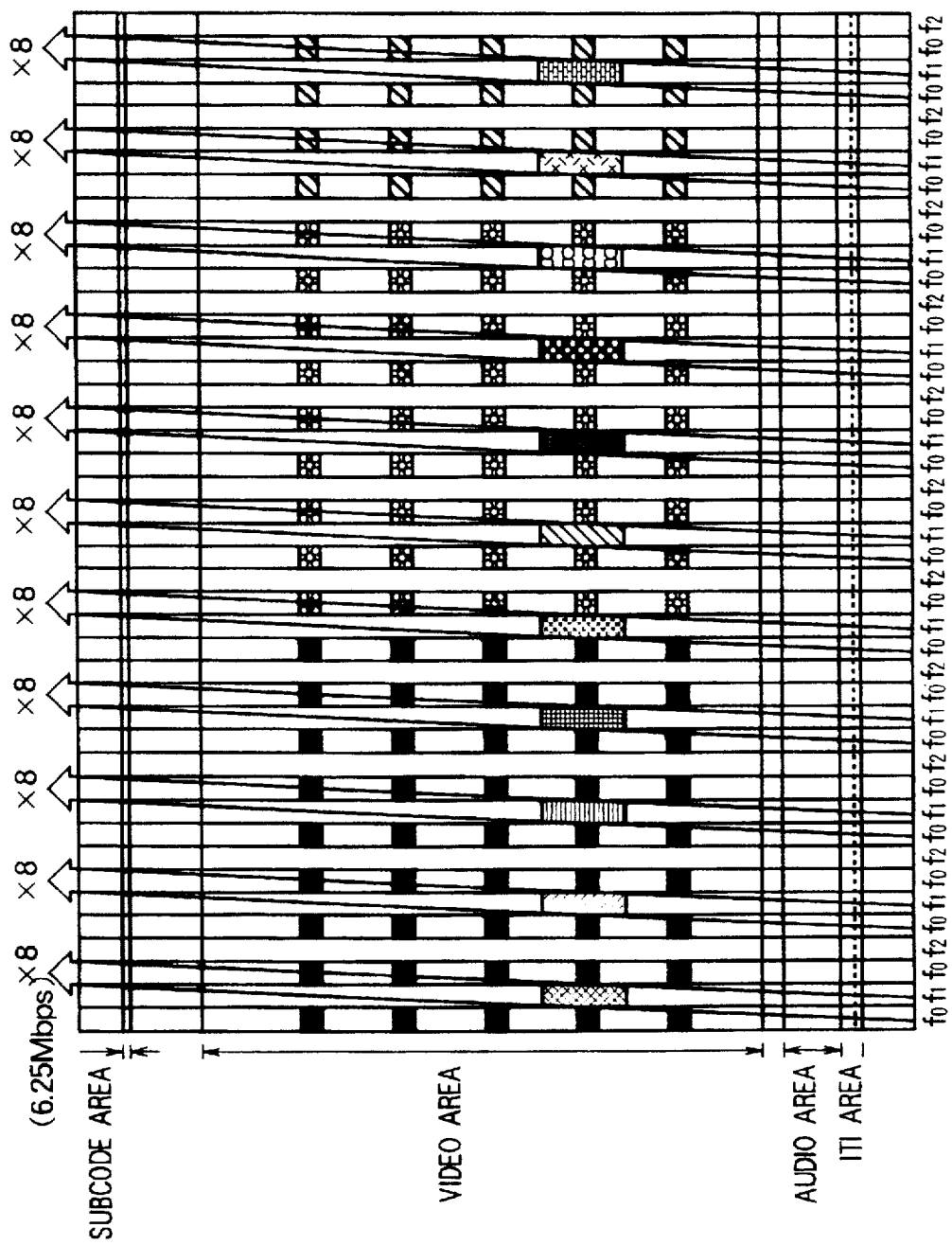
FIG. 25 shows the relationship between the scanning traces of a rotary head for the case when a magnetic tape having been recorded in the 6.5 Mbps recording mode in accordance with an embodiment of the present invention is reproduced at a 8x speed, and a track pattern.

FIG. 25 shows the scanning traces by the rotary head 26a when data recorded in the 6.5 Mbps recording mode is reproduced from the magnetic tape at an 8x speed. As illustrated, when data is recorded in the 6.5 Mbps recording mode, as described previously, the 4x speed playback data is different from one track format to another. When the phase of the rotary head 26a is controlled so that the rotary head 26a will provide a maximum playback output at the center of area B0, the whole of the 4x speed playback data can be reproduced as shown in FIG. 25.

Figure 26:
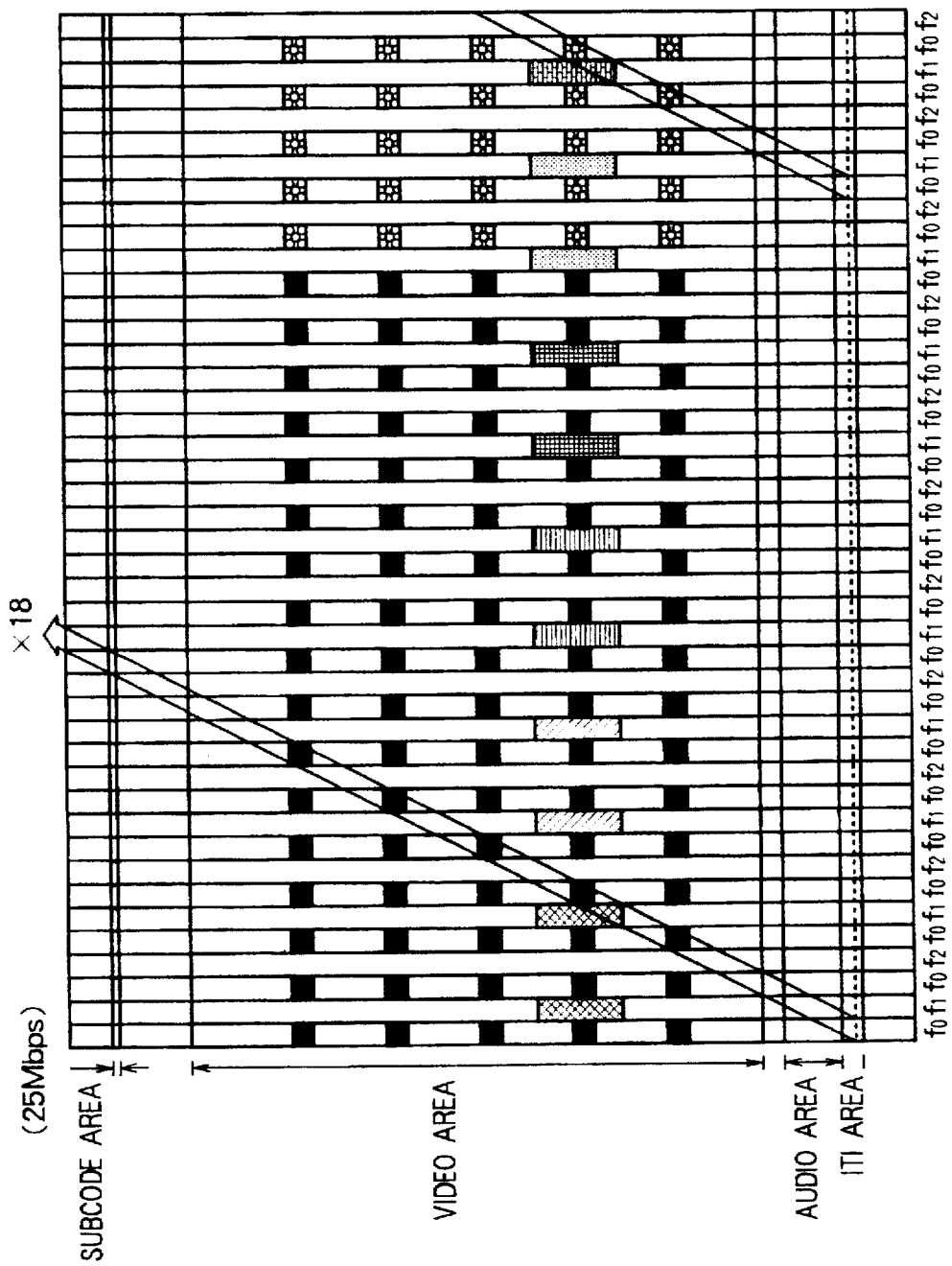
FIG. 26 shows the relationship between the scanning traces of a rotary head for the case when a magnetic tape having been recorded in the 25 Mbps recording mode in accordance with an embodiment of the present invention is reproduced at a 18x speed, and a track pattern.

Next, the operations of the digital VTR in the first embodiment for performing fast playback using the 18x speed playback data (data recorded in areas A0 to A4) will be described with reference to FIGS. 26 to 29. In fast playback using the 18x speed playback data recorded in the 25 Mbps recording mode, as shown in FIG. 20, both the travel speed of the magnetic tape and the phases of the rotary heads 26a and 26b are controlled. When data recorded in any other recording mode is reproduced, only the travel speed of the magnetic tape is controlled. FIG. 26 shows the scanning traces by the rotary head 26a when data recorded in the 25 Mbps recording mode is reproduced from the magnetic tape at an 18x speed. As illustrated, when data is recorded in the 25 Mbps recording mode, as described previously, the 18x speed playback data is recorded on tracks of channel A. As described previously, the same data is recorded repeatedly for nine track formats (the same data is recorded on eighteen tracks). The whole of the 18x speed playback data can therefore be reproduced as shown in FIG. 26. When data recorded in the 25 Mbps recording mode is reproduced from the magnetic tape at the 18x speed, as shown in FIG. 26, the rotary head 26a can reproduce data from a subcode area. Moreover, tracking can be controlled at an ITI area.

Figure 30:
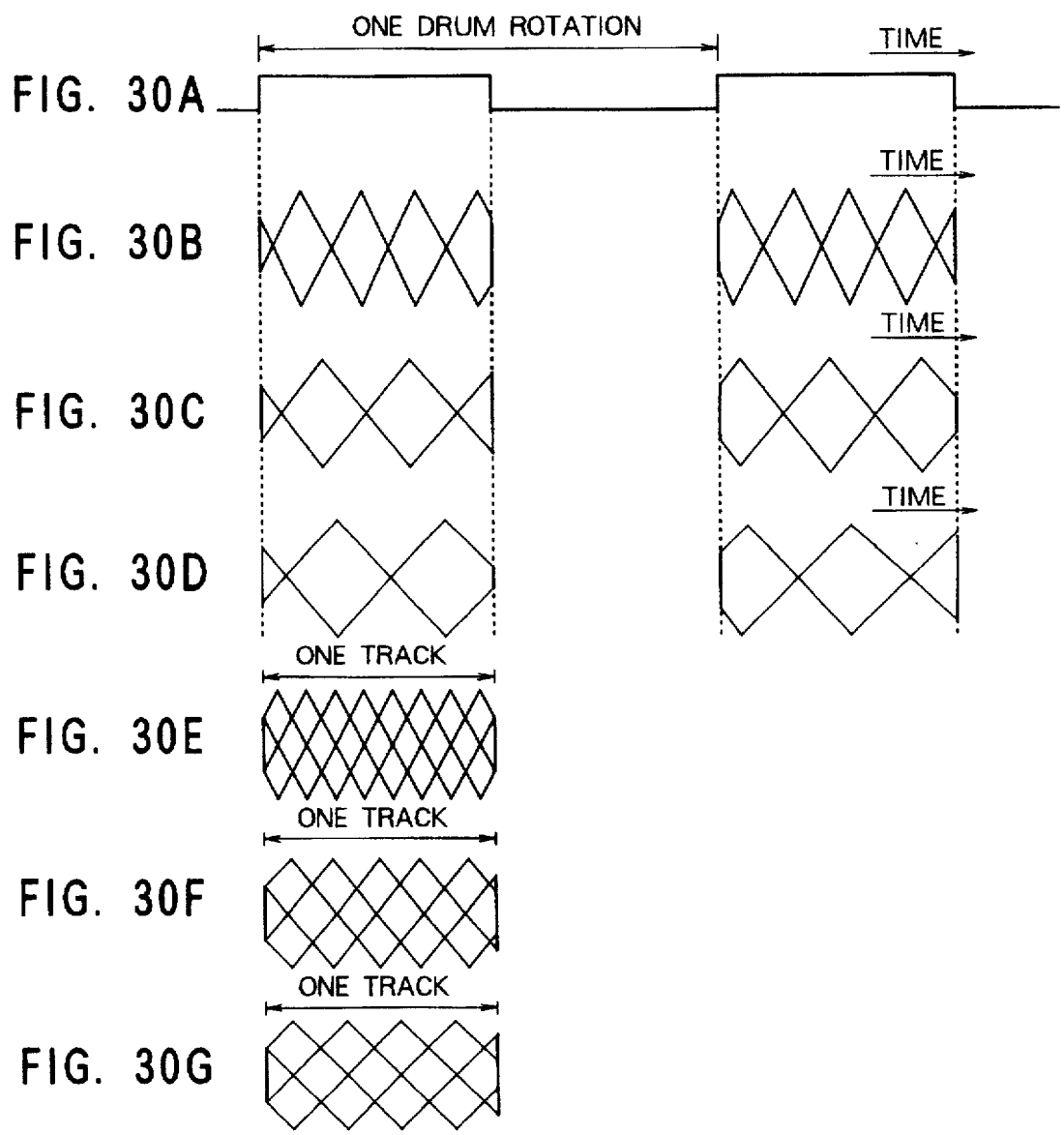
FIGS. 30A to 30G show output patterns off the playback signal reproduced by the rotary head when fast playback performed by means of speed control only, using a magnetic tape recorded in the 12.5 Mbps, 8.33 Mbps and 6.5 Mbps recording modes in embodiments of the invention.

The operations for reproducing data recorded in the recording modes other than the 25 Mbps recording mode will be described below. FIGS. 30A to 30G Shows output patterns of the playback signal sent from the rotary head 26a when data recorded in the 12.5 Mbps, 8.33 Mbps, and 6.5 Mbps recording modes is reproduced from the magnetic tape in fast playback mode (from areas A0 to A4). FIG. 30A shows the rotation phase of the rotary drum 25. FIG. 303 shows an output pattern of a playback signal sent from the rotary head 26a when data recorded in the 12.5 Mbps recording mode is reproduced at a 17x speed. FIG. 30C shows an output pattern of a playback signal sent from the rotary head 26a when data recorded in the 8.33 Mbps recording mode is reproduced at a 16.5x speed. FIG. 30D shows an output pattern of a playback signal sent from the rotary head 26a when data recorded in the 6.5 Mbps recording mode is reproduced at an 18x speed.

FIG. 30E shows data produced by synthesizing playback signals sent from the rotary head 26a for two rotations of the rotary drum 25 when data recorded in the 12.5 Mbps recording mode is reproduced at a 17x speed. FIG. 30F shows data produced by synthesizing playback signals sent from the rotary head 26a for two rotations of the rotary drum 25 when data recorded in the 8.33 Mbps recording mode is reproduced at a 16.5x speed. FIG. 30G shows data produced by synthesizing playback signals sent from the rotary head 26a for two rotations of the rotary drum 25 when data recorded in the 6.5 Mbps recording mode is reproduced at an 18x speed. As will be seen from FIGS. 30E to 30G, if the travel speed of the magnetic tape is set as mentioned above, data for all sync block addresses on one track can be reproduced by synthesizing data recorded in any recording mode and acquired by the rotary head 26a during two scanning periods (data to be reproduced do not have the same track address).

In general, for reproducing data recorded in the 12.5 Mbps recording mode, the tape travel speed should be set to a $\pm(2*N+1)x$ speed. However, when special playback data is produced and recorded in predetermined areas on the magnetic tape as described previously, if the number of repetitions (number of tracks) of the special playback data is M (tracks) (according to the recording format of the first embodiment, M equals to seventeen. For 4x speed playback data, M equals to one), since the special playback data is produced by synthesizing data acquired by the rotary head 26a during two scanning periods, an N value should be determined so that the condition $2*(2*N+1)\leq M*2$ is satisfied. The condition $(2*N+1)$ means that the rotary head 26a scans a trace with the azimuth thereof being opposite to that of the trace which the rotary head 26a scanned one rotation of the rotary drum before. Accordingly, data that has not been reproduced because of the azimuth effect during the previous scan can be reproduced (See FIG. 27). N denotes a positive integer.

Similarly, for reproducing data recorded in the 8.33 Mbps recording mode, the tape travel speed should be set to a $\pm(3*N+3/2)x$ speed. However, when special playback data is produced and recorded in predetermined areas on the magnetic tape as mentioned above, if the number of repetitions (the number of tracks) of special playback data is M (according to the recording format of the first embodiment, M equals to eleven), since the special playback data is produced by synthesizing the data acquired by the rotary head 26a during two scanning periods, an N value should be determined so that the condition $2*(3*N+3/2)\leq M*3$ is satisfied. The condition $(3*N+3/2)$ means that the rotary head 26a scans a trace with the azimuth being opposite to that of the trace which the rotary head 26a scanned one rotation of the rotary drum before (See FIG. 28). N denotes a positive integer.

Similarly, for reproducing data recorded in the 6.25 Mbps recording mode, the tape travel speed should be set to a $\pm(4*N+2)x$ speed. However, when special playback data is produced and recorded in predetermined areas on the magnetic tape as mentioned above, when the number of repetitions (the number of tracks) of the special playback data is M (according to the recording format of the first embodiment, M equals to nine), since the special playback data is produced by synthesizing data acquired by the rotary head 26a during two scanning periods, an N value should be determined so that the condition $2*(4*N+2)\leq M*4$ is satisfied. The condition $(4*N+2)$ means that the rotary head 26a scans a trace with the azimuth being opposite to that of the trace which the rotary head 26a scanned one rotation of the rotary drum before (See FIG. 29). N denotes a positive integer.

In general, according to a recording system in which the magnetic tape is fed at a 1/K speed (K being an integer of not less than one) of a tape travel speed for the standard mode, and data is recorded once on the magnetic tape every K rotations of the rotary drum, when fast playback is performed while conducting speed control alone, the tape travel speed should be set to a $\pm K*(N+\frac{1}{2})x$ speed. However, special playback data is produced and recorded in predetermined areas on the magnetic tape as mentioned above, when the number of repetitions (the number of tracks) of the special playback data is M, since the special playback data is produced by synthesizing data acquired by the rotary head during two scanning periods, an N value should be determined so that the condition $2*\{K*(N+\frac{1}{2})\}\leq M*K$ is satisfied. The condition $K*(N+\frac{1}{2})$ means that the rotary head 26 scans a trace with the azimuth thereof being opposite to that of the trace which the rotary head scanned one rotation of the rotary drum before. Here, N denotes an integer.

Figure 27:
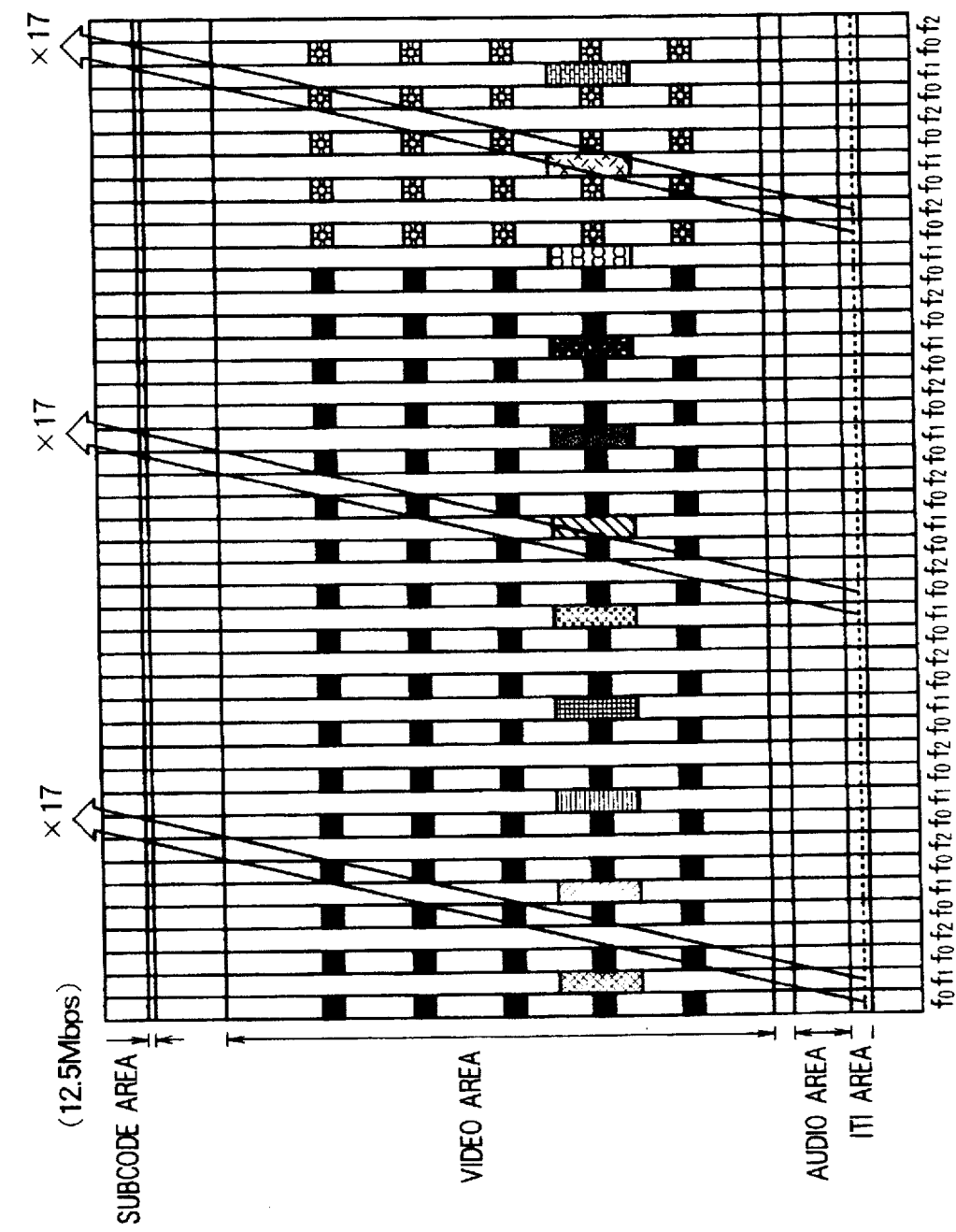
FIG. 27 shows the relationship between the scanning traces of a rotary head for the case when a magnetic tape having been recorded in the 12.5 Mbps recording mode in accordance with an embodiment of the present invention reproduced at a 17x speed, and a track pattern.
Figure 28:
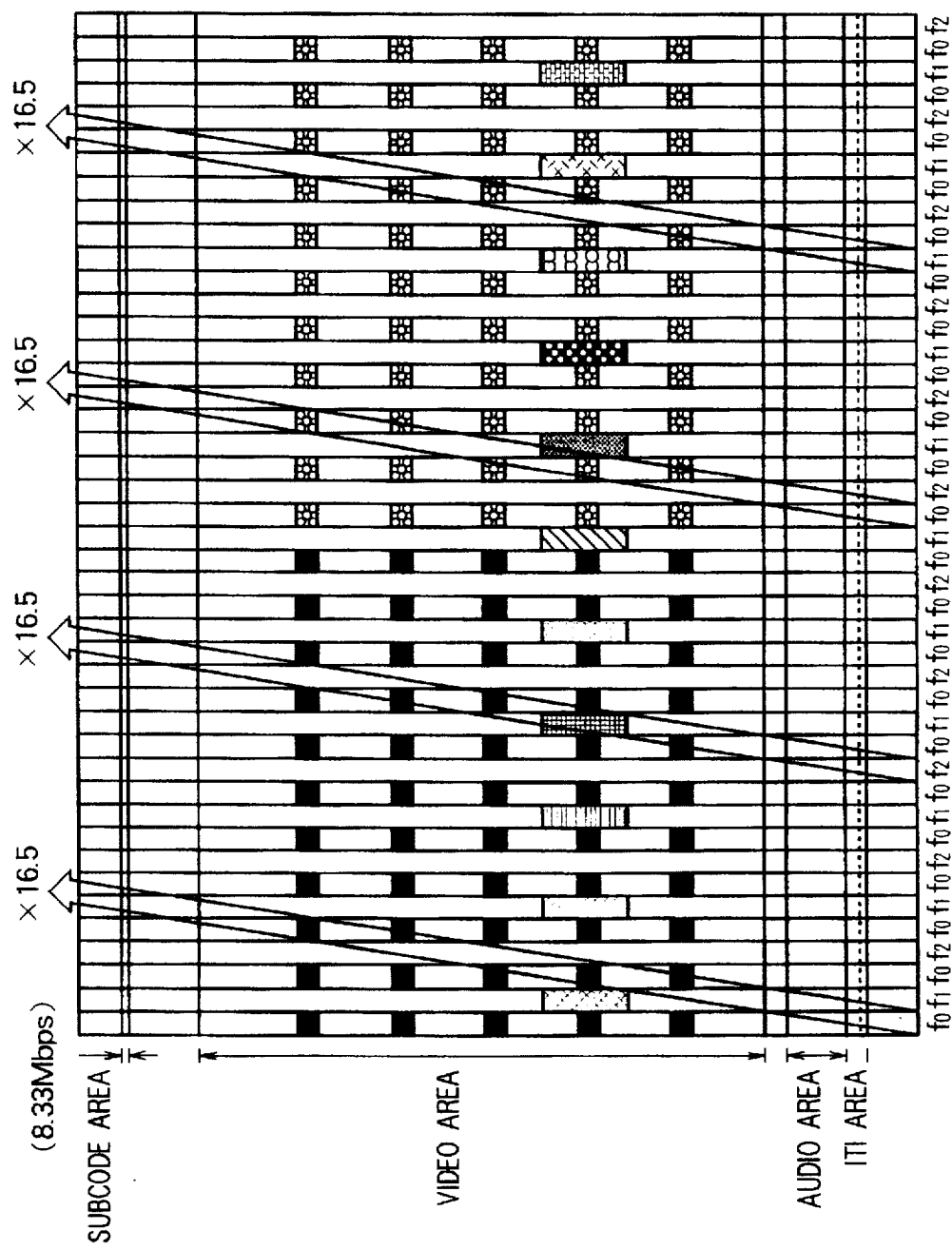
FIG. 28 shows the relationship between the scanning traces of a rotary head for the case when a magnetic tape having been recorded in the 8.33 Mbps recording mode in accordance with an embodiment of the present invention reproduced at a 16.5x speed, and a track pattern.
Figure 29:
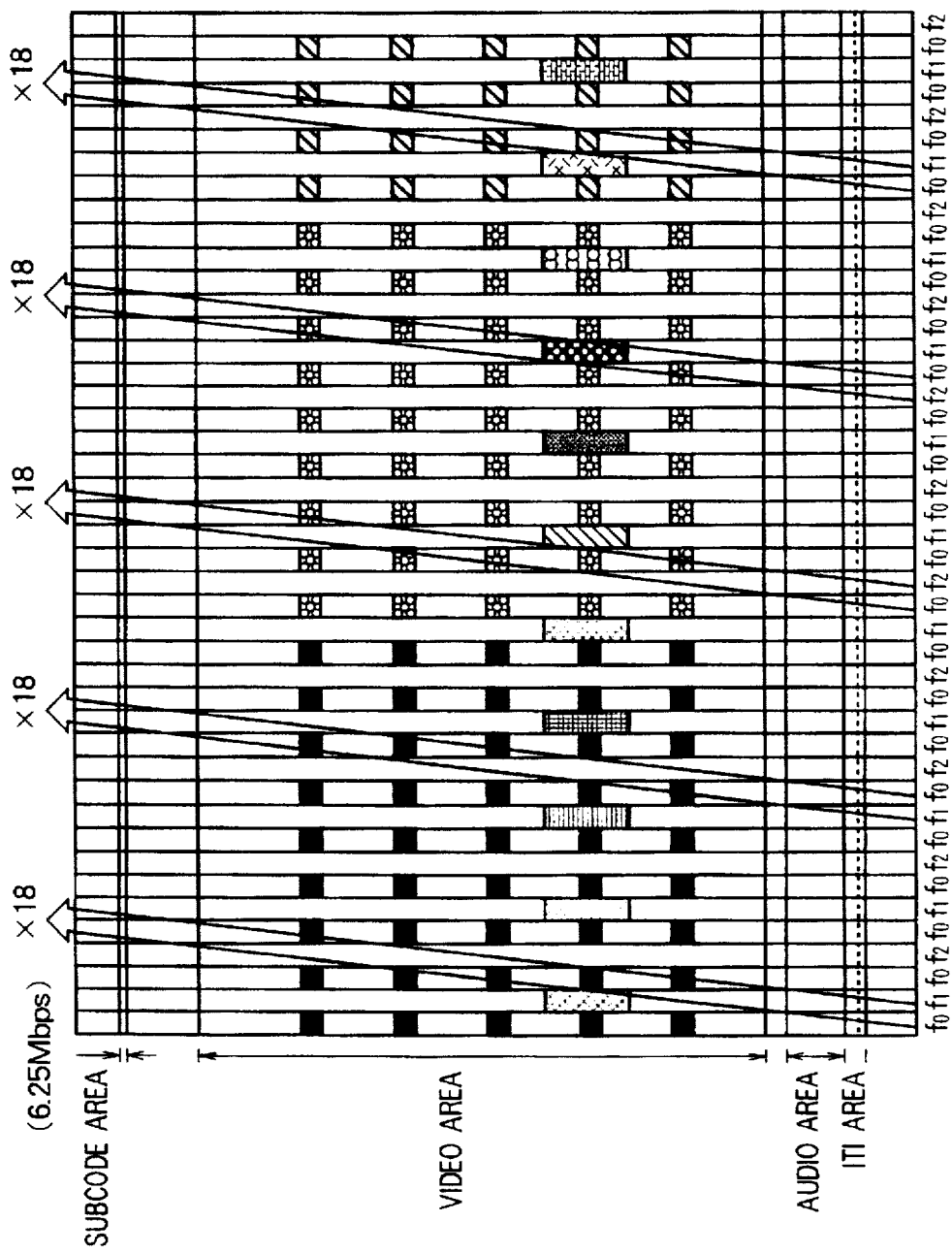
FIG. 29 shows the relationship between the scanning traces of a rotary head for the case when a magnetic tape having been recorded in the 6.5 Mbps recording mode in accordance with an embodiment of the present invention is reproduced at a 18x speed, and a track pattern.

In consideration of what has been described above, fast playback in which 18x speed playback data recorded in 12.5, 8.33, or 6.5 Mbps recording mode (data recorded in areas A0 to A4) is reproduced will be described. FIG. 27 shows the scanning traces followed by the rotary head 26a when data recorded in the 12.5 Mbps recording mode is reproduced from the magnetic tape at a 17x speed. As shown in FIG. 20, in any recording mode other than the 25 Mbps recording mode, only the travel speed of the magnetic tape is controlled and the phase of the rotary drum 25 is not controlled. As illustrated, when data is recorded in the 12.5 Mbps recording mode, 18x speed playback data is recorded in areas A0 to A4 in cycles of 8.5 track formats. When the magnetic tape is made to travel at the 17x speed, a playback signal shown in FIG. 30B is acquired. FIG. 30E shows a synthetic signal produced by synthesizing playback signals, which is depicted in FIG. 30B and acquired during two rotations off the rotary drum 25. Assuming that data which are not smaller than −6 dB can be acquired as in the prior art, data for all the sync blocks can be reproduced. This means that the whole data recorded in areas A0 to A4 can be reproduced. FIG. 28 and FIGS. 30C and 30F show the case of the 8.33 Mbps recording mode (16.5x playback speed), and FIG. 29 and FIGS. 30D and 30G show the case of the 6.5 M bps recording mode (18x playback speed). As illustrated, in either case, all the data (sync blocks) recorded in areas A0 to A4 can be reproduced.

When data is recorded in the 25 Mbps recording mode, tracking in fast playback can be applied at an ITI. However, for 18x speed playback, for example, the tracking phase of a rotary head may be detected and controlled either in one of special playback data recording areas or in a plurality of special playback data recording areas. For 4x speed playback, the tracking phase of the rotary head 27a may be detected and controlled at a given position on an adjacent track A. Moreover, it may be so arranged that rough adjustment of the tracking phase is made at the ITI areas, and fine adjustment is made at the special playback areas. This tracking control method is effective especially in compatible playback (playback by means of a device compatible with the device used for recording).

Next, the operations of the playback system in normal playback mode will be described. The signal reproduced from the magnetic tape by the rotary heads 26a and 26b on the drum 25 is amplified by the playback amplifiers 60a and 60b and then supplied to the digital demodulators 61a and 61b. The output of the playback amplifier 60a is also supplied to the capstan motor controller 29. The digital demodulators 61a and 61b detect data in the input playback data, converts it into playback digital data, and then digitally demodulates it. An ID signal appended to the start of each sync block data is detected by the digital demodulators 61a and 61b. The playback digital data digitally demodulated by the digital demodulators 61a and 61b is supplied to the fifth memory 62. In the fifth memory 62, the playback digital data for one track is collected to structure an error-correcting code block shown in FIGS. 10A and 10B. When structuring of the error-correcting code block shown in FIGS. 10A and 10B is completed, the error-correction decoder 63 uses the C1 check code and C2 check code to correct or detect errors occurring during playback.

The playback digital data whose errors have been corrected by the error-correction decoder 63 is read from the fifth memory 62 and supplied to the sixth memory 64 and seventh memory 65. At this time, special playback data (4x speed playback data and 18x speed playback data) reproduced from the special playback data recording areas are supplied to the seventh memory 65, while playback digital data for normal playback is supplied to the sixth memory 64.

The ID signals detected by the digital demodulators 61a and 61b are supplied to the recording mode detector 67. The recording mode detector 67 identifies the recording mode, in which data has been recorded, from the reproduced ID signals. The playback system controller 68 identifies the playback mode set for the digital VTR on the basis of the mode signal received through the input terminal 69. When the input mode signal indicates the normal playback mode, the playback system controller 68 supplies a reference signal for the rotation phase of the rotary drum 25, to the drum motor controller 27, and supplies tape travel speed information to the capstan motor controller 29 according to the result of the identification of the recording mode separated from the ID signals.

The switch 66 selects the output of the sixth memory 64 for normal playback according to the select information sent from the playback system controller 68. During the data reading, header information H1 and H2 is deleted from normal playback data stored in the sixth memory 64 according to the sync block format shown in FIG. 13B, whereby transport packets are restored and then supplied to the switch 66. The normal playback data sent from the sixth memory 64 is thus supplied via the switch 66, and output through the output terminal 70.

Next, the operations of the servo system in normal playback mode will be described. The playback system controller 68 supplies tape travel speed information for the capstan motor 30, to the capstan motor controller 29 according to the detected recording mode sent from the recording mode detector 67, and outputs a signal which indicates whether the phase of the rotary drum 25 should be controlled, according to the detected recording mode. (Needless to say, when data recorded in each recording mode is reproduced in normal playback mode, phase control is needed.) The reference signal for the rotation phase of the rotary drum 25, sent from the playback system controller 68 is supplied to the drum motor controller 27. The drum motor controller 27 controls the drum motor according to the reference signal and the rotation phase information concerning the rotary heads 26a and 26b which is sent from the drum motor 28, so that the drum motor is rotated at 9000 rpm. The drum motor 28 is driven by a driving voltage applied by the drum motor controller 27. The rotation phase of the rotary drum 25 is supplied from the drum motor 28 to the drum motor controller 27. During playback, the rotation phase information of the rotary drum 25 is supplied from the drum motor controller 27 to the capstan motor controller 29.

The capstan motor controller 29 controls the capstan motor according to the rotation phase information concerning the rotary drum 25, the recording mode, the tape travel speed information, the playback signal sent from the playback amplifier 60a, and the rotation information concerning the capstan motor (travel speed information concerning magnetic tape) which is output from the capstan motor 30. The travel speeds of magnetic tape for the respective record modes are shown in FIG. 7. That is, when the travel speed for the 25 Mbps recording mode is assumed to be 1, it is ½ for the 12.5 Mbps recording mode, ⅓ for the 8.33 Mbps recording mode, and ¼ for the 6.5 Mbps recording mode. In normal playback mode, the capstan motor controller 29 controls the travel speed of magnetic tape so that the travel speed will be as mentioned above for the specific recording mode. The capstan motor controller 29 also performs phase control, by detecting the rotation phase of the rotary drum 25 based on the rotation phase information of the rotary drum 25 and the ATF information recorded in the ITI areas. The rotation information concerning the capstan motor is supplied from the capstan motor 30 to the capstan motor controller 29.

Next, the operations for fast playback will be described. The signal intermittently reproduced from the magnetic tape by the rotary heads 26a and 26b on the drum 25 is amplified by the playback amplifiers 60a and 60b and supplied to the digital demodulators 61a and 61b. The outputs of the playback amplifiers 60a and 60b are also supplied to the capstan motor controller 29. The digital demodulators 61a and 61b detect data in the input playback signal, converts it into playback digital data, and then digitally demodulates it. An ID signal appended to the start of each sync block is detected by the digital demodulators 61a and 61b. The playback digital data digitally demodulated by the digital demodulators 61a and 61b is supplied to the fifth memory 62. In the fast playback mode, for example, as shown in FIGS. 30B to 30I), data is intermittently reproduced from each track by the rotary heads 26a and 26b. It is therefore impossible to collect data for one track and structure an error-correcting code block shown in FIGS. 10A and 10B. In the fast playback mode, therefore, error correction using the C2 check code is not carried out.

When the data is supplied to the fifth memory 62, the ID signals sent from the digital demodulators 61a and 61b are checked to recognize the fast playback data recording areas, and the special playback data alone is temporarily stored in the fifth memory 62. In the first embodiment, in the fast playback mode in which data recorded in area B0 is reproduced, the data sent from the playback amplifier 60b and digital demodulator 61b is used to perform various kinds of controls. In the fast playback mode in which data recorded in areas A0 to A4 is reproduced, the data sent from the playback amplifier 60a and digital demodulator 61a is used to perform various kinds of controls. The error correction using the C1 check code applied at the error correction decoder 63 to the special playback data stored in the fifth memory 62 in units of one sync block, to correct and detect errors that have occurred during fast playback. The data whose errors have been corrected by the error-correction decoder 63 is read successively from the fifth memory 62 and supplied to the seventh memory 65. The output of the fifth memory 62 is also supplied to the sixth memory 64. However, no data is written in fast playback mode.

In accordance with the track number and sync block number which are extracted from the ID information as well as the header information H1 and H2 which are appended to the input special playback data as shown in FIGS. 13A and 13B, the reproduced special playback data is stored at predefined addresses within the seventh memory 65. The storage area in the seventh memory 65 for storing one frame of special playback data is determined on the basis of the recording mode signal sent from the recording mode detector 67. The special playback data stored in the seventh memory 65 according to the sync block format shown in FIG. 13B is read in units of five sync blocks during data reading, and even after header information H1 and H2 are deleted, the special playback data is supplied to the switch 66 in the form of transport packets. The special playback data sent from the seventh memory 65 is output through the output terminal 70 via the switch 66.

Next, the operations of the servo system during the fast playback will be described. The ID signals detected by the digital demodulators 61a and 61b are supplied to the recording mode detector 67. The recording mode detector 67 detects the recording mode of the data, on the basis of the reproduced ID signals. The playback system controller 68 identifies the playback mode set for the digital VTR on the basis of the mode signal received through the input terminal 69. When the input mode signal indicates a fast playback mode, the playback system controller 68 supplies the switch 66 with a control signal which indicates that the output of the seventh memory 65 should be selected, and outputs various control signals to the servo system.

A method for controlling the servo system during fast playback using the data stored in the area B0 will be described below. As described previously, in fast playback using area B0, in whichever recording mode data has been recorded, both the travel speed of magnetic tape and the rotation phase of the rotary drum 25 are controlled. The playback system controller 68 supplies the drum motor controller 27 with a reference signal used to control the rotation phase of the rotary drum 25, and supplies the capstan motor controller 29 with tape travel speed information on the basis of the identified recording mode extracted from the ID signals.

The drum motor controller 27 controls the drum motor according to the reference signal and the rotation phases of the rotary heads 26a and 26b which is supplied from tile drum motor 28, so as to rotate the drum motor at 9000 rpm. The drum motor 28 is driven by a driving voltage applied by the drum motor controller 27. The rotation phase of the rotary drum 25 is supplied from the drum motor 28 to the drum motor controller 27. During playback, the rotation phase information of the rotary drum 25 is supplied from the drum motor controller 27 to the capstan motor controller 29.

On the basis of the rotation phase information of the rotary drum 25, recording mode, tape travel speed information, playback signal sent from the playback amplifier 60b, and rotation information of the capstan motor (magnetic tape travel speed information) which is supplied from the capstan motor 30, the capstan motor controller 29 controls the capstan motor. In the first embodiment, the phase control is achieved through tracking control to maximize the playback output at the center of the B0 area on the magnetic tape, on the basis of the rotation phase information of the rotary drum sent from the drum motor controller 27. The capstan motor controller 29 controls the travel speed of the magnetic tape in conformity with the tape travel speed information, and also controls the rotation phase of the rotary drum 25 in the manner described above. For reproducing data recorded in the 25 Mbps recording mode, ITI areas are scanned during the 4x speed playback. The phase control may be effected by detecting the rotation phase using the ATF information recorded in the ITI areas. The rotation information of the capstan motor 30 is supplied from the capstan motor 30 to the capstan motor controller 29.

Next, the operations of the servo system during 18x speed fast playback in which data recorded in the 25 Mbps recording mode is reproduced from the magnetic tape will be described. Description will be made of the operations of the servo system during the 18x speed playback in which data recorded in the 25 Mbps recording mode is reproduced from areas A0 to A4. As shown in FIG. 26, in the 25 Mbps recording mode, record data is arranged so that the rotation phase of the rotary drum 25 can be controlled by detecting the tracking phase error in an ITI area.

For sufficiently raising the playback data rate of the special playback data during the 18x speed playback, the special playback data is arranged along the scanning traces of the rotary head 26a. As shown in FIG. 20, the data rate during the 8.5x speed playback in which the fast playback can be performed merely by controlling the travel speed of the tape is about half the the data rate in a mode in which both the travel speed of magnetic tape and the rotation phase are controlled. Especially, in the standard recording mode with a high recording data rate, it is supposed that the data amount of intra picture data per frame is larger than that with other data rates. That is, in the case of the standard recording mode, the data rate of the fast playback data must be sufficiently higher than that in other recording modes. For this reason, the first embodiment adopts a recording format according to which the recording areas for the fast playback data area arranged along the scanning traces of the rotary head 26a in the Fast playback, at least in the standard recording mode.

The method of controlling the servo system during the fast playback using the 18x speed playback data recorded in the 25 Mbps recording mode will be described below. As described previously, during the 18x speed playback, both the travel speed of the magnetic tape and the rotation phase of the rotary drum 25 are controlled. Accordingly, the playback system controller 68 supplies a reference signal for the rotation phase of the rotary drum 25 to the drum motor controller 27, and supplies the capstan motor controller 29 with tape travel speed information on the basis of the result of the identification of the recording mode extracted from the ID signal.

The drum motor controller 27 controls the drum motor 28 according to the reference signal and the rotation phase information of the rotary heads 26a and 26b sent from the drum motor 28, so as to cause the drum motor to rotate at 9000 rpm. The drum motor 28 is driven by a driving voltage applied by the drum motor controller 27. The rotation phase of the rotary drum 25 is supplied from the drum motor 28 to the drum motor controller 27. During playback, the rotation phase information of the rotary drum 25 is output from the drum motor controller 27 to the capstan motor controller 29.

The capstan motor controller 29 controls the capstan motor according to the rotation phase information of tile rotary drum 25, recording mode, tape travel speed information, playback signal sent from the playback amplifier 60a, and rotation information of the capstan motor (magnetic tape travel speed information) which is sent from the capstan motor 30. In the phase control in the case of the 25 Mbps recording mode in the first embodiment, an ITI area on the magnetic tape is detected according to the rotation phase information of the rotary drum which is sent from the drum motor controller 27, the state of tracking is sampled at the ITI area, and then the tracking phase error is detected. The capstan motor controller 29 controls the travel speed of the magnetic tape according to the tape travel speed information, and also detects and controls the rotation phase of the rotary drum 25 in the manner described above. The rotation information of the capstan motor 30 is supplied from the capstan motor 30 to the capstan motor controller 29.

Described next is the operations of the servo system during the fast playback using the 18x speed playback data recorded in a recording mode other than 25 Mbps recording mode is reproduced from the magnetic tape. FIGS. 27 to 29 show the scanning traces of the rotary head 26a in respective recording modes. In fast playback of data having been recorded in areas A0 to A4 in a recording mode other than the 25 Mbps recording mode, the rotation phase of the rotary drum 25 is not controlled, but only the travel speed of the magnetic tape is controlled (The manner of synthesizing the special playback data is achieved by using data acquired during two scanning periods of the rotary head 26a, as described previously. See FIGS. 30A to 30G).

The method of controlling the servo system during the fast playback using the 18x speed playback data recorded in a recording mode other than the 25 Mbps recording mode will be described below. The playback system controller 68 supplies a reference signal for the rotation phase of the rotary drum 25 to the drum motor controller 27, and also supplies the capstan motor controller 29 with the tape travel speed information on the basis of the result of identification of the recording mode separated from the ID signals.

The drum motor controller 27 controls the drum motor 28 according to the reference signal and the rotation phase information concerning the rotary heads 26a and 26b which is sent from the drum motor 28, so as to rotate the drum motor at 9000 rpm. The drum motor 28 is driven by a driving voltage applied by the drum motor controller 27. The rotation phase of the rotary drum 25 is supplied from the drum motor 28 to the drum motor controller 27.

The capstan motor controller 29 controls the capstan motor 30 according to the recording mode, tape travel speed information, reference signal sent from the playback system controller 68, and rotation information concerning the capstan motor (magnetic tape travel speed information) which is sent from the capstan motor 30. The reference signal sent from the playback system controller 68 may be identical to the one for controlling the drum motor 28. The reference signal is used to determine a tape travel speed for the purpose of controlling the travel speed of magnetic tape. The rotation information concerning the capstan motor 30 is supplied from the capstan motor 30 to the capstan motor controller 29.

Because the digital VTR in the first embodiment has the aforesaid configuration, signals with different recording rate can be recorded according to the same recording format (track format). Accordingly, the input data can be recorded efficient at a plurality of recording rates without enlarging or complicating the circuitry of the recording system. Moreover, the playback data rate of the special playback data for the respective fast playback speeds can be set sufficiently high, and it is possible to improve the playback picture quality in the fast playback. Because the number of repetitions of each special playback data is altered depending on a recording mode, the special playback data can be recorded efficiently in each recording mode, and the playback data rate of the special playback data can be raised, and the quality of a picture reproduced during the fast playback can be improved.

When the data recorded in each recording mode is reproduced during fast playback, the operations of the servo system can be simplified as described previously (for example, in special playback in which 4x speed playback data is reproduced, tracking is controlled so as to maximize the playback output at area B0 with any of the recording modes. With all the recording modes other than the 25 Mbps recording mode, only the tape travel control of the magnetic tape is performed when the fast playback from areas A0 to A4 is performed in the fast playback.). Because the same track format is used in common between the recording modes, the circuitry of a playback system can be scaled down drastically.

In the first embodiment, in order to sufficiently raise the playback data rate of special playback data, the special playback data recording areas are positioned along the scanning traces of the rotary heads 26 in standard recording mode. In the standard recording mode with a high recording rate, the amount of data of the intra-picture data per one frame is expected to be larger than in other recording modes.

That is, it is necessary to make the playback data rate during the fast playback in the standard recording mode to be sufficiently higher than in other recording modes, in order to ensure the playback picture quality in the fast playback. In the first embodiment, therefore, the special playback data recording areas, at least in the standard recording mode, are positioned along the scanning traces of the rotary heads 26 during the fast playback. This makes it possible to arrange the special playback data with a maximum efficiency, raise the playback data rate in the fast playback, and improve the playback picture quality in the fast playback.

In a digital VTR for recording data on a magnetic tape once per K rotations (K being an integer not smaller than 1) at a tape travel speed of 1/K times that of the standard mode, when the fast playback is performed as described previously by controlling only the speed, the tape travel speed should be set to a $\pm K^*(N+\frac{1}{2})x$ speed. However, when the special playback data is generated and recorded in predetermined areas on the magnetic tape as described previously, since the special playback data is structured by synthesizing data acquired during two scanning periods of the rotary heads, the value N is determined so that the condition $2^*\{K^*(N+\frac{1}{2})\} \leq M^*K$ is satisfied, where number of repetitions (number of tracks) of special playback data is M. The condition $K^*(N+\frac{1}{2})$ means that, after the rotary drum makes one rotation, the rotary head scans a trace of an opposite azimuth. The condition $2^*\{K^*(N+\frac{1}{2})\}$ is determined from the relationship between the number of repetitions and the maximum tape speed as described previously in conjunction with the prior art. Incidentally, N denotes a positive integer.

In the first embodiment, the rotary drum 25 is controlled to be rotated at 9000 rpm during the special playback at any recording mode. This however should not be taken as a limitation. The rotating speed of the drum may be varied slightly in order to match the speeds of the rotary head 26a and 26b and the magnetic tape in special playback mode to each other. Even in this case, when the travel speed of the magnetic tape is set substantially to a $\pm K^*(N+\frac{1}{2})x$ speed, similar effects are obtained. Specifically, when the rotating speed of the drum is set to a $(1+r/R)x$ speed, the tape travel speed is set substantially to a $\pm(r+R)/R^*K^*(N+\frac{1}{2})x$ speed. Under this condition, the rotary head 26a scans the traces shown in FIGS. 27 to 29, and the aforesaid effects are obtained. In the above embodiment, the fast playback is performed by controlling only the travel speed of the magnetic tape, so that the fast playback speed may have a small deviation, and similar effects are obtained if the tape travel speed is set to be $\pm K^*(N+\frac{1}{2})x$ times the speed during recording.

In the first embodiment, the tape travel speed for the 12.5 Mbps recording mode is a 17x speed. But this does not impose a limitation. As long as the above condition is met, the tape travel speed may be a 15x speed, 13x speed or the like. Likewise, the tape travel speed for the 8.33 Mbps recording mode is not limited to the 16.5x speed. As long as the above condition is met, similar effects are obtained with a 13.5x speed, 10.5x speed or the like. Likewise, the tape travel speed for the 6.25 Mbps recording mode is not limited to the 18x speed. As long as the above is met, similar effects are obtained with 14x speed, 10x speed, or the like.

In the first embodiment, the recording format shown in FIG. 15 is adopted. This however does not impose a limitation. In a digital signal recording device, playback device, or recording/playback device (for example, a digital VTR or digital disk player) having a recording format for recording the special playback data extracted from the input data in predefined areas on the recording media, by altering the number of repetitions of the special playback data depending on the recording mode, while using the identical recording format, the special playback data for the Fast playback can be recorded efficiently, and the playback data rate of the special playback data in the Fast playback can be improved, and the playback picture quality of the fast playback can be improved.

The record data is not limited to the ATV signal or DVB signal. In Japan in which a video signal is compressed according to the MPEG2 recommendations, ISDB signal or a signal compressed according to the MPEG1 recommendations may be recorded. The fast playback speeds are not limited to those shown in FIG. 20 including 4x and 18x speeds. Similar effects are obtained if the special playback data recording areas and the fast playback speed are set in conformity with the playback speed required of the digital signal recording/playback device, and the input data is recorded according to the identical track format.

For recording data transmitted in the form of transport packets represented by the MPEG2 recommendations in a digital VTR represented by the SD standards, two transport packets are transformed into five sync blocks, according to the first embodiment. This however does not impose a limitation. It may be so arranged that m input transport packets are transformed into n sync blocks (m and n represent a positive integer), in forming the sync block formats. When the data in the sync block formats obtained by the conversion is recorded on a recording medium, if the recording format on the recording medium is so configured that the n sync blocks of data is arranged on the same track, the data in the form of the transport packets can be efficiently converted into sync block formats. Because n sync blocks of data are completed within the same track, when the data in the sync block formats is converted into data in the transport packets, the groups of n sync block formats can be easily separated from each other by using the track information, such as the track identification signal, and the sync block number. Moreover, it is not necessary to record the identification signals of the n sync blocks, and the data recording region can be effectively utilized. Furthermore, the length of the one sync block is not limited to the one shown in FIG. 11.

The positions of the 4x speed playback data recording areas and 18x speed playback data recording areas, and the numbers of the areas are not limited to those described previously. The length of the track period is not limited to four. In the first embodiment, the fast playback speed for reproducing the data recorded in the 25 Mbps recording mode (standard mode) is set to a 4x speed or 18x speed. This does not impose limitation. Similar effects can be attained with other multiple speed when the special playback data recording areas are disposed on the traces of the scanning of the rotary heads 26a and 26b. When the data is recorded according to the recording format of the first embodiment in the 25 Mbps recording mode, a higher fast playback speed may set to a 8.5x speed, and the fast playback may then be performed by controlling only the travel speed of the tape.

In the first embodiment, the 25 Mbps recording mode is regarded as the standard recording mode. Alternatively, the 50 Mbps recording mode or 12.5 Mbps recording mode may be regarded as the standard recording mode, and yet if the same track format is used in common for various recording mode, and only the the number of repetitions of the special playback data is varied depending on the recording mode, the special playback data can be recorded efficiently and the picture quality of the fast playback picture in the respective recording mode can be improved satisfactorily.

In the first embodiment, description is made of a digital VTR having four recording modes, i.e., the standard, (½)×, (⅓)×, and (¼)× recording modes as shown in FIG. 7. This does not impose a limitation. Similar effects are attained with a digital VTR or digital disk player having only two or three of the above recording modes. The recording modes are not limited to the above four kinds of recording modes. Similar effects are attained when, in a digital signal recording/playback device, the travel speed of the recording medium (the head moving speed in the case of a digital video disk player) during playback is controlled at the above speeds (that is, a substantially ±K*(N+½)x speed or substantially ±(r+R)/R*K*(N+½)x speed).

Second Embodiment

A recording system in a digital VTR in the second embodiment has the same configuration as the one shown in FIGS. 1 to 5, and the descriptions of the recording system of the first embodiment is applicable without any change. The description of the locations of the rotary heads on the rotary drum, the method of recording a multi-rate bit stream (recording modes and timings of recording a bit stream in the recording modes), coding configurations of error-correcting codes, the configuration of the sync blocks, the recording format conforming to the SD standards for recording the data on one track, and the sync block format, which were made with reference to FIGS. 6A to 15, is also applicable to the second embodiment. However, the special playback data generator 12 in the second embodiment is designed to produce not only the special playback data to be recorded in the 25 Mbps recording mode and reproduced at the 4x and 18x speeds but also the special playback data to be recorded in the 12.5 Mbps recording mode and reproduced at the 8x and 36x speeds, the one to be recorded in the 8.33 Mbps recording mode and reproduced at the 12x and 54x speeds, and the one to be recorded in the 6.5 Mbps recording mode and reproduced at 16x and 72x speeds.

FIG. 31 shows the numbers of sync blocks per track which can be acquired at respective fast playback speeds when data recorded in respective record modes is reproduced from magnetic tape by fast playback. In the same way as in FIG. 14, numerical values shown in FIG. 31 indicate the numbers of sync blocks per track which can be reproduced at respective playback speeds when special playback is performed using rotary heads having a width of 10 μm (a track pitch is 10 μm under the SD standards). The numerical values have been calculated on the assumption that the number of sync blocks per track (corresponding to 180°) is 186 and part of the playback signal whose output levels exceeds −6 dB is obtained, in the same manner as in the prior art.

In the second embodiment, the recording format is altered for each recording mode, so as to improve the efficiency during fast playback, depending on the four recording modes described above.

The recording format enabling data recorded in the standard recording mode to be reproduced at 4x and 18x speeds is as shown in FIG. 15.

Figure 33:
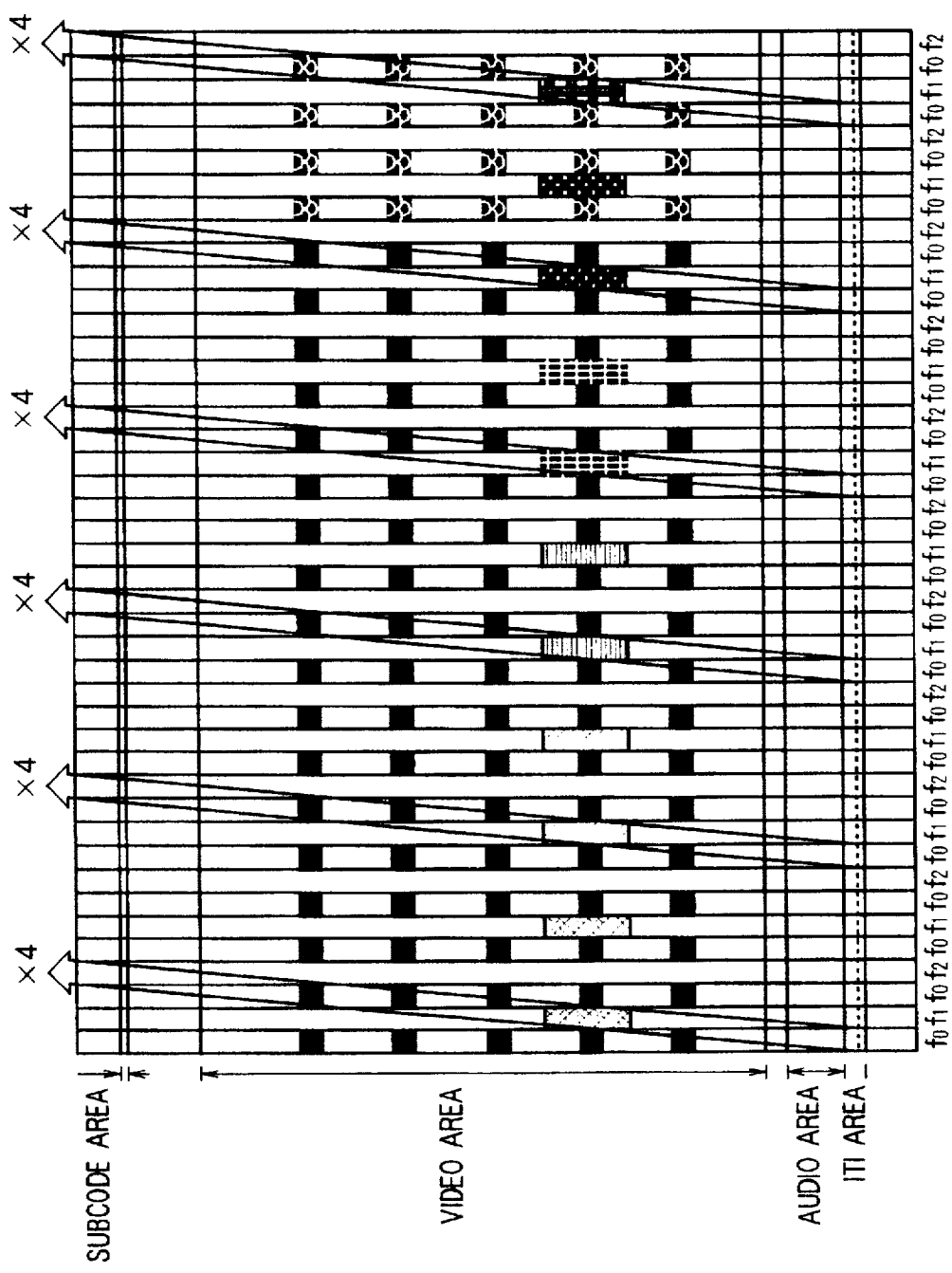
FIG. 33 shows the scanning trace of a rotary head when the record pattern shown in FIG. 32, in the case of a rate of 25 Mbps, is reproduced at a 4x speed.
Figure 34:
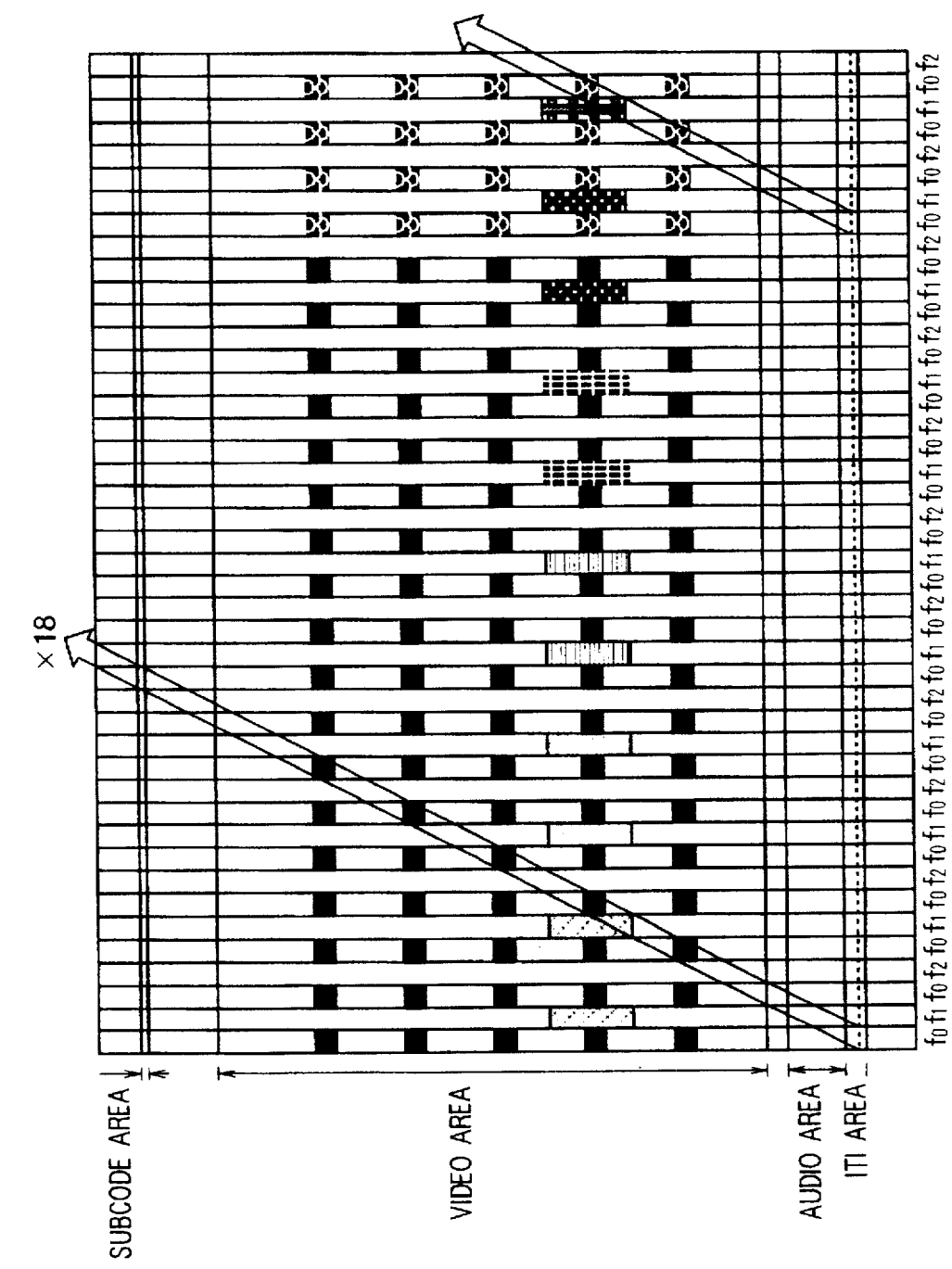
FIG. 34 shows the scanning trace of a rotary head when the record pattern shown in FIG. 32, in the case of a rate of 25 Mbps, is reproduced at a 18x speed.

Description will be made of the recording format in each recording mode in the second embodiment. FIG. 32 shows the arrangement on the magnetic tape of the data with a four-track period (data of one track format) shown in FIG. 15, in the standard recording mode. FIG. 33 shows the scanning traces followed by a rotary head when data recorded in the standard recording mode according to the recording format shown in FIG. 32 is reproduced at a 4x speed. FIG. 34 shows the scanning traces followed by a rotary head when data recorded in the standard recording mode according to the recording format shown in FIG. 32 is reproduced at an 18x speed.

The (½)x recording mode means that data recorded in this mode is reproduced at half the tape speed at which data recorded in the standard recording mode is reproduced. The (⅓)x recording mode means that data recorded in this mode is reproduced at one third of the tape speed at which data recorded in the standard recording mode is reproduced. The (¼)x recording mode means that data recorded in this mode is reproduced at one fourth the tape speed at which data recorded in the standard recording mode is reproduced. If data recorded in the (½)x recording mode, (⅓)x recording mode, or (¼)x recording mode is reproduced at twice, three times, or four times a set speed, respectively, the scanning traces will be about the same as the scanning traces followed when data recorded in the standard recording mode is reproduced at the set speed.

Figure 35:
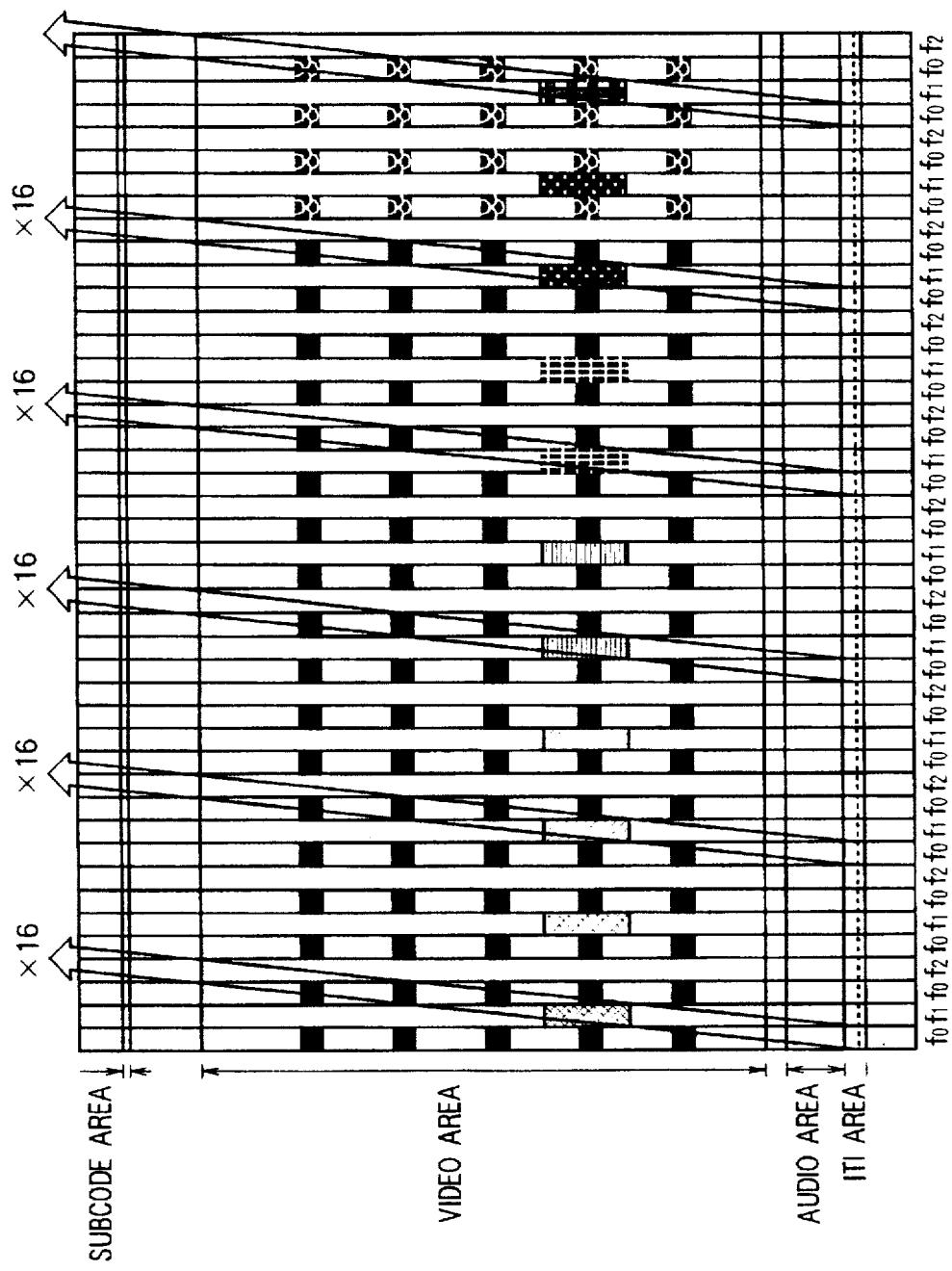
FIG. 35 shows the scanning trace of a rotary head when the record pattern shown in FIG. 32, in the case of a rate of 6.5 Mbps, is reproduced at a 168x speed.
Figure 36:
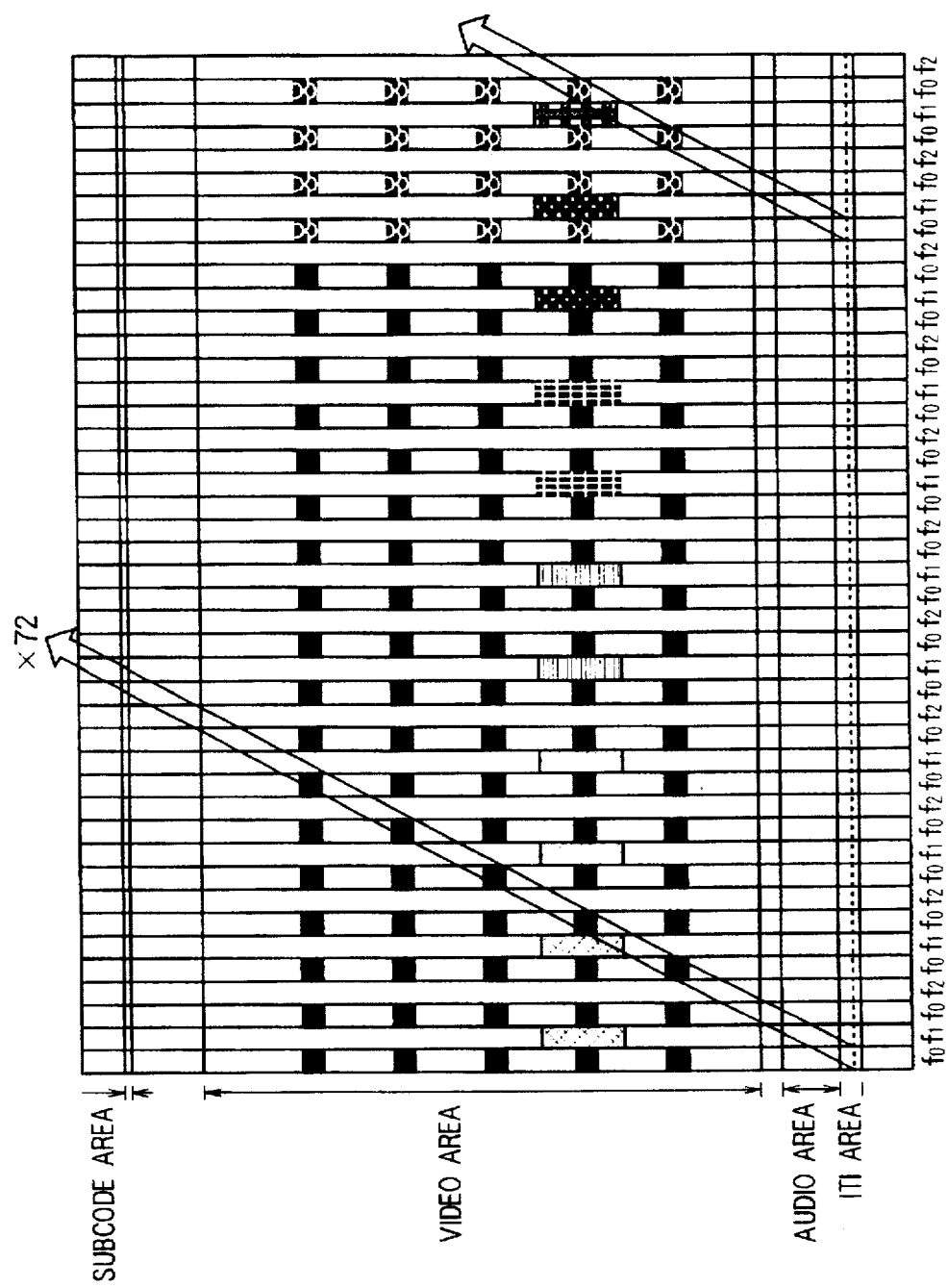
FIG. 36 shows the scanning trace of a rotary head when the record pattern shown in FIG. 32, in the case of a rate of 6.5 Mbps, is reproduced at a 72x speed.

FIG. 35 shows the scanning traces followed by the rotary head 26a when data recorded in the (¼)x recording mode according to the recording format shown in FIG. 32 is reproduced at a 16x (4 ×4) speed. FIG. 36 shows the scanning traces followed by the rotary head 26a when data recorded in the (¼)x recording mode according to the recording format shown in FIG. 32 is reproduced at a 72x (18 ×4) speed. As shown in FIGS. 35 and 36, compared with the case in which the data recorded in the standard recording mode according to the recording format shown in FIG. 32 is reproduced at 4x and 18x speeds (shown in FIGS. 33 and 34), the scanning traces of the rotary heads 26a and 26a slightly deviate. As a result, the rotary heads 26a and 26a cannot produce all the fast playback data through one trace. The deviations of the rotary heads 26a and 26a are attributable to the fact that the inclination angles of tracks are varied depending on the tape travel speed.

Where data recorded in each recording mode according to the recording format shown in FIG. 32 is reproduced in a fast playback mode, the number of times the same fast playback data is repeatedly recorded must be increased and the entirety of the playback data is reproduced by two or more traces. As a result, the playback data rate decreases. Where the number of times the same fast playback data is repeatedly recorded is not increased, it is necessary to lower the set speed to reproduce all the fast playback data. As a result, the playback data rate decreases (specific playback data rates will be described later).

In the second embodiment, the recording format suitable for each of the recording mode is generated so that all the fast playback data is reproduced through one head trace, at twice the speed for normal recording mode if the data is recorded in the (½)x recording mode, at three times the speed for normal recording mode if the data is recorded in the (⅓)x recording mode, and at four times the speed for normal recording mode if the data is recorded in the (¼)x recording mode, without decreasing the playback rate of the data recorded according to the recording format for the standard recording mode.

Figure 37:
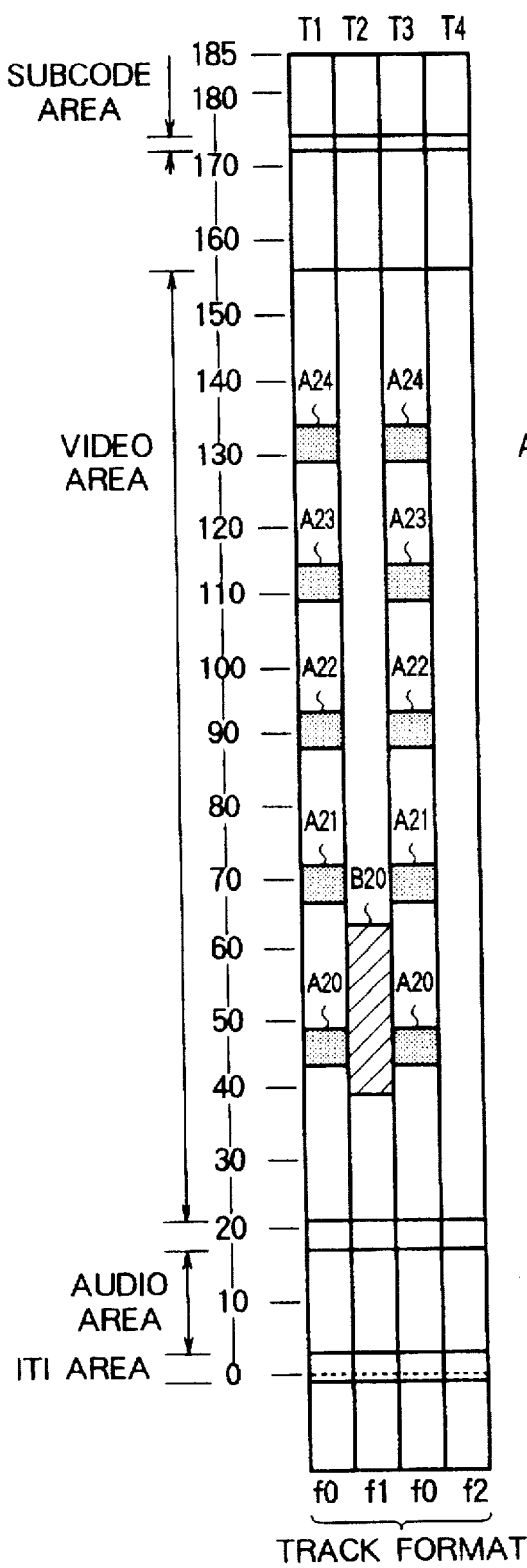
FIG. 37 shows a track format of a four track period including the arrangement of the special playback data recording areas for the (½)x recording mode in the second embodiment.
Figure 38:
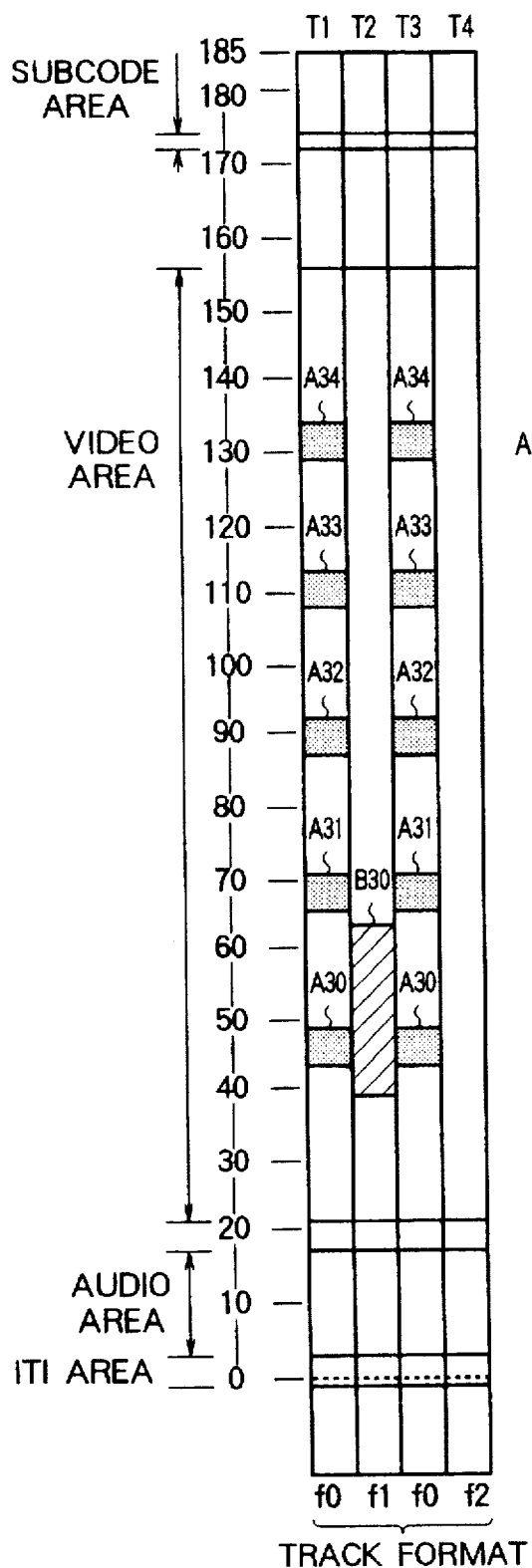
FIG. 38 shows a track format of a four track period including the arrangement of the special playback data recording areas for the (⅓)x recording mode in the second embodiment.
Figure 39:
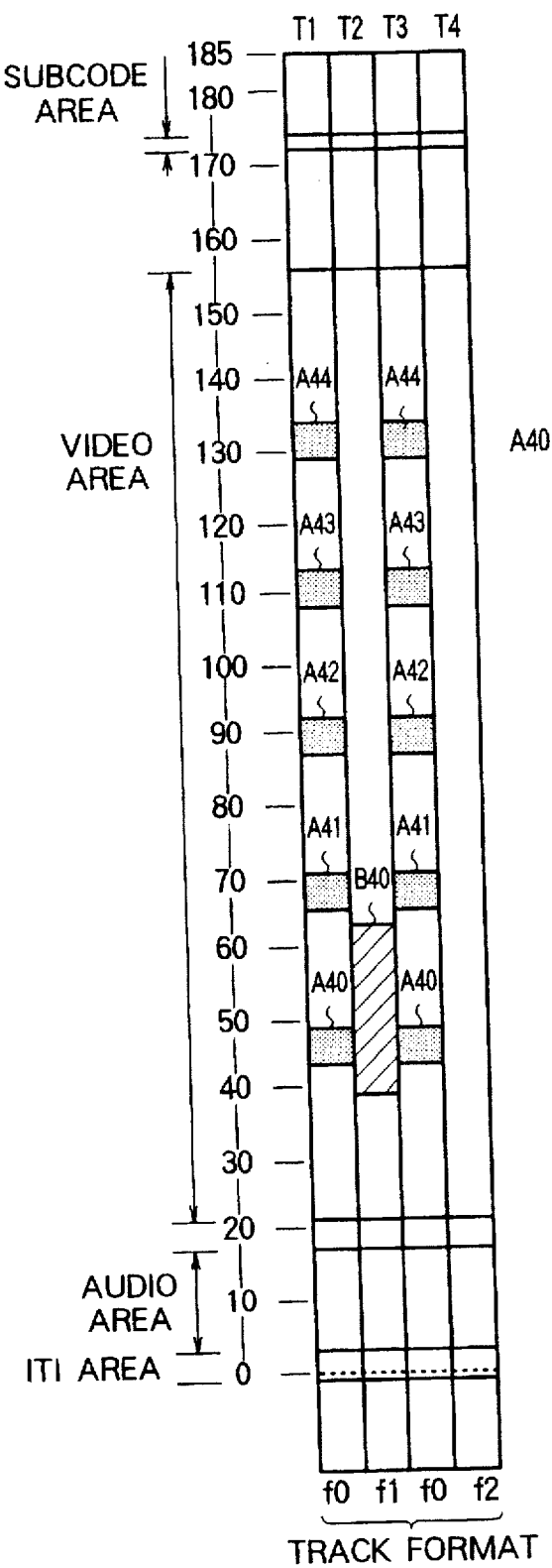
FIG. 39 shows a track format of a four track period including the arrangement of the special playback data recording areas for the (¼)x recording mode in the second embodiment.

Examples of recording formats for the respective recording modes will next be described. FIG. 37 shows a track format for the (½)x recording mode. This track format permits 8x (4×2) speed playback and 36x (18×2) speed playback. FIG. 38 shows a track format for the (⅓)x recording mode. This track format permits 12x (4×3) speed playback and 54x (18×3) speed playback. FIG. 39 shows a track format for the (¼)x recording mode. This track format permits 16x (4×4) speed playback and 72x (18 × 4) speed playback. In the second embodiment, one track format is formed of four tracks in all the recording modes, and the normal playback data and the special playback data are recorded on the magnetic tape by repeatedly recording the above track format. Discrimination between tracks A and B, tracks T1 to T4, and pilot signals f0 to f2 are identical to those described in conjunction with FIG. 15. In each recording mode, the track pitch is 10 μm as stipulated under the SD standards. However, the inclination angles of the tracks differ in each of the recording modes because of the difference in the tape travel speed.

In FIG. 15, A0 to A4 indicate the positions of areas on the magnetic tape for recording the 18×speed playback data in the standard recording mode. Each of the 18x speed playback data recording areas (A0 to A4) is five sync blocks wide. Five 18x speed playback data recording areas are, as illustrated, positioned on each A track (T1 or T3). The same data is recorded in areas bearing the same reference numeral (A0 to A4).

Similarly, B0 in FIG. 15 indicates the position of an area on the magnetic tape for recording 4x speed playback data in the standard recording mode. The 4x speed playback data recording area B0 is 25 sync blocks wide. One 4x speed playback data recording area is, as illustrated, positioned on each track T2.

In FIG. 37, A20 to A24 indicate the positions of the recording areas on magnetic tape for recording the 36x speed playback data in the (½)x recording mode. Each of the 36x speed playback data recording areas (A20 to A24) is five sync blocks wide. Five 36x speed playback data recording areas are, as illustrated, positioned on each track A (T or T3). The same data is recorded in areas bearing the same reference numeral (A20 to A24).

In FIG. 37, B20 indicates the position of an area on the magnetic tape for recording the 8x speed playback data in the (½)x recording mode. The 8x speed playback data recording area B20 is 25 sync blocks wide. One 8x speed playback data recording area is, as illustrated, positioned on each track T2.

In FIG. 38, A30 to A34 indicate the positions of areas for recording the 54x speed playback data in the (⅓)x recording mode. Each of the 54x speed playback data recording areas (A30 to A34) is five sync blocks wide. Five 54x speed playback data recording areas are, as illustrated, positioned on each track A (T1 or T3). The same data is recorded in areas bearing the same reference numeral (each of A30 to A34).

In FIG. 38, B30 indicates the position of an area on the magnetic tape for recording the 12x speed playback data in the (⅓)x recording mode. The 12x speed playback data recording area B30 is 25 sync blocks wide. One 12x speed playback data recording area is, as illustrated, positioned on each track T2.

In FIG. 39, A40 to A44 indicate the positions of areas on the magnetic tape in for recording the 72x speed playback data in the (¼)x recording mode. Each 72x speed playback data recording area is five sync blocks wide. Five 72x speed playback data recording areas are, as illustrated, positioned on each track A (T1 or T3). The same data is recorded in areas bearing the same reference numeral (A40 to A44).

in FIG. 39, B40 indicate the position of an area on the magnetic tape for recording the 16x speed playback data in the (¼)x recording mode. The 16x speed playback data recording area B40 is 25 sync blocks wide. One 16x speed playback data recording area is, as illustrated, positioned on each track T2.

The numbers of sync blocks allotted to the data recording areas are determined on the basis of the data shown in FIG. 31. As will be seen from FIG. 31, it is possible to acquire 62 sync blocks of data recorded in the standard recording mode from one track during 4x speed playback. Similarly, 53.14 sync blocks of data recorded in the (½)x recording mode can be acquired during the 8x speed playback. 50.73 sync blocks of data recorded in the (⅓)x recording mode can be acquired during 12x speed playback. 49.6 sync blocks of data recorded in the (¼)x recording mode can be acquired during 16x speed playback. 10.94 sync blocks of data recorded in the standard recording mode can be acquired from one track during 18x speed playback. Similarly, 10.63 sync blocks of data recorded in the (½)x recording mode can be acquired during 36x speed playback. 10.538 sync blocks of data recorded in the (⅓)x recording mode can be acquired during 54x speed playback. 10.48 sync blocks of data recorded in the (¼)x recording mode can be acquired during 72x speed playback. The data arrangement on the magnetic tape configured for each of the special playback speeds, in consideration of the above is shown in FIGS. 15, 37, 38, and 39.

As mentioned above, data is recorded on the magnetic tape by repeating the track format shown in FIG. 15 in the standard recording mode, the track format shown in FIG. 37 in the (½)x recording mode, the track format shown in FIG. 38 in the (⅓)x recording mode, or the track format shown in FIG. 39 in the (¼)x recording mode. The recording formats for the respective recording modes will be described below.

FIG. 32 shows the recording format of the second embodiment for the standard recording mode. As shown in FIG. 32, the track formats shown in FIG. 15 are repeatedly recorded. When the data is recorded in the standard recording mode, the data recorded in area B0 in FIG. 15 is reproduced in the 4x speed fast playback, and the data recorded in areas A0 to A4 is reproduced in the 18x speed playback mode. As for areas B0, the same special playback data is recorded repeatedly for two track formats. As for areas A0 to A4, the same special playback data is recorded repeatedly for nine track formats. Accordingly, as for the data in the area B0, the same data is, as shown in FIG. 32, recorded twice in cycles of eight tracks. As for the data in the areas A0 to A4, the same data is recorded eighteen times in cycles of 36 tracks. The same special playback data is recorded in areas A0 to A4 and B0 shaded with the same patterns.

Figure 40:
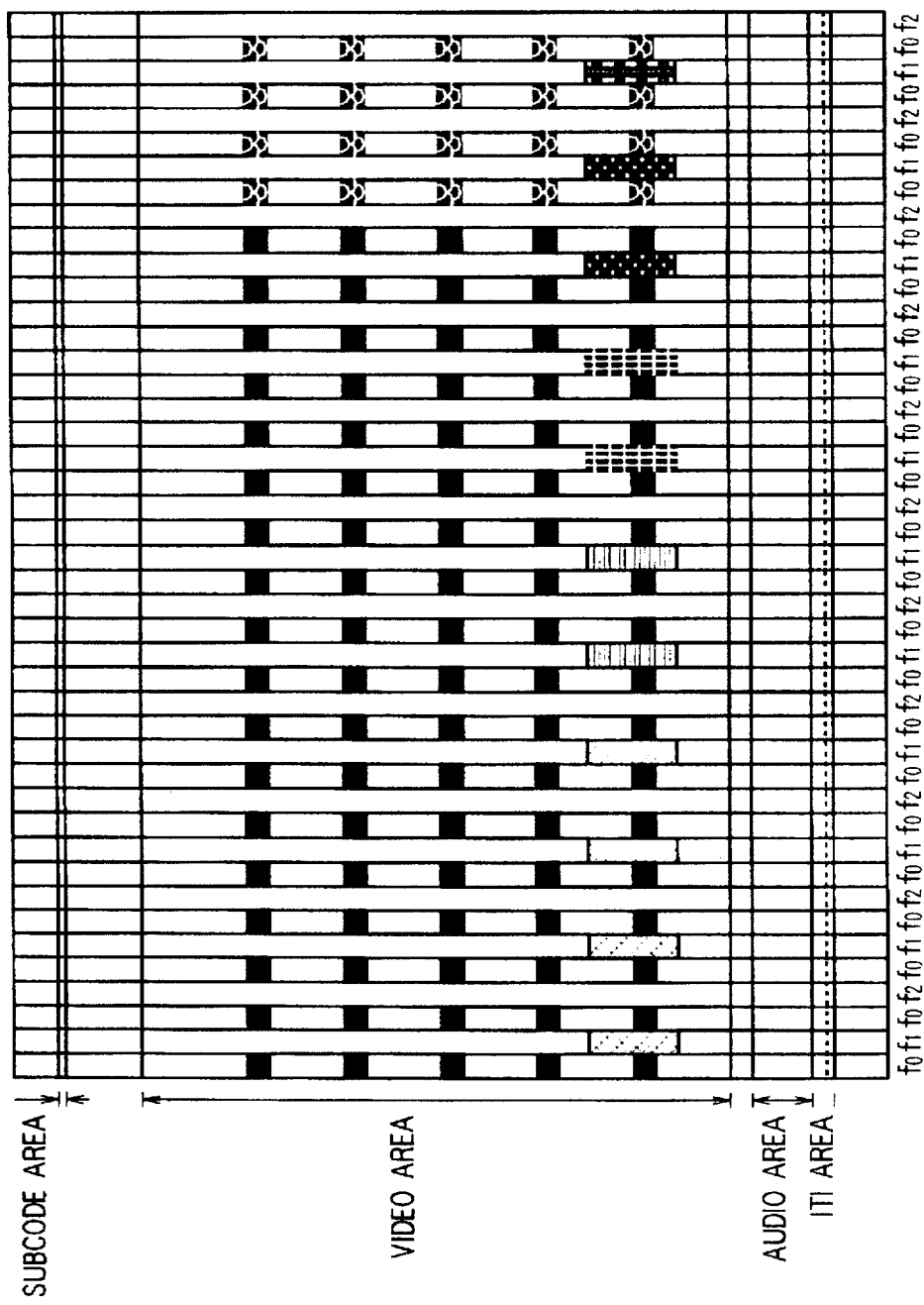
FIG. 40 shows a recording pattern according to the track format for the (½)x recording mode shown in FIG. 37.
Figure 41:
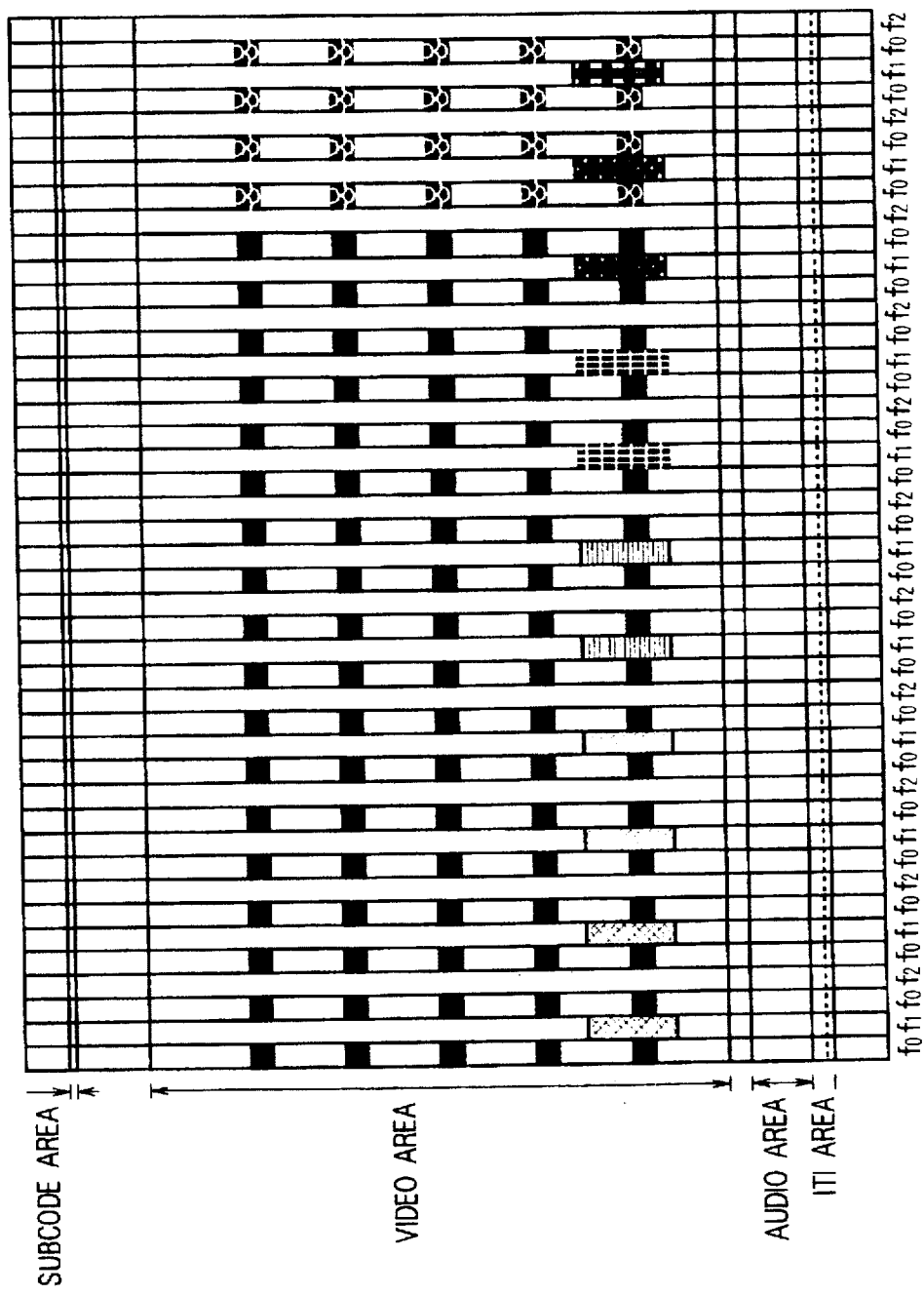
FIG. 41 shows a recording pattern according to the track format for the (⅓)x recording mode shown in FIG. 38.

FIG. 40 shows the recording format of the second embodiment for the (½)x recording mode. As shown in FIG. 40, the track format shown in FIG. 37 is recorded repeatedly. When data is recorded in the (½)x recording mode, data recorded in area B20 is reproduced in the 8x speed fast playback, and data recorded in areas A20 to A24 is reproduced in the 36x speed fast playback. As shown in FIG. 40, as for area B20, the same special playback data is recorded repeatedly for two track formats. As for areas A20 to A24, the same data is recorded repeatedly for nine track formats. Accordingly, as for the data in the area B20, the same data is, as shown in FIG. 40, recorded twice in cycles of eight tracks. As for the data in the areas A20 to A24, the same data is recorded eighteen times in cycles of 36 tracks. The same special playback data is recorded in areas A20 to A24 and B20 shaded with the same patterns. FIG. 41 shows the recording format of the second embodiment for the (⅓)x recording mode. As shown in FIG. 41, the track format shown in FIG. 38 is recorded repeatedly. When the data is recorded in the (⅓)x recording mode, data recorded in area B0 in FIG. 38 is reproduced in the 12x speed fast playback, and the data recorded in areas A30 to A34 is reproduced in the 54x speed fast playback. As shown in FIG. 41, as for area B30, the same special playback data is recorded repeatedly for two track formats. As for areas A30 to A34, tile same data is recorded repeatedly for nine track formats. Accordingly, as for the data in the area B30, the same data is recorded twice in cycles of eight tracks. As for the data in the areas A30 to A34, the same data is recorded eighteen times in cycles of 36 tracks. The same special playback data is recorded in areas A30 to A34 and B30 shaded with the same patterns.

Figure 42:
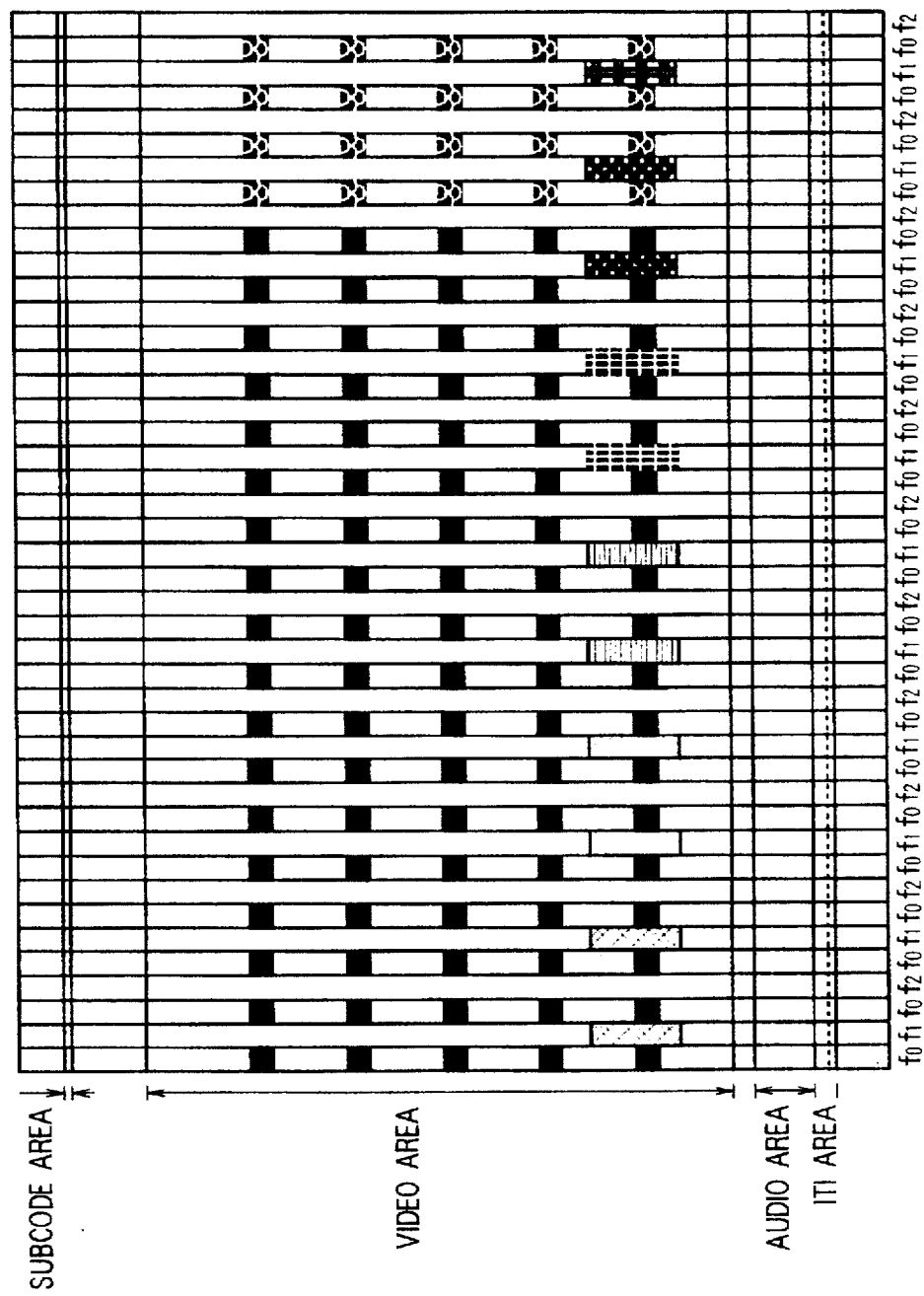
FIG. 42 shows a recording pattern according to the track format for the (¼)x recording mode shown in FIG. 39.

FIG. 42 shows the recording format off tile second embodiment for the (¼)x recording mode. As shown in FIG. 42, the track format shown in FIG. 39 is recorded repeatedly. When the data is recorded in the (¼)x recording mode, data recorded in area B40 in FIG. 39 is reproduced in the 16x speed fast playback, and the data recorded in areas A40 to A44 is reproduced in the 72x speed fast playback. As shown in FIG. 42, as for area B40, the same special playback data is recorded repeatedly for two track formats. As for areas A40 to A44, the same data is recorded repeatedly for nine track formats. Accordingly, as for the data in the area B40, the same data is recorded twice in cycles of eight tracks. As for the data in the areas A40 to A44, the same data is recorded eighteen times in cycles of 36 tracks. The same special playback data is recorded in areas A40 to A44 and B40 shaded with the same patterns.

According to the data arrangement (recording format) using the track format shown in FIG. 15, when data is recorded in the standard recording mode, the rotary heads 26a and 26a scan ITI and subcode areas on the magnetic tape during both the 4x and 18x speed playback. (The details will be described in conjunction with a playback system later.) In the special playback mode, therefore, tracking can be controlled at an ITI area using pilot signals f0, and f2. Moreover, additional information such as time information and item-of-music information recorded in the subcode area can be reproduced. When data is recorded in the (½)x recording mode, and reproduced at a 8x or 36x speed, or recorded in the (⅓)x recording mode, and reproduced at a 12x or 54x speed, and recorded in the (¼)x recording mode, and reproduced at a 16x or 72x speed, the data recorded in the subcode area can be reproduced.

Next, the operations of the recording system will be described with reference to FIGS. 1 to 42. A transport packet received through the input terminal 1 is supplied to the header analyzer 10, first memory 18, and rate identifying circuit 18. The header analyzer 10 detects a transport header in an input transport packet, analyzes the transport header, extracts a program association table (PAT) and program map table (PMT) from the transport packet, and detects the PID of the program to be recorded by the digital VTR. The PID information is supplied to the first memory 18 and rate identifying circuit 18.

The header analyzer 10 extracts a transport packet containing the video data, which represents the program to be recorded, on the basis of the detected PID. The header analyzer 10 then analyzes the data in the extracted transport packet, extracts header information, such as a sequence header, picture header, and slice header, and extracts intra picture data from the transport packet on the basis of the header information. At this time, the header information and additional information appended to the header information are separated from the intra picture data is separated.

The sequence header is header information provided in a bit stream serving as a video signal. The sequence header contains MPEG1 or MPEG2 identification information, an aspect ratio of a picture, and picture data transmission rate information. The picture header is a header appended to the start of each frame or field, and indicates the start of each frame. The picture header also contains a mode signal indicating a coding mode and a quantization table. According to the MPEG2 recommendations, when one frame or field of data is transmitted, being divided into a plurality of slices. The slice header indicates the start of each slice (For details on the headers, refer to the draft of the MPEG2 recommendations).

The header information detected and the additional information accompanying the header information (for example, quantization table information) detected by the header analyzer 10 are supplied to the parallel-to-serial converter 11, first memory 13, 4x speed data generator 14, 18x speed data generator 15, and rate identifying circuit 18. The intra picture data extracted by the header analyzer 10 is supplied to the parallel-to-serial converter 11.

The rate identifying circuit 18 extracts transport packets of a program to be recorded from transport packets received through the input terminal 1 according to the PID which is input from the header analyzer 10. The rate identifying circuit 18 then analyzes header information appended to video data, audio data, and digital data concerning the video and audio data and contained in the extracted transport packet, detects transmission rates of respective data, and outputs a data rate of the program recording to the record data controller 19. The transmission rate of the video data alone may be detected concurrently with the header analysis of the video data performed by the header analyzer 10.

The recording data rate of the program detected by the rate identifying circuit 18 is supplied to the record data controller 19. The operations of the record data controller 19 will be described in conjunction with FIG. 4. The recording data rate received through the input terminal 50 is supplied to the recording mode setting circuit 55, and a recording mode optimal for recording the program is selected from among four kinds of recording modes, and then output. For example, when the data rate for recording of data representing the program is 5.5 Mbps, the (¼)x recording mode (6.5 Mbps recording mode) is selected. When the data rate is 9.0 Mbps, the (½)x recording mode (12.5 Mbps recording mode) is selected.

The output of the recording mode setting circuit 55 is supplied to the recording timing signal generator 56, special playback data coding amount setting circuit 57, and servo system reference signal generator 58. The Servo system reference signal generator 58 generates a reference signal, tape travel speed information, Crack identification signal (information representing a track number and the frequency information of the pilot signals for the 4-track period). In the second embodiment, the rotating speed of the rotary drum 25 is 9000 rpm in any of the recording modes. In response to a recording mode signal, the special playback data coding amount setting circuit 57 supplies the special playback data generator 12, second memory 16, and third memory 17 with coding amount control information concerning the special playback data, which is to be recorded in areas B0 and A0 to A4 (See FIG. 15) in the standard recording mode, areas B20 and A20 to A24 (See FIG. 37) in the (½)x recording mode, areas B30 and A30 to A34 (See FIG. 38) in the (⅓)x recording mode, or areas B40 and A40 to A44 (See FIG. 39) in the (¼)x recording mode.

The recording timing signal generator 56 generates various control signal on the basis of a selected recording mode and a reference signal for controlling the rotation phase of the rotary drum 25 and sent from the servo system reference signal generator 58. Details will be described later.

The intra picture data (hereinafter referred to as intra-frame) detected by the header analyzer 10 (the following description relates to the case where data encoded frame by frame is recorded) is converted at the parallel-to-serial converter 11 into bit stream data of one bit. The bit stream data of the intra frame obtained by the conversion into the serial data of one bit is supplied to the special playback data generator 12.

Next, the operations of the special playback data generator 12 will be described with reference to FIG. 2. Picture compression conforming to the MPEG2 recommendations involves discrete cosine transform (hereinafter referred to as DCT) on a block of eight lines by eight pixels (hereinafter referred to as a DCT block), quantizing the data (hereinafter referred to as DCT coefficients) obtained by the DCT, sequential reading of the DCT coefficients, from the low-frequency components where the power spectrum is concentrated, in a scanning sequence called a zig-zag scanning sequence, and encoding the length of runs of coefficient "zero" (separating the run-length data and the coefficient data). The data having been run-length encoded is two-dimensional variable-length encoded, to thereby reduce the transmission rate.

The serial data of the intra picture having been input through the input terminal 35 is supplied to the variable-length decoder 4, data extractor 6a and data extractor 6b. The variable-length decoder 4 applies variable-length decoding to the input bit stream. In the second embodiment, the input bit stream is not completely decoded at the time of the variable-length decoding, but only the run-length of the variable-length codewords and the code length of the variable-length codewords are detected, and output, to reduce the size of the circuitry. However, it is also possible to perform the variable-length decoding completely. The counter 5 counts the number of the DCT coefficients within one DCT block decoded on the basis of the run-length, and supplies the result of counting to the data extractors 6a and 6b.

Description will now be made of the operations in each of the standard recording mode (See FIGS. 15 and 32), (½)x recording mode (See FIGS. 37 and 40), (⅓)x recording mode (See FIGS. 38 and 41), and (¼)x recording mode (See FIGS. 39 and 42). The operations in the standard recording mode will first be described. In the standard recording mode, the data extractor 6a extracts variable-length codewords constituting the 4x speed playback data to be transmitted on the basis of the coding amount control information (the number of DCT coefficients to be transmitted) concerning the 4x speed playback data (in the second embodiment, a signal to be recorded in area B0 is referred to as "4x speed playback data" for convenience sake and a signal to be recorded in areas A0 to A4 is referred to as "18x speed playback data" for convenience sake), which is received from the special playback data coding amount setting circuit 57 through the input terminal 36, and the the result of counting at counter 5. The number of the DCT coefficients obtained by decoding, and output from the counter 5 is compared with the coding amount control information input via the input terminal 36, and the timing at which the data is extracted is controlled such that the variable-length codeword up to the time point when the coding amount control information is exceeded. The demarcation of the variable-length codeword is detected by the code length information output from the variable-length decoder 4.

Similarly, the data extractor 6b extracts variable-length codewords constituting the 18x speed playback data on the basis of the coding amount control information concerning the 18x speed playback data and the information sent from the counter 5 and variable-length decoder 4. An EOB code is appended to the end of each DCT block in the extracted data by the EOB appending circuits 7a and 7b. The resultant data is then output through the output terminals 37a and 37b, respectively. The start of each DCT block is detected by the variable-length decoder 4 and supplied to the counter 5 and data extractors 6a and 6b.

The number of DCT coefficients for which data is extracted may be the same or different between different recording modes or multiple speeds. The fact that the number of DCT coefficients is different from one recording mode to another means that the number of DCT blocks to be recorded in the special playback transport packet is different from one recording mode to another. The number of areas in which special playback data can be recorded is limited as described previously. Assuming that each of the special playback data recording areas for each special playback speed consists of the same number of sync blocks, a larger number of DCT coefficients recorded per DCT block becomes requires more special playback data recording areas, and results in a longer cycle of updating (hereinafter referred to as refresh cycle) of the fast playback image data during fast playback. The quality of the reproduced picture improves with increase in the number of DCT coefficients transmitted. By contrast, when the number of DCT coefficients recorded per DCT block decreases, the amount of special playback data per frame becomes smaller, and the number of special playback data recording areas that are needed decr cases. This results in a shorter refresh cycle for a fast playback picture. However, since the number of DCT coefficients recorded is small, the quality of a reproduced picture is poor. The amount of data extracted for each of the recording modes and each of the fast playback speeds should be therefore determined through the trade-off between the refresh cycle and picture quality.

The 4x speed playback data and 18x speed playback data which are output from the special playback data generator 12 are supplied to the 4x speed data generator 14 and 18x speed data generator 15 respectively. The subsequent processing is the same between the different playback speeds (4x and 18x speeds). Only the manner of producing the 4x speed playback data will therefore be described below. FIG. 3 will be used for the following description of the operations of the 4x speed data generator 14. The 4x speed data generator 14 generates the 4x speed playback transport packets using transport header information and other various header information (including additional information) sent from the header analyzer 10 as well as the 4x speed playback data sent from the special playback data generator 12. The transport header modifying circuit 42 modifies the transport header information received through the input terminal 40.

Specifically, the header information indicating the continuity of transport packets, and provided in a transport header of a transport packet carrying an intra picture is rewritten according to the intra picture information sent from the header analyzer 10. The header appending circuit 43 appends header information such as a sequence header, picture header, and slice header which are detected by the header analyzer 10, and information needed to decode the special playback data and provided in each header (for example, a coding mode flag or quantization table information), to the special playback bit stream sent from the special playback data generator 12.

The special playback data with header information appended is subjected to parallel-to-serial conversion at the packeting circuit 44 into data in which one byte consists of eight bits. The eight-bit data resulting from the serial-to-parallel conversion is partitioned into units of 184 bytes, whereby data parts of transport packets are constructed. During the serial-to-parallel conversion, "0" data is filled in Front of each header information so that each header information is fitted in 4 bytes. This is because, each header information is formed of 32 bits, and it is necessary that each header information is formed of 4 bytes.

Specifically, when header information extends over five bytes, "0" data is filled in front of the header information so that the header information is fitted in four bytes. The transport header appending circuit 45 appends transport header information sent from the transport header modifying circuit 42 to data of the transport packet of 184 bytes, which is composed at the packeting circuit 44. The resultant data is output from the transport header appending circuit 45. Reading of the header information from the transport header modifying circuit 42 is effected on the basis of the timing signal output from the packeting circuit 44. The 4x speed playback data generator by the 4x speed data generator 14 is supplied in the form of transport packets to the second memory 16.

The manner of packeting the 4x speed playback data for form transport packets has been described so far. The 18x speed playback data is similarly processed. The 18x speed playback data produced by the special playback data generator 12 is supplied to the 18x speed data generator 15. In the 18x speed data generator 15, the header appending circuit 43 appends headers and additional information according to the header information sent from the header analyzer 10. Thereafter, the packeting circuit 44 performs serial-to-parallel conversion as mentioned above, to form the data part of the transport packets. The transport header appending circuit 45 appends modified transport headers sent from the transport header modifying circuit 42, and the resultant data is output in the form of transport packets to the third memory 17.

The special playback transport packets sent from the 4x speed data generator 14 and 18x speed data generator 15 are supplied to the second memory 16 and third memory 17, respectively. At this time, in the second memory 16 and third memory 17, the storage area for one frame of the special playback data is set on the basis of the coding amount information sent from the record data controller 19. In the second memory 16 and third memory 17, the input transport packets are stored in the above-mentioned storage area. Thereafter, one frame or field of the special playback data is structured.

One frame of special playback data which is structured in the second memory 16 and third memory 17 is read out, two transport packets by two transport packets, in response to a data request signal sent from the data synthesizer 20, and converted into data of 5 sync blocks, as shown in FIG. 13B, and supplied to the data synthesizer 20. At this time, header information H1 and H2 is appended as shown in FIG. 13B.

The transport packets received through the input terminal 1 are supplied to and stored in the first memory 13. The data is read from the first memory 13 in response to a control signal (data request signal) sent from the data synthesizer 20. Every two transport packets of the data having been input in transport packet units is converted into data of 5 sync blocks, as shown in FIG. 13B. In the same way as the special playback data, when the data of sync block is output from the first memory 13, header information HI and H2 is appended data.

The record data controller 19 forms recording formats in response to a control signal sent from the recording timing generator 56. The operations for producing the recording formats will be described below. The recording timing signal generator 56 supplies the data synthesizer 20 with a track identification signal for identifying a track within a track format in which the special playback data is to be recorded, a track number and sync block information signal for generating a recording format which differs depending on the recording mode, on the basis of tile recording mode sent from the recording mode setting circuit 55. In addition, the recording timing signal generator 56 sends a data generation start signal to the data synthesizer 20 and error-correction encoder 22 according to a reference signal for controlling the rotation phase of the rotary drum 25 and sent from the servo system reference signal generator 58, and the recording mode.

FIGS. 9A to 9M shows control signals sent from the recording timing signal generator 56 in respective recording modes. Control signals sent from the recording timing signal generator 56 will be described for the respective recording modes. FIG. 9A shows a reference signal for controlling the rotation phase of the rotary drum 25 and sent from the servo system reference signal generator 58. FIG. 9B shows a data generation start signal for the standard recording mode. FIG. 9C shows a data recording timing signal supplied to the recording amplifiers 24a and 24b in the standard recording mode. Actually, the recording timing signal supplied to the recording amplifier 24b lags behind the recording timing signal supplied to the recording amplifier 24a by a time corresponding to the distance between the rotary heads (normally, about five sync blocks). FIG. 9D shows the timing of recording data of each channel in the standard recording mode. As illustrated, in the standard recording mode, the respective control signals are provided every rotation of the rotary drum 25, and data is recorded on the magnetic tape.

FIG. 9E shows a data generation start signal for the (½)x recording mode. FIG. 9F shows a data recording timing signal supplied to the recording amplifiers 24a and 24b in the (½)x recording mode. FIG. 9G shows the timing of recording data of each channel in the (½)x recording mode. As illustrated, in the (½)x recording mode, the control signals are provided every two rotations of the rotary drum 25, and data is recorded on magnetic tape.

FIG. 9H shows a data generation start signal for the (⅓)x recording mode. FIG. 9I shows a data recording timing signal supplied to the recording amplifiers 24a and 24b in the (⅓)x recording mode. FIG. 9J shows the timing of recording data of each channel in the (⅓)x recording mode. As illustrated, in the (⅓)x recording mode, the control signals are provided every three rotations of the rotary drum 25, and data is recorded on the magnetic tape.

FIG. 9K shows a data generation start signal for the (¼)x recording mode. FIG. 9L shows a data recording timing signal supplied to the recording amplifiers 24a and 24b in (¼)x recording mode. FIG. 9M shows the timing of recording data of each channel in the (¼)x recording mode. As illustrated, in the (¼)x recording mode, the control signals are provided every four rotations of the rotary drum 25, and data is recorded on the magnetic tape. In practice, as mentioned above, the recording timing signal supplied to the recording amplifier 24b lags behind the recording timing signal supplied to the recording amplifier 24a by a time corresponding to the distance between the rotary heads (normally, about five sync blocks).

The data synthesizer 20 generates recording formats to in response to the control signals. In response to the data generation start signal, the formatting circuit controller 127 sets the kinds of special playback data which is to be recorded on tracks of respective channels and recording areas, on the basis of the track number of a track to be recorded next, and the track identification within the track format. The formatting circuit 126 generates recording formats so that recording format on the basis of the sync block information signal sent to the formatting circuit controller 127 from the record data controller 19 so that the 4x speed playback data and 18x speed playback data will be arranged in the areas on tracks predetermined for each recording mode. At this time, the number of repetitions of the special playback data are checked for each playback speed. When the predetermined number of repetitions has been reached, the next special playback data is read from the memory storing the corresponding special playback data, and a data request signal is output.

Specifically, where the 18x speed playback data has been recorded repeatedly 18 times in the standard recording mode, the data request signal is applied to the third memory 17 output to command output of the next special playback data of 25 sync blocks. The 18x speed playback data of 25 sync blocks read from the third memory 17 is temporarily stored in a 18x speed playback data storage memory provided in the data synthesizer 20. Likewise, where the 4x speed playback data is recorded repeatedly twice in the standard recording mode, the data request signal is applied to the second memory 16 to command output of the next special playback data of 25 sync blocks. The 4x speed playback data of 25 sync blocks being read from the second memory 16 is temporarily stored in a 4x speed playback data storage memory provided in the data synthesizer 20. Where the number of repetitions is not more a predefined value, the record data is generated using the special playback data for each playback speed stored in the data synthesizer 20.

Likewise, where the 36x speed playback data has been recorded repeatedly 18 times in the (½)x recording mode, the data request signal is applied to the third memory 17 to command output of the next special playback data of 25 sync blocks. The 36x speed playback data of 25 sync blocks being read from the third memory 17 is temporarily stored in the 18x speed playback data storage memory provided in the data synthesizer 20. Likewise, when the 8x speed playback data is recorded repeatedly twice in the (½)x recording mode, the data request signal is applied to the second memory to command output of the next special playback data of 25 sync blocks. The 8x speed playback data cow, ring 25 sync blocks read from the second memory 16 is temporarily stored in the 4x speed playback data storage memory provided in the data synthesizer 20. When the number of repetitions is not more than a predefined value, the record data is generated using the special playback data for each playback speed stored in the data synthesizer 20.

Likewise, when the 54x speed playback data has been recorded repeatedly 18 times in the (⅓)x recording mode, the data request signal is applied to the third memory 17 to command output of the next special playback data of 25 sync blocks. The 54x speed playback data of 25 sync blocks read from the third memory 17 is temporarily stored in the 18x speed playback data storage memory provided in the data synthesizer 20. Likewise, when the 12x speed playback data is recorded repeatedly twice in the (⅓)x recording mode, the data request signal is applied to command output of the next special playback data of 25 sync blocks. The 12x speed playback data of 25 sync blocks read from the second memory 16 is temporarily stored in the 4x speed playback data storage memory provided in the data synthesizer 20. If the number of repetitions is nor more than a predefined value, the record data is generated using the special playback data for each playback speed stored in the data synthesizer 20.

Likewise, when the 72x speed playback data has been recorded repeatedly 18 times in the (¼)x recording mode, the data request signal is applied to the third memory 17 to command output of the next special playback data of 25 sync blocks. The 72x speed playback data covering 25 sync blocks read from the third memory 17 is temporarily stored in the 18x speed playback data storage memory provided in the data synthesizer 20. Likewise, when the 16x speed playback data is recorded repeatedly twice in the (¼)x recording mode, the data request signal is applied to the second memory 16 to command output of the next special playback data of 25 sync blocks. The 16x speed playback data of 25 sync blocks read from the second memory 16 is temporarily stored in the 4x sped playback data storage memory provided in the data synthesizer 20. If the number of repetitions is not more than a predefined value, the record data is generated using the special playback data for each playback speed stored in the data synthesizer 20.

When the checking of the number of repetitions of the special playback data is completed, data arrangement within one track is set using the track identification signal. The track identification signal is an identification on signal for identifying the tracks T1 to T4 shown in FIG. 15. the second embodiment, data for two tracks is recorded substantially simultaneously, so that the track identification signal is for identifying the track T1 or track T3. First, data arrangement within the track recorded by the rotary head 26a is set. When the data arrangement within one track is set, the special playback data for each playback speed is read from the first memory 13 and data synthesizer 20 in sync block units (sync block by sync block), and the record data of one track is generated and supplied to the fourth memory 21. When the generation of the record data of one track recorded by the rotary head 26a is completed, generation of the track recorded by the rotary head 26a is then performed in a similar procedure.

The record data of two tracks generated by the data synthesizer 20 is temporarily stored in the Fourth memory 21. Error-correction codes conforming to the SD standards are then generated by the error-correction encoder 22 for the record data of each channel stored in the fourth memory 21, and appended to the record data (See FIGS. 10A and 10B). In response to the data generation start signal sent from the recording timing generator 56, the error-correction encoder 22 supplies a reading control signal to the fourth memory 21 so as to read the data of two tracks with the error-correction codes appended thereto, substantially simultaneously. In the fourth memory 21, the record data of one track for each channel is read in response to the reading control signal. At this time, the track format according to the SD standard is formed. Specifically, a gap of 5 bytes is interposed between the sync blocks for appending the sync signal and ID signal, and gaps of a predetermined size are interposed between the ITI area, subcode area and the data, and the data is then output. The output of the fourth memory 21 is input to the digital modulators 23a and 23b.

The digital modulators 23a and 23b first append a sync signal and ID signal to the start of each sync block. In the second embodiment, a recording mode identification signal is recorded as the ID signal. The data with the ID signal appended is digitally modulated and supplied to the recording amplifiers 24a and 24b. The digital modulation is carried out on the basis of the track identification information sent from the recording timing signal generator 56. The digitally-modulated data sent to the recording amplifiers 24a and 24 is amplified and recorded on the magnetic tape by the rotary heads 26a and 26b.

Next, the operations of the servo system will be described. A reference signal for controlling the rotary drum 25 and sent from the servo system reference signal generator 58 is input to the drum motor controller 27. The drum motor controller 27 controls the drum motor 28 according to the reference signal and the phase information concerning the rotary heads 26a and 26a which is output from the drum motor 28, so as to cause the drum motor 28 to rotate at 9000 rpm. The drum motor 28 is driven by a driving voltage generated by the drum motor controller 27. The rotation phase of the rotary drum 25 is supplied from the drum motor 28 to the drum motor controller 27.

Likewise, the capstan motor controller 29 controls the capstan motor according to the reference signal for controlling the rotary drum 25, the recording mode, and capstan motor rotation information sent from the capstan motor 30 (magnetic tape travel speed information). The magnetic tape travel speed is controlled to be as set forth tn FIG. 7 for the respective recording modes, i.e., control is so made that if the magnetic tape travel speed for the standard recording mode is assumed to be 1, the travel speed for the (½)x recording mode is 1/2, the travel speed for the (⅓)x recording mode is 1/3, and the travel speed for the (¼)x recording mode is 1/4. The capstan motor controller 29 supplies a driving voltage for driving the capstan motor 30 on the basis of the reference signal used to control the rotary drum 25 and the capstan motor rotation information, so as to maintain the above tape travel speed according to the recording mode. The capstan motor rotation information is supplied from the capstan motor 30 to the capstan motor controller 29.

Next, description is made of the configuration of a playback system in a digital VTR for reproducing a magnetic tape having the above recording format. The configuration of the playback system of the second embodiment, which is shown in FIG. 21, is identical to the one described in connection with the first embodiment.

Prior to the description of the operations of the playback system, description is made of the operations of a digital VTR in the second embodiment for performing the fast playback in which 4x speed playback data is reproduced at a speed set for each recording mode, with reference to FIGS. 33 and 43 to 45. In the fast playback for reproducing the 4x speed playback data, both the magnetic tape travel speed and the phases of the rotary heads 26a and 26a are controlled.

FIG. 33 shows the scanning traces scanned by the rotary head 26b when the data recorded in the standard recording mode is reproduced from the magnetic tape at a 4x speed. As illustrated, in the case of the standard recording mode, as mentioned above, the 4x speed playback data is recorded on tracks of channel B. As mentioned above, the same data is recorded repeatedly for two track formats (identical data is recorded at two recording areas). If the phase of the rotary head 26b is controlled so that the rotary head 26b will provide a maximum playback output at the center of the area B0, all the 4x speed playback data can be reproduced, as shown in FIG. 33. When the data recorded in the standard recording mode is reproduced from the magnetic tape at the 4x speed, the data in the subcode area can also be reproduced by the rotary head 27b, as shown in FIG. 33. Besides, tracking can be controlled at an ITI area.

Figure 43:
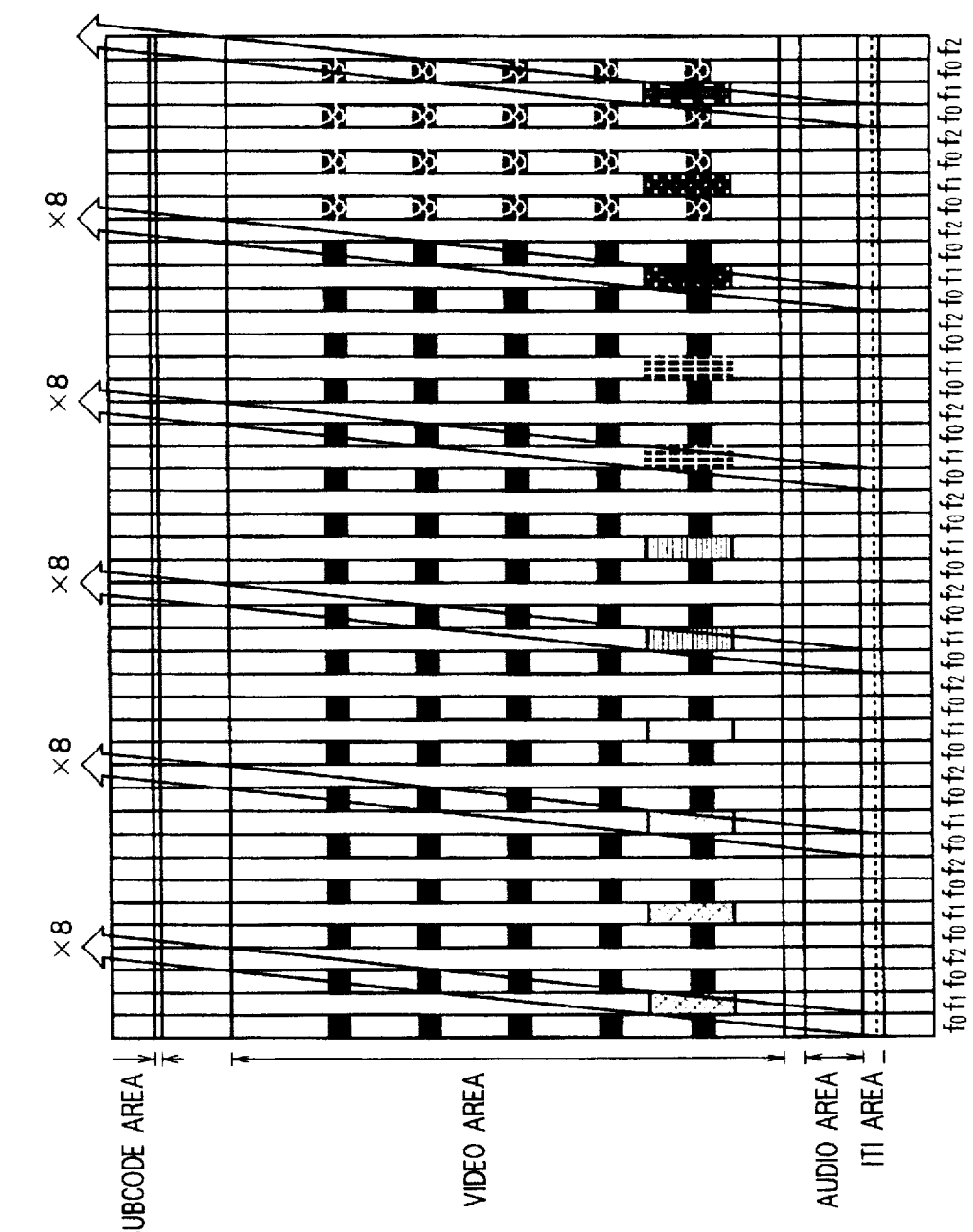
FIG. 43 shows the scanning trace of a rotary head when the record pattern of FIG. 40 in the case of a rate of 12.5 Mbps is reproduced at a 8x speed.

FIG. 43 shows the traces scanned by the rotary head 26a when the data recorded in the (½)x recording mode is reproduced from the magnetic tape at an 8x speed. As illustrated, in the case of the (½)x recording mode, the same 4x speed playback data is recorded repeatedly for two track formats as described previously. If the phase of the rotary head 26a is controlled so that the rotary head 26b will provide a maximum playback output at the center of area B20, all the 4x speed playback data can be reproduced as shown in FIG. 43. When the data recorded in the (½)x recording mode is reproduced from the magnetic tape at the 8x speed, as shown in FIG. 43, the data in the subcode area can also be reproduced by the rotary head 27b.

Figure 44:
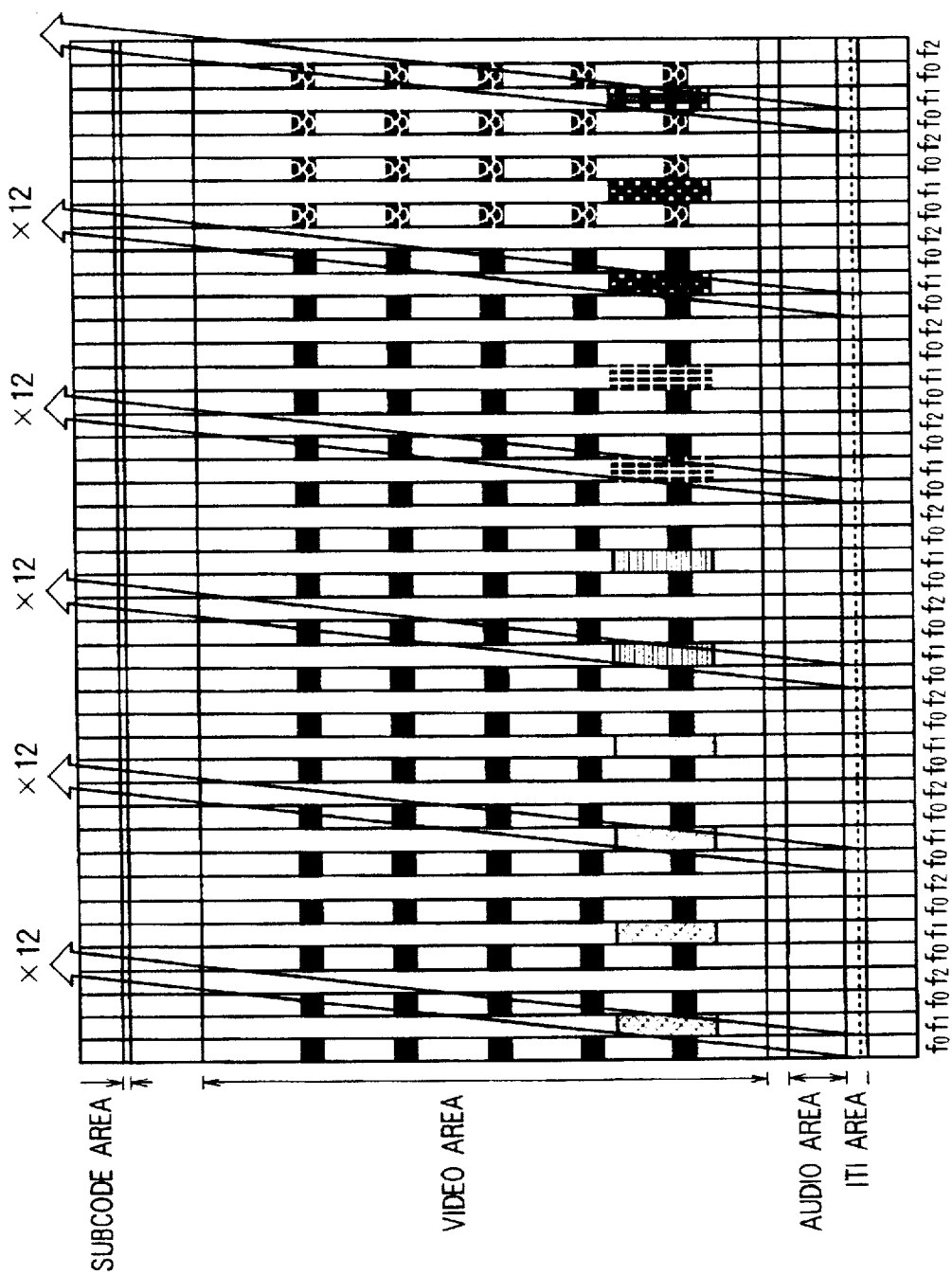
FIG. 44 shows the scanning trace of a rotary head when the record pattern of FIG. 41 in the case of a rate of 8.33 Mbps is reproduced at a 12x speed.

FIG. 44 shows the traces scanned by the rotary head 26a when the data recorded in the (⅓)x recording mode is reproduced from the magnetic tape at a 12x speed. As illustrated, when the data is recorded :in the (⅓)x recording mode, as described previously, the same 4x speed playback data is recorded repeatedly for two track formats. When the phase of the rotary head 26a is controlled so that the rotary head 26a will provide a maximum playback output at the center of area B30, al the 4x speed playback data can be reproduced as shown in FIG. 44. When the data recorded in the (⅓)x recording mode is reproduced from the magnetic tape at the 12x speed, the data in the subcode area can also be reproduced by the rotary head 27b, as shown in FIG. 44.

Figure 45:
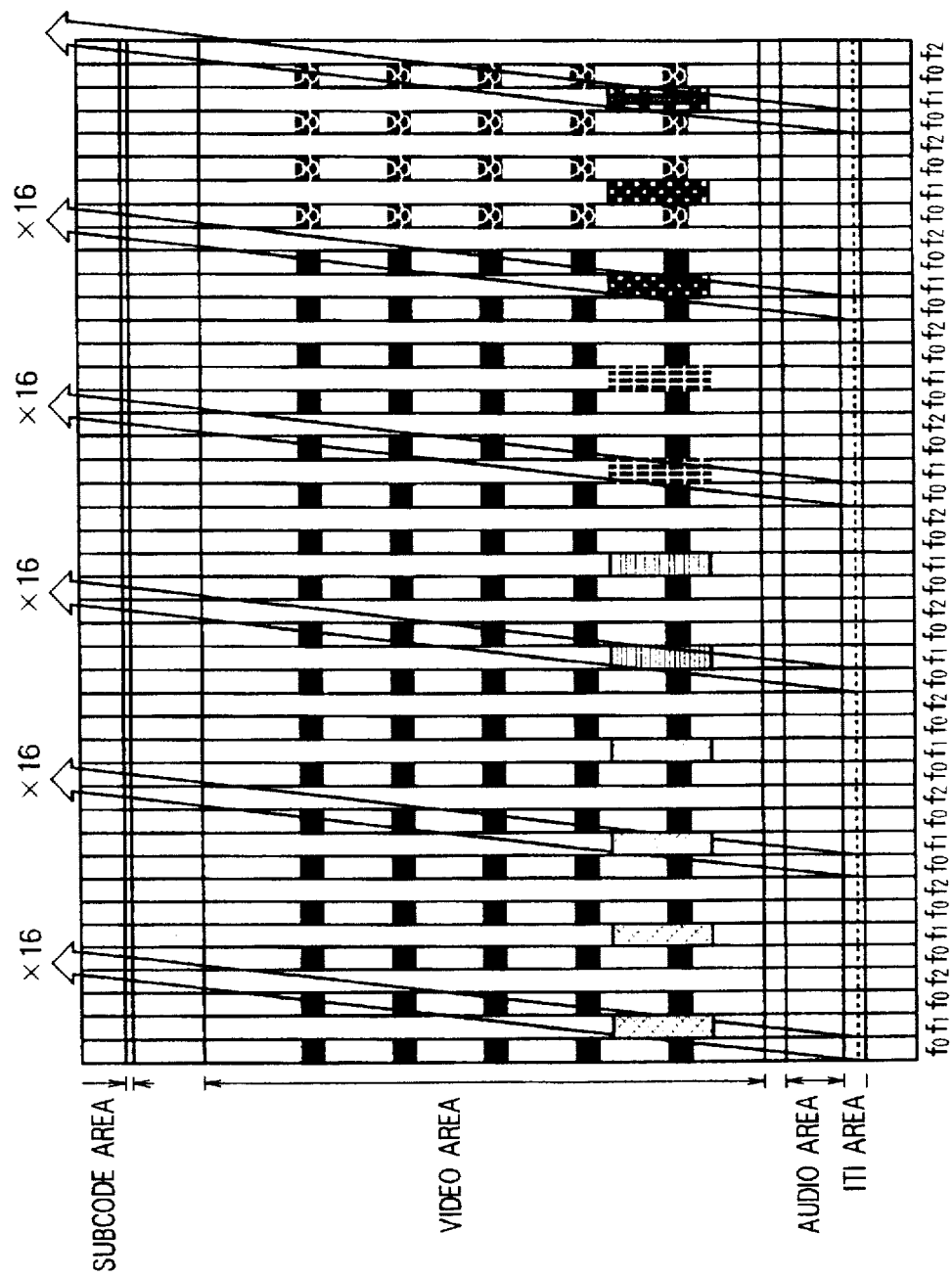
FIG. 45 shows the scanning trace of a rotary head when the record pattern of FIG. 42 in the case of a rate of 6.25 Mbps is reproduced at a 16x speed.

FIG. 45 shows the traces scanned by the rotary head 26b when the data recorded in the (¼)x recording mode is reproduced from the magnetic tape at a 16x speed. As illustrated, when the data is recorded in the (¼)x recording mode, as described previously, the same 4x speed playback data is recorded repeatedly for two track Formats. When the phase of the rotary head 26b is controlled so that the rotary head 26b will provide a maximum playback output at the center of area B40, all the 4x speed playback data can be reproduced as shown in FIG. 45. When the data recorded in the (¼)x recording mode is reproduced from the magnetic tape at the 16x speed, the data in the subcode area can also be reproduced by the rotary head 27b, as shown in FIG. 45.

Next, description will be made of the operations of the digital VTR in the second embodiment for performing the Fast playback for reproducing the 18x speed playback data with reference to FIGS. 34 and 46 to 48. In the fast playback for reproducing 18x speed playback data, both the magnetic tape travel speed and the phases of the rotary heads 26a and 26b are controlled.

FIG. 34 shows the traces scanned by the rotary head 26a when the data recorded in the standard recording mode is reproduced from the magnetic tape at an 18x speed. As illustrated, when the data is recorded in the standard recording mode, as described previously, the 18x speed playback data is recorded on tracks of channel A (areas A0 to A4). As described previously, the same data is recorded repeatedly for nine track formats (identical data is recorded on 18 tracks). All the 18x speed playback data can therefore be reproduced as shown in FIG. 34. When the data recorded in the standard recording mode is reproduced at the 18x speed, as shown in FIG. 24, the data in the subcode area can also be reproduced by the rotary head 26a. Moreover, tracking can be controlled at an ITI area.

Figure 46:
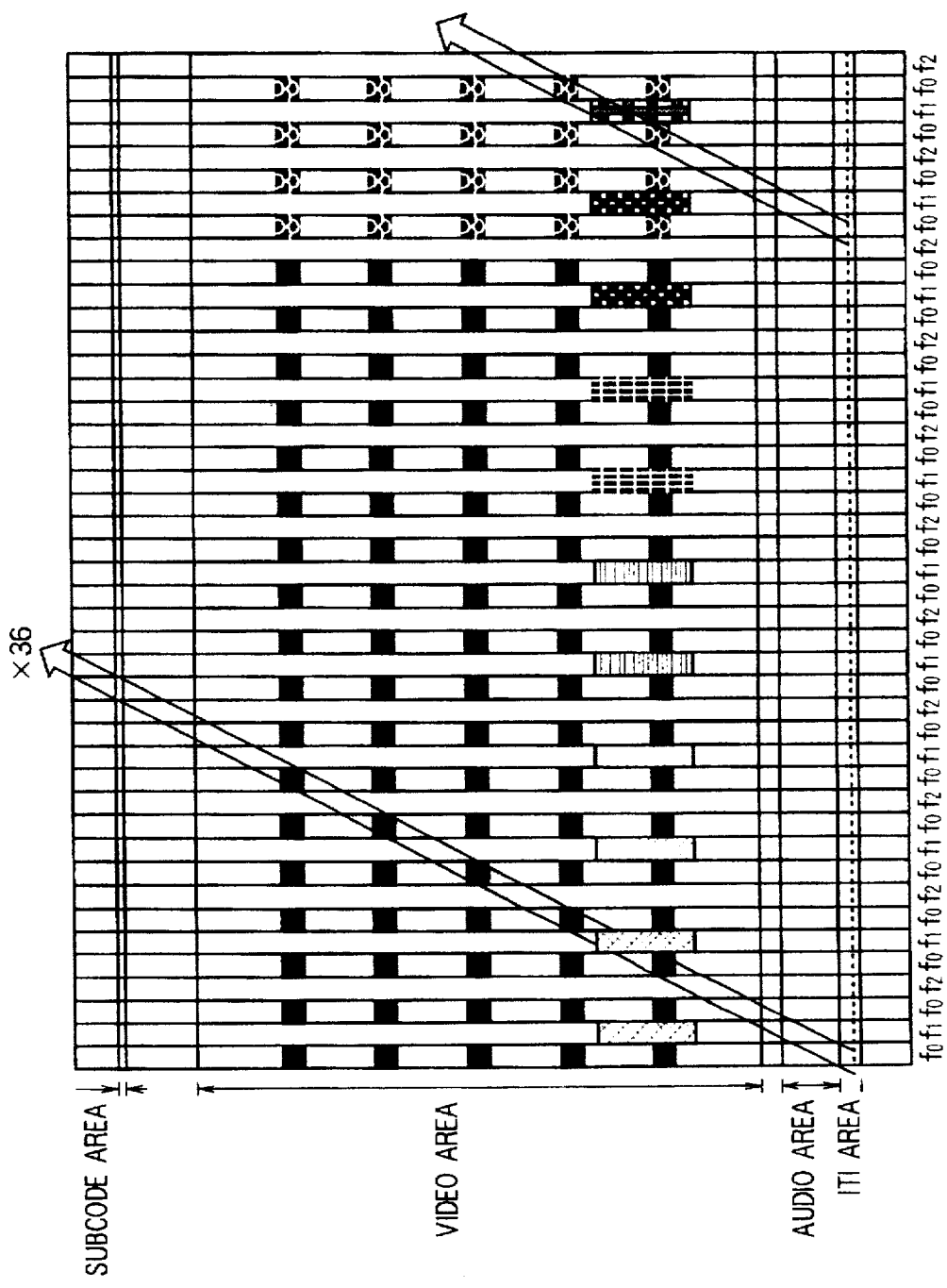
FIG. 46 shows the scanning trace of a rotary head when the record pattern of FIG. 40 in the case of a rate of 6.25 Mbps is reproduced at a 36x speed.

FIG. 46 shows the traces scanned by the rotary head 26a when the data recorded in the (½)x recording mode is reproduced from the magnetic tape at a 36x speed. As illustrated, when the data is recorded in the (½)x recording mode, as described previously, the 18x speed playback data is recorded on tracks of channel A (areas A20 to A24). As described previously, the same data is recorded repeatedly for nine track formats (identical data is recorded on 18 tracks). All the 18x speed playback data can therefore be reproduced as shown in FIG. 46. When the data recorded in the (½)x recording mode is reproduced from the magnetic tape at the 36x speed, the data in the subcode area can also be reproduced, as shown in FIG. 46.

Figure 47:
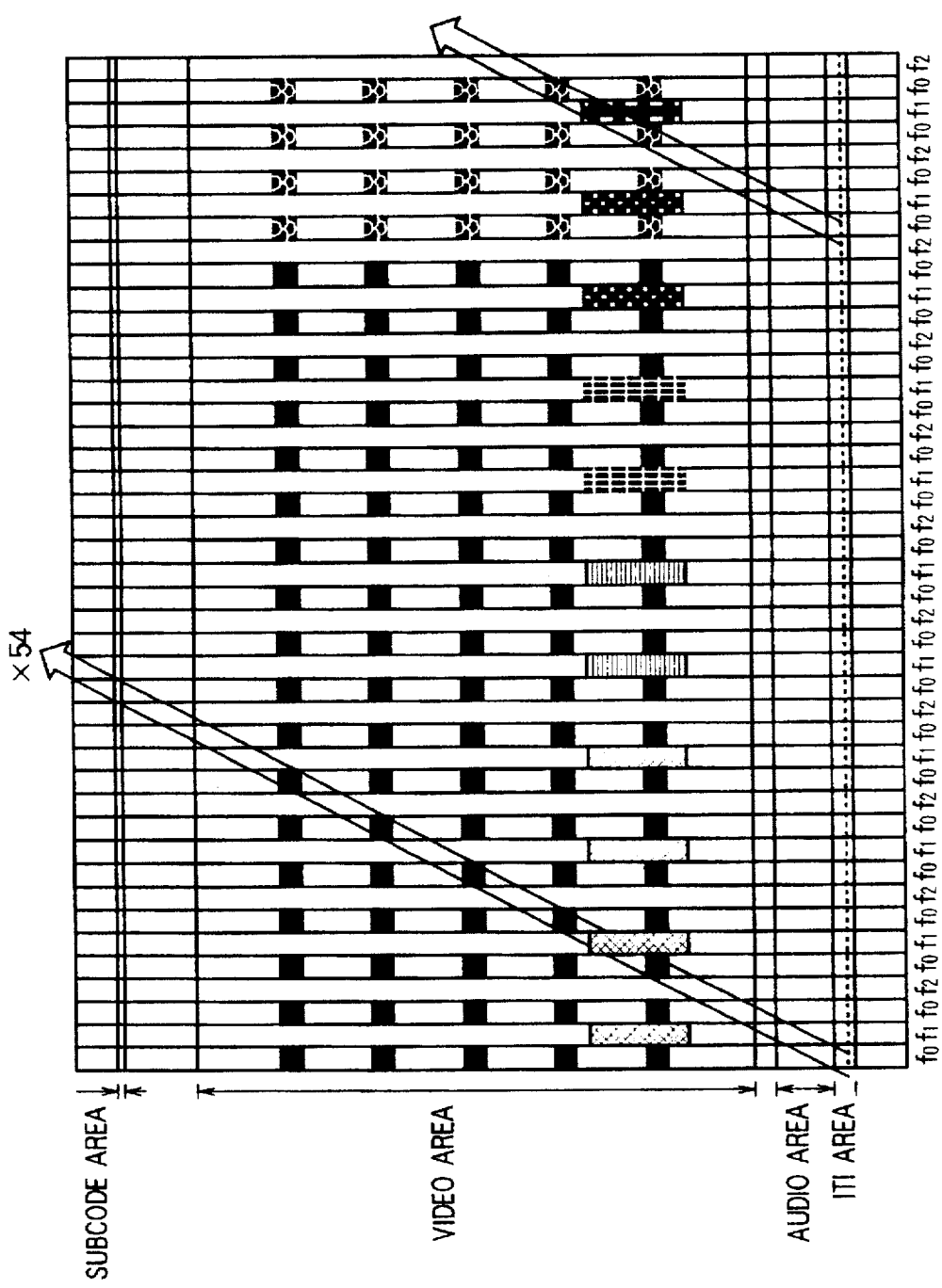
FIG. 47 shows the scanning trace of a rotary head when the record pattern of FIG. 41 in the case of a rate of 8.33 Mbps is reproduced at a 54x speed.

FIG. 47 shows the traces scanned by the rotary head 26a when the data recorded in the (⅓)x recording mode is reproduced from the magnetic tape at a 54x speed. As illustrated, when the data is recorded in the (⅓)x recording mode, as described previously, the 18x speed playback data is recorded on tracks of channel A (areas A20 to A24). As described previously, the same data is recorded repeatedly for nine track formats (identical data is recorded on 18 tracks). All the 18x speed playback data can therefore be reproduced as shown in FIG. 47. When the data recorded in the (⅓)x recording mode is reproduced from the magnetic tape at the 54x speed, the data in the subcode area can also be reproduced, as shown in FIG. 47.

Figure 48:
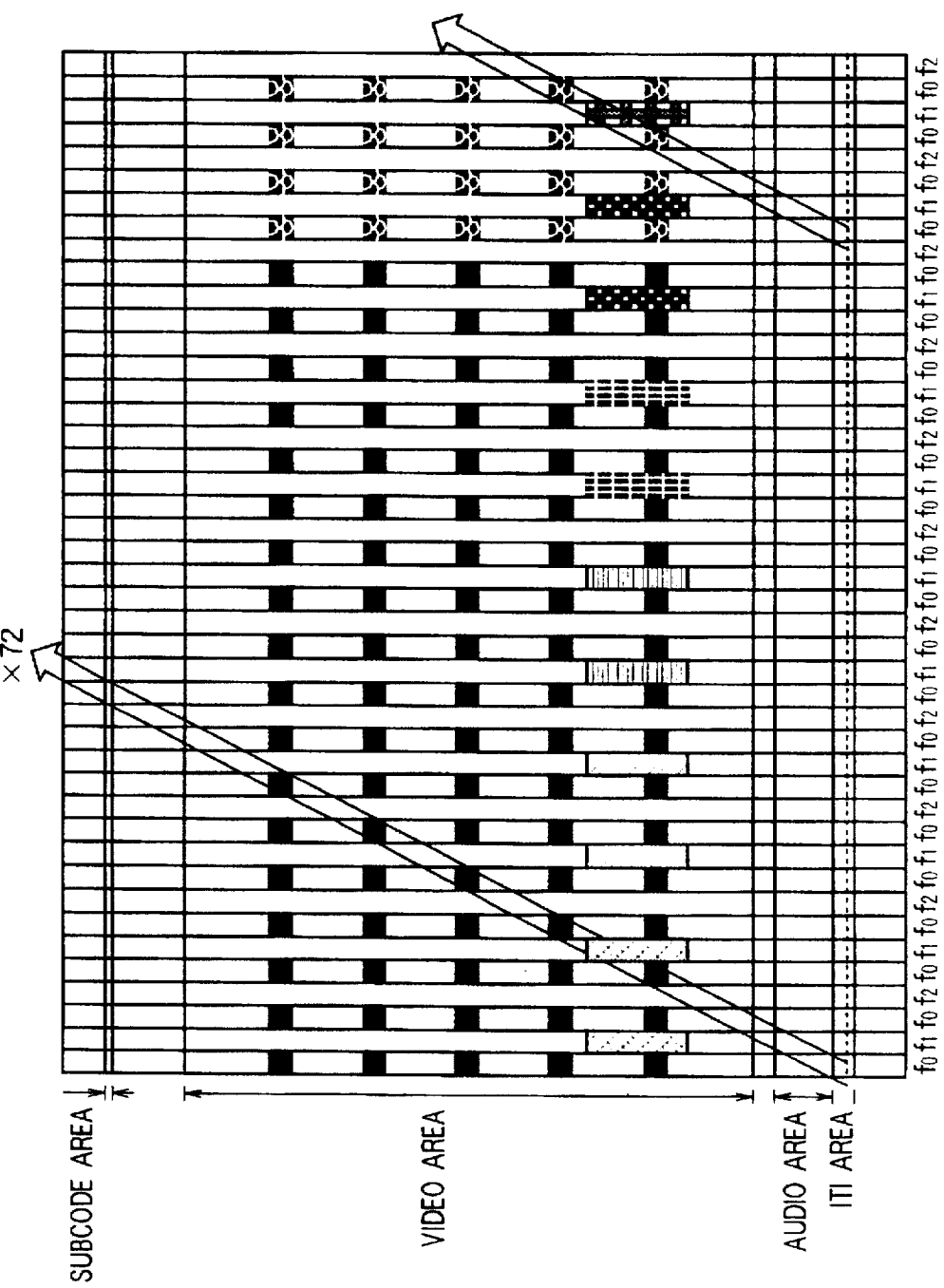
FIG. 48 shows the scanning trace of a rotary head when the record pattern of FIG. 42 in the case of a rate of 6.25 Mbps is reproduced at a 72x speed.

FIG. 48 shows the traces scanned by the rotary head 26a when the data recorded in the (¼)x recording mode is reproduced from the magnetic tape at a 72x speed. As illustrated, when the data is recorded in the (¼)x recording mode, as described previously, the 18x speed playback data is recorded on tracks of channel A (areas A20 to A24). As described previously, the same data is recorded repeatedly for nine track formats (identical data is recorded on 18 tracks). All the 18x speed playback data can therefore be reproduced as shown in FIG. 48. When the data recorded in the (¼)x recording mode is reproduced from the magnetic tape at the 72x speed, the data in the subcode area can also be reproduced as shown in FIG. 48.

In the case of the standard recording mode, tracking during fast playback can be controlled at an ITI area. Alternatively, in the case of the 18x speed playback, the tracking phase may be detected at one of the special playback data recording areas, or at a plurality of the special playback data recording areas, for tracking control. In the case of the 4x speed playback, the tracking phase may be detected at a predefined position on an adjacent track A by means of the rotary head 26a, for tracking control. It is also possible to perform rough adjustment of the tracking phase at the ITI area, and fine adjustment at the special playback area. The above tracking control system is particularly effective where there is a track non-linearly in compatible playback (playback by a compatible device).

Next, description will next be made of the operations of the above playback system during the normal playback. The data reproduced from the magnetic tape by the rotary heads 26a and 26b on the rotary drum 25 is amplified by the playback amplifiers 60a and 60b, and supplied to the digital demodulators 61a and 61b. The output of the playback amplifier 61a is also supplied to the capstan motor controller 29. The digital demodulators 61a and 61b perform data detection on the input playback data, conversion into playback digital data, and then digital demodulation. An ID signal appended to the start of each sync block is detected by the digital demodulators 61a and 61b. The playback digital data digitally demodulated by the digital demodulators 61a and 61b is supplied to the fifth memory 63, where one track of data is collected to structure an error correction code block shown in FIGS. 10A and 10B. When the structuring of an error-correction code block shown in FIGS. 10A and 10B is completed, detection and correction of errors that have occurred during playback using the c1 and C2 check codes at the error-correction decoder 63.

The playback digital data having been subjected to error correction at the error-correction decoder 63 is read from the fifth memory 62, and supplied to the sixth memory 64 and seventh memory 65. At this time, the special playback data (4x speed playback data and 18x speed playback data) reproduced from the special playback data recording areas is supplied to the seventh memory 65, while the playback digital data for normal playback is supplied to the sixth memory 64.

ID signals detected by the digital demodulators 61a and 61b are supplied to the recording mode detector 67. The recording mode detector 67 detects a data recording mode from the reproduced ID signals. The playback system controller 68 identifies the playback mode set for the digital VTR on the basis of the mode signal received through the input terminal 69. When the input mode signal designates the normal playback mode, the playback system controller 68 supplies the drum motor controller 27 with a reference signal used to control the rotation phase of the rotary drum 25, and the capstan motor controller 29 with tape travel speed information on the basis of the identified recording mode extracted from the ID signals.

Based on the select information sent from the playback system controller 68, the switch 66 selects the output of the sixth memory 64 in the normal playback mode. During the data reading, header information H1 and H2 is deleted from the normal playback data stored in the sixth memory 64 according to the sync block format shown in FIG. 13B, so that the original transport packets are restored, and supplied to the switch 66. The normal playback data sent from the sixth memory 64 is output through the output terminal 70 via the switch 66.

Next, the operations of the servo system during normal playback will be described. Based on the result of detection of the recording mode sent from the recording mode detector 67, the playback system controller 68 supplies tape travel speed information concerning the capstan motor to the capstan motor controller 68, and also outputs a signal indicating whether or not the rotation phase of the rotary drum 25 should be controlled. During normal playback, it is of course necessary to perform phase control irrespective of the recording mode. The reference signal used to control the rotation phase of the rotary drum 25 and sent from the playback system controller 68 is supplied to the drum motor controller 27. The drum motor controller 27 controls the drum motor at 9000 rpm according to the reference signal and the rotation phase information concerning the rotary heads 26a and 26b which is sent from the drum motor 28. The drum motor 28 is driven by a driving voltage applied by the drum motor controller 27. The rotation phase of the rotary drum is sent from the drum motor 28 to the drum motor controller 27. During playback, the rotation phase information concerning the rotary drum 25 is sent from the drum motor controller 27 to the capstan motor controller 29.

The capstan motor controller 29 controls the capstan motor according to the rotation phase information concerning the rotary drum 25, the recording mode, the tape travel speed information, the playback signal sent from the playback amplifier 60a, and the rotation information concerning the capstan motor (magnetic tape travel speed information) which is output from the capstan motor 30. The travel speeds of the magnetic tape for the respective recording modes are shown in FIG. 7. That is, if the travel speed of the magnetic tape for the standard recording mode is assumed to be 1, it is so controlled as to be ½ in the case of the (½)x recording mode, ⅓ in the case of the (⅓)x recording mode, and ¼ in the case of the (¼)x recording mode. During normal playback, the capstan motor controller 29 controls the magnetic tape travel speed according to the recording mode so that the travel speed will be maintained at the above speed for the recording mode. It also uses the rotation phase information concerning the rotary drum 25 and ATF information recorded in the ITI area to detect the rotation phase of the rotary drum 25 and perform phase control. The capstan motor rotation information is sent from the capstan motor 30 to the capstan motor controller 29.

Next, the operations in the fast playback mode will be described. The data reproduced intermittently from the magnetic tape by the rotary heads 26a and 26b on the rotary drum 25 is amplified by the playback amplifiers 61a and 61b, and then supplied to the digital demodulators 61a and 61b. The output of the playback amplifier 61a is also supplied to the capstan motor controller 29. The digital demodulators 61a and 61b perform data detection on the input playback data, transformation into playback digital data, and then digital demodulation. The ID signal appended to the start of each sync block is detected by the digital demodulator 61a and 61b. The playback digital data digitally demodulated by the digital demodulators 61a and 61b is supplied to the fifth memory 63.

When data is input to the fifth memory 62, the data read from the recording areas for the fast playback data are separated on the basis of the ID signals; sent from the digital demodulators 61a and 61b, and the special playback data alone is temporarily stored in the fifth memory 62. In the second embodiment, in the case of the fast playback using the data recorded in area B0, the data sent from the playback amplifier 60b and digital demodulator 61b is used for various kinds of control. In the case of the fast playback using the data recorded in areas A0 to A4, the data sent from the playback amplifier 60a and digital demodulator 61a is used for various kinds of control.

The special playback data stored in the fifth memory 62 is subjected to the error correction based on the C1 check code by the error-correction decoder 63 in units of one sync block. Thus, errors occurring during the fast playback are corrected and detected. The data having been subjected to error correction by the error-correction decoder 63 is successively read from the fifth memory 62, and then supplied to the seventh memory 65. The output of the fifth memory 62 is also supplied to the sixth memory 64, but in during the fast playback, the data is not written.

The special playback data is recorded at predefined addresses in the seventh memory 65 on the basis of the track number and sync block number extracted from the ID information as well as the header information H1 and H2, which is shown in FIGS. 13A and 13B, contained in the special playback data. The storage region for one frame of special playback data is determined on the basis of the recording mode signal sent from the recording mode detector 67. During data reading, the special playback data recorded in the seventh memory 65 according to the sync block format shown in FIG. 13B is read in units of five sync blocks, and the header information H1 and H2 is deleted from the special playback data, and the resultant data is supplied to the switch 66 in the form of transport packets. The normal playback data sent from the seventh memory 65 is output through the output terminal 70 via the switch 66.

Next, the operations of the servo system in the fast playback mode will be described. The ID signals detected by the digital demodulators 61a and 61b are supplied to the recording mode detector 67. The recording mode detector 67 detects the recording mode in which the data was recorded from the reproduced ID signals. The playback system controller 68 identifies the playback mode of the digital VTR on the basis of the mode signal received through the input terminal 69. When the input mode signal designates the fast playback mode, the playback system controller 68 supplies the switch 66 with a control signal to select the output of the seventh memory 65, and the servo system with various control signals.

Described below is the method of control of the servo system during the fast playback for using the area B0 (FIGS. 15 and 32) in the case of the standard mode, the area B20 (FIGS. 37 and 40) in the case of the (½)x recording mode, the area B30 (FIGS. 38 and 41) in the case of the (⅓)x recording mode, or the area B40 (FIGS. 39 and 42) in the case of the (¼)x recording mode. As described previously, during the fast playback using the area B0, B20, B30, or B40 in the case of each recording mode, both the magnetic tape travel speed and the rotation phase of tile rotary drum 25 are controlled irrespective of the recording mode. Theplayback system controller 68 supplies the drum motor controller 27 with a reference signal used to control the rotation phase of the rotary drum 25, and the capstan motor controller 29 with the tape travel speed information on the basis of the identified recording mode extracted from the ID signals.

The drum motor controller 27 controls the drum motor at 9000 rpm according to the reference signal and the rotation phase information concerning the rotary heads 26a and 26b which is sent from the drum motor 28. The drum motor 28 is driven by the driving voltage applied by the drum motor controller 27. The rotation phase of the rotary drum 25 is supplied from the drum motor 28 to the drum motor controller 27. During playback, the rotation phase information concerning the rotary drum 25 is sent from the drum motor controller 27 to the capstan motor controller 29.

The capstan motor controller 29 controls the capstan motor according to the rotation phase information concerning the rotary drum 25, the recording mode, the tape travel speed information, the playback signal sent from the playback amplifier 60b, and the rotation information concerning the capstan motor (magnetic tape travel speed information) which is sent from the capstan motor 30. In the phase control in this embodiment, tracking control is performed according to the rotation phase information concerning the rotary drum sent from the drum motor controller 27 so as to obtain a maximum reproduced output at the center of area B0 on the magnetic tape. The capstan motor controller 29 controls the magnetic tape travel speed to match the above tape travel speed information and also controls the rotation phase of the rotary drum 25 in the manner described above. In the case of the standard recording mode, as described previously, the ITI area is scanned during the 4x speed playback, so that the ATF information recorded in the ITI area may be used to detect the rotation phase of the rotary drum 25 for phase control. The rotation information concerning the capstan motor 30 is sent from the capstan motor 30 to the capstan motor controller 29.

Described next is the operations of the servo system in the fast playback mode for using the A0 to A4 (FIGS. 15 and 32) in the case of the standard recording mode, the areas A20 to A24 (FIGS. 37 and 40) in the case of the (½)x recording mode, the areas A30 to A34 (FIGS. 38 and 41) in the case of the (⅓)x recording mode, or the areas A40 to A44 (FIGS. 39 and 42) in the case of the (¼)x recording mode. As shown in FIG. 34, in the case of the standard recording mode, the record data is arranged so that the rotation phase of the rotary drum 25 can be controlled by detecting the tracking phase error at an ITI area. That is, the special playback data is arranged along the scanning traces of the rotary head 2a to ensure a sufficient data rate of the special playback data during the 18x speed playback.

The method of control of the servo system during the fast playback mode using the 18x speed playback data recorded in each recording mode will be described below. As described previously, during the fast playback using the areas A0 to A4, A20 to A24, A30 to A34, or A40 to A44 in the case of the standard recording mode, both the magnetic tape travel speed and the rotation phase of the rotary drum 25 are controlled irrespective of the recording mode. The playback system controller 68 supplies the drum motor controller 27 with a reference signal used to control the rotation phase of the rotary drum 25, and the capstan motor controller 29 with the tape travel speed information on the basis of the identified recording mode extracted from the ID signals.

The drum motor controller 27 controls the drum motor at 9000 rpm according to the reference signal and the rotation phase information concerning the rotary heads 26a and 26b which is sent from the drum motor 28. The drum motor 28 is driven by the driving voltage applied by the drum motor controller 27. The rotation phase of the rotary drum 25 is sent from the drum motor 28 to the drum motor controller 27. During the playback, the rotation phase information concerning the rotary drum 25 is sent from the drum motor controller 27 to the capstan motor controller 29.

The capstan motor controller 29 controls the capstan motor according to the rotation phase information concerning the rotary drum 25, the recording mode, the tape travel speed information, the playback signal sent from the playback amplifier 60b, and the rotation information concerning the capstan motor (magnetic tape travel speed information) which is output from the capstan motor 30. In the phase control in the case of the standard recording mode according to the second embodiment, the tracking state at the ITI area is sampled by detecting the ITI area on the magnetic tape on the basis of the rotation phase information of the rotary drum output from the drum motor controller 27, to detect the tracking phase error. The capstan motor controller 29 controls the magnetic tape travel speed to match the above tape travel speed information, and detects and controls the controls the rotation phase of the rotary drum 25 in the manner described above. The rotation information concerning the capstan motor 30 is sent from the capstan motor 30 to the capstan motor controller 29.

Since the digital VTR in the second embodiment has the aforesaid configuration, signals of different data rates can be recorded according to the recording formats (track formats) predetermined for the respective data rates. As a result, input data received with different data rates can be recorded efficiently, and the special playback data rate for each fast playback speed can be set sufficiently high, resulting in an improved playback picture quality.

In the second embodiment, the special playback data recording areas are positioned along the scanning traces of the rotary heads 26 irrespective of the recording mode, so that the playback data rate for the special playback data is sufficiently high. Accordingly, in the the second embodiment, by positioning the fast playback data recording areas along the scanning traces of the rotary heads 26, the special playback data can be arranged with the highest efficiency, and the playback data rate for the fast playback can therefore be raised. The playback picture quality during the fast playback can therefore be improved.

Figures 49, 50:
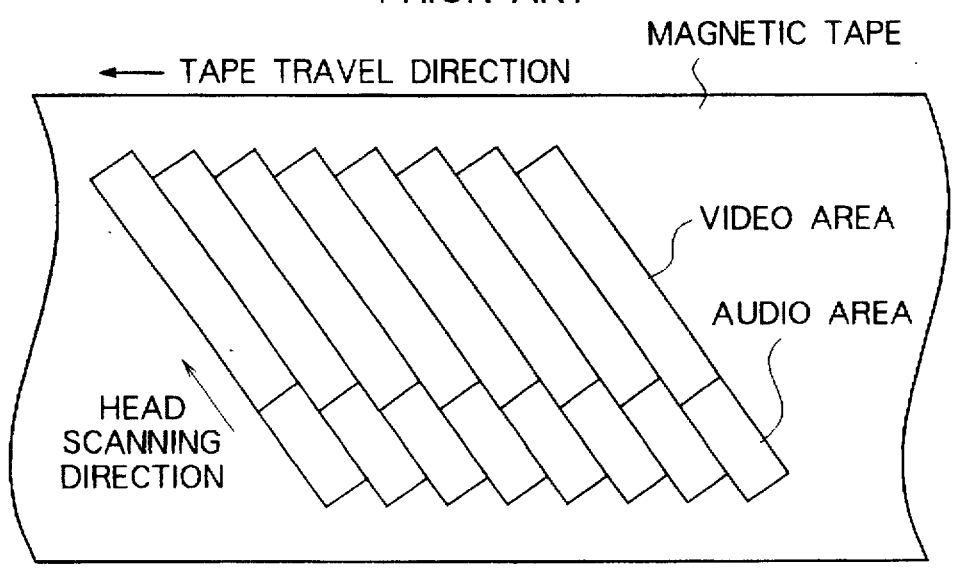
FIG. 49 shows the maximum speed multipliers for the case where the recording format suitable for each recording mode is provided and the playback rate at the maximum speed multiplier.
FIG. 50 shows a track pattern in a conventional consumer digital VTR.
Figure 51A:
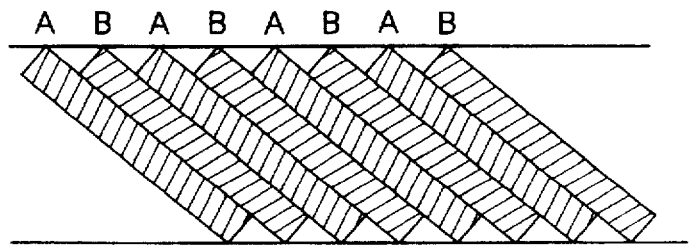
FIGS. 51A and 51B show the head scanning traces of the rotary head in normal playback and special playback in the conventional digital VTR.
Figure 51B:
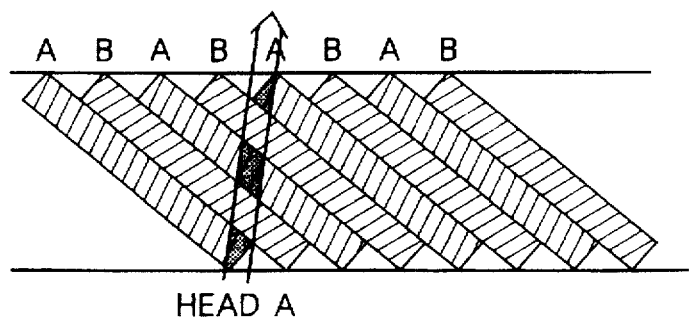

FIG. 49 shows the highest speed multiplier at which all the fast playback data can be reproduced during the playback and the playback rates (Mbps) at the highest speed multiplier, for the case where the suitable recording formats are used for the four respective recording modes, and no such different recording formats are used. The drawing shows the playback rates from the areas for the 18x speed in the case of the standard recording mode, the 36x speed in the case of the (½)x recording mode, the 54x speed in the case of the (⅓)x recording mode, and the 72x speed in the case of the (¼)x recording mode, where the playback signal is acquired from five areas during one tracing of a rotary head. The numerical value written in an upper line indicates the possible highest speed multiplier, and the numerical value written in a lower line indicates the playback rate during playback with the highest speed multiplier. When no separate recording formats are provided for the different recording modes, the recording format For the standard recording mode is used in any of the recording modes. By switching the format for each of the recording modes, the playback can be achieved without degrading the playback rate.

As will be understood from the above description, by selecting the recording format suitable for the transfer rate of the signal, it is possible to form a recording pattern with which all the fast playback data can be reproduced during one trace of the increasing the thought increasing the number of repetitions of the identical data, and lowering the set speed multiplier, and the recorded data can be reproduced at a fast playback speed without lowering the playback rate. Moreover, during fast playback, the rotary head scans the subcode area, so that it is possible to obtain additional function such as finding the start of item-of-music, using the signal recorded in the subcode area.

In the second embodiment, the special playback data is arranged along the scanning traces of the the rotary heads 26 during the fast playback for the respective recording modes, assuming that the data recording in the standard recording mode is reproduced at a 4x and 8x speeds, the data recorded in the (½)x recording mode is reproduced at a 8x and 36x speeds, the data recorded in the (⅓)x recording mode is reproduced at a 12x and 54x speeds, and the data recorded in the (¼)x recording mode is reproduced at a 16x and 72x speeds, respectively. However, the set speed multiplier is not limited to those described above.

In the second embodiment, the recording Formats shown in FIGS. 15, 37, 38, and 39 are employed. But the formats are not limited to these, and by altering the recording format of the special playback data according to the recording mode, as described above, in a digital signal recording device, playback device and recording/playback device (digital VTR, digital disk player and the like) having a recording format for recording the special playback data separated from the input data, in predefined areas on a recording medium, it is possible to efficiently record the special playback data for the fast playback, and the playback data rate of the special playback data during the fast playback can be improved and the playback quality during the fast playback can be improved.

The record data is not limited to the ATV signal or DVB signal. In the case of Japan where a video signal is compressed according to the MPEG2 recommendations, an ISDB signal or a signal compressed according to the MPEG1 recommendations may be employed, and yet similar effects are obtained.

When data transmitted in the form of transport packets represented by the MPEG2 recommendations is recorded in a digital VTR represented by the SD standards, in the second embodiment, two transport packets are transformed according to a five-sync block format. This should not be taken as a limitation, and, in general, n lines of sync block data may be generated using m transport packets (m and n are positive number).

In recording data of the sync block format obtained by the above transformation, on a recording medium, by structuring the recording format on the recording medium such that the n sync blocks of data is positioned on the same track, it is possible to transform the transport packet data into sync block format.

Since n sync blocks of data is completed within the same track, it is possible, at the time of transformation of the sync block format data into transport packet data, to easily separate the sets of the n sync block formats using the track information such as track identification signal and sync block number, and the size of the circuit of the playback system can be reduced.

Moreover, it is not necessary to record identification signals of n sync blocks. The data storage areas can be utilized effectively. The length of one sync block is not limited to the one shown in FIG. 11.

The positions of 4x speed playback data recording areas, 18x speed playback data recording areas, and error-correcting code recording areas, and the numbers of these areas are not limited to those described above.

The number of tracks forming a period is not limited to four. In the second embodiment, 4x and or 18x speeds are selected as the fast playback speeds for reproducing the data recorded in the standard recording mode. This however should not be taken as a limitation, and similar effects are obtained if the special playback data recording areas are positioned along the scanning traces of the rotary heads 26a and 26b, as described above, even if other speed multipliers are employed.

It is also possible to perform the higher-speed fast playback in the case of the standard recording mode by setting the speed at 8.5x speed in the case of the recording format adopted in the second embodiment, and by means of the speed control alone.

The fast playback speeds set for the respective recording modes are not limited to those adopted in the second embodiment. In the second embodiment, the scanning traces of the rotary heads 26a and 26a are substantially the same for the speed multipliers in the case of the standard recording mode, the set speed multipliers for the (½)x recording mode, (⅓)x speed recording mode, and (¼)x speed recording mode are respectively set at 2, 3 and 4. In any of the recording modes, one area is defined as a 4x speed data area (lower-speed fast playback area), and five areas are defined as 18x speed data areas (higher-speed fast playback areas). The numbers of areas are not limited to these values. Specifically, in contrast to the standard recording mode for which the fast playback speed is set at 4x or 18x speed, and one area (1 × 25 sync blocks) or five areas (5×5 sync blocks) are set for the respective cases, in the case of the (½)x speed recording mode, the fast playback speed may be set at 4x or 18x speed, and one area (1×25 sync blocks) or three areas (3×10 sync blocks) may be provided for the respective cases.

In the case of the (⅓)x speed recording mode, the fast playback speed may be set at 6x or 21x speed, one area (1×25 sync blocks) or two areas (1×13 sync blocks) may be provided for the respective cases.

In the case of the (¼)x sped recording mode, the fast playback speed may be set at 8x or 36x speed, and one area (1×25 sync blocks) or three areas (3×10 sync blocks) may be provided for the respective cases.

The number of the special playback data areas is not limited to those adopted in the second embodiment. Irrespective of the recording mode, it is sufficient if the special playback data be arranged along the scanning traces along which the rotary heads 26a and 26b also scan the subcode areas.

The size of the special playback data area is not limited to the one adopted in the second embodiment.

In the second embodiment, the 25 Mbps recording mode is regarded as the standard recording mode. This should not be taken as a limitation, and the 50 Mbps or 12.5 Mbps recording mode may be regarded as the standard recording mode, and yet if the same track format is used in common between different recording modes, and recording is made altering the number of repetitions of the special playback data for each recording mode, the special playback data can be recorded efficiently, and the playback quality of the fast playback image for each recording mode can be improved.

The above description of the second embodiment relates to the case of a digital VTR having four recording modes, namely, the standard recording mode, (½)x speed recording mode, (⅓)x speed recording mode and (¼)x speed recording mode, shown in FIG. 7. This however should not be taken as a limitation, and similar effects can be obtained with a digital VTR having two or three of the above recording modes. The recording modes are not limited to the four recording modes described above.

In a digital signal recording device having a plurality of recording modes including at least a standard recording mode and transparent-recording a intra-frame or -field, or inter-frame or -field coded digital video signal and received in the form of transport packets, and a digital audio signal, first, various header information is extracted from the input transport packets and the transmission rate of the input transport packets is identified. Based on the result of the transmission rate identification, a recording mode for the digital signal recording device is set. The intra-frame or -field coded digital video signal included in the input transport packets is extracted from the transport packets. The intra-frame or -field coded digital video signal that has been extracted is reconstructed and transformed into special playback data. Record data is structured by a record data format generating means, for recording the input transport packets and special playback data at predefined positions on tracks on the recording medium. When the record data to be recorded on a recording medium is generated at the record data format generating means, the number of repetitions of the special playback data to be recorded on the recording medium is varied depending on the recording mode. A recording medium travel speed control means for controlling the travel speed of tile recording medium controls the travel speed of the recording medium according to the recording mode, and also controls the record data format generating means so that record data sent from the record data format generating means is recorded intermittently in track units. The special playback data can therefore be recorded efficiently in any of the recording modes, the limited special playback data recording area can be used effectively, the playback data rate for the fast playback can be maximized, and the playback picture quality can be improved.

Moreover, the same track format is used in common for different recording modes. Controls performed by the recording system and and playback system can therefore be the same between the recording modes. It is therefore possible to substantially reduce the size of the circuitry.

When the recording format is generated, the special playback data recording areas are so positioned that special playback data will be arranged along the scanning traces scanned by the head at a predefined fast playback speed for the standard recording mode. The record data format generating means is so controlled that the special playback data generated by the special playback data generating means are recorded in the special playback data recording areas. Accordingly, the playback data rate during the fast playback in the case of the standard recording mode can be raised, and the playback picture quality in the fast playback can be improved. Particularly, in the standard recording mode with a high recording rate, the data amount of intra picture data per frame is expected to be larger than that for other recording mode. That is, it is necessary to set the playback data rate during fast playback in the case of the standard recording mode sufficiently high, as compared with other recording modes permitting another data rate for recording. Accordingly, in the case of the standard recording mode, the playback picture quality can be improved by positioning the fast playback data recording areas along the scanning traces of the head during the fast playback.

In a digital signal recording device having a a plurality of recording modes including at least a standard recording mode and transparent-recording a intra-frame or -field, or inter-frame or -field coded digital video signal and received in the form of transport packets, and a digital audio signal, or a recording medium, first, the transmission rate of the input transport packets is identified. Based on the result of the transmission rate identification, a recording mode for the digital signal recording device is set. The intra-frame or -field coded digital video signal included in the input transport packets is extracted from the transport packets. The intra-frame or -field coded digital video signal that has been extracted is reconstructed and transformed into special playback data. Record data is structured by a record data format generating means, for recording the input transport packets and special playback data at predefined positions on tracks on the recording medium. When the record data to be recorded on a recording medium is generated at the record data format generating means, the recording format of the special playback data to be recorded on the recording medium is varied depending on the recording mode. The special playback data can therefore be recorded efficiently in any of the recording modes, the limited special playback data recording area can be used effectively, the playback data rate for the fast playback can be maximized, and the playback picture quality can be improved.

By positioning the special playback data on the scanning traces scanned by the head at a predefined fast playback speed for each recording mode, the special playback data can be recorded efficiently for each recording mode, the limited special playback data areas can be utilized effectively, the playback data rate during fast playback can be maximized, and the playback picture quality can be improved.

By controlling the recording format generating means so that, when the recording format is generated, the special playback data is arranged along the scanning traces which the head scanning the subcode areas also scans, at a predefined fast playback speed for each recording mode, the rotary head scans the subcode areas during the fast playback, and it is possible to obtain additional function such as finding the start of an item-of-music, using the signal recorded in the subcode area.

At the time of generation by means of the special playback data generating means using the input intra image data, the special playback data is generated in the form of input transport packets. When the special playback data generated in the form of transport packets is recorded on the recording medium, it is transformed into sync block format, like the input data, before recording, so that no circuit for generating the transport packets is required in performing fast playback at the digital signal playback device, and the circuit for transforming the sync block formats into transport packets for use in normal playback can be used in common, and the size of the circuit in a playback-only device or the like can be reduced.

Where the data transmitted in the form of transport packets represented by the MPEG2 recommendations is recorded in a digital VTR represented by the SD standards, at the time of generating the sync block formats at the record data generating means, two input transport packets are used to produce five lines of sync blocks. The transport packets can be transformed efficiently to the sync block formats.

In a digital signal playback device reproducing a recording medium on which special playback data extracted from record data is recorded repeatedly in predetermined areas, and having a plurality of recording modes including a standard recording mode, the recording mode is detected from the playback signal during playback. Based on the result of the recording mode detection, the travel speed of the recording medium is controlled. When fast playback is performed using a record medium having been recorded at a travel speed 1/K times that of the standard recording mode, the travel speed of the record medium is so controlled that the drive speed of the recording medium is set at a about $\{\pm K*(N+\frac{1}{2})\}x$ speed (where N is a positive integer, and $2*K*(N+\frac{1}{2}) \leq M*K$ (M represents the number of repetitions of the special playback data) is satisfied). As a result, good fast playback can be realized using identical recording format for different recording modes. Since the same recording format is used, a signal processor in the playback system can be used in common between different recording modes, leading to a substantial reduction in the size of the circuitry. With regard to the record medium, only the travel speed control is performed, and phase control is not performed. Accordingly, the size of the circuit of the servo systems and the size of the circuit in the mechanical system can be reduced substantially.

In a digital signal playback device reproducing a recording medium on which special playback data extracted from record data is recorded in predetermined areas, and having a plurality of recording modes including a standard recording mode, the recording mode is detected from a playback signal during playback. Based on the result of the recording mode detection, the travel speed of recording medium is controlled. At this time, tracking is so controlled that the head scans a subcode area during fast playback at a predetermined speed for the recording mode, so that the rotary head scans the subcode area during fast playback, and it is therefore possible provide additional function such as finding the start of item-of-music, using the signal recorded in the subcode area.

What is claimed is:

1. A digital signal recording device for recording data on a recording medium, comprising:

transmission rate identifying means for receiving a data signal including a plurality of transport packets, and for identifying a transmission rate of the transport packets;

recording mode setting means for setting a recording mode based on the identified transmission rate, the recording mode being a rate at which to record data on the recording medium;

data extracting means for extracting intraframe or intrafield coded digital video data from the transport packets;

special playback data generating means for generating special playback data by reconstructing the extracted intra-frame or intra-field coded digital video data; and recording means for generating recording format such that the transport packets and the special playback data are recorded at predefined positions on tracks of the recording medium, for recording the transport packets and the special playback data according to the generated recording format, and for varying a number of repetitions of the special playback data based on the set recording mode.

2. The digital signal recording device according to claim 1, wherein the recording means generates the recording format such that the special playback data is positioned along scanning traces which a head scans at a fast playback speed for one of the plurality of recording modes.

3. The digital signal recording device according to claim 1, wherein the special playback data generating means generates the special playback data in the form of transport packets.

4. The digital signal recording device according to claim 1, wherein the special playback data generating mean generates the special playback data in the form of transport packets.

5. The digital signal recording device according to claim 1, wherein the recording means records the transport packets and the special playback data in the form of sync blocks.

6. The digital signal recording device according to claim 5, wherein the recording means converts two transport packets into five sync blocks.

7. The digital signal recording device according to claim 1, wherein the recording means generates a same recording format for each of the plurality of recording modes.

8. A digital signal recording device for recording data on a recording medium, comprising:

transmission rate identifying means for receiving a data signal including a plurality of transport packets, and for identifying a transmission rate of the transport packets;

recording mode setting means for setting a recording mode based on the identified transmission rate, the recording mode being a rate at which to record data on the recording medium;

data extracting means for extracting intraframe or intrafield coded digital video data from the transport packets;

special playback data generating means for generating special playback data by reconstructing the extracted intra-frame or intra-field coded digital video data ; and recording means for generating a recording format based on the set recording mode, and for recording the transport packets and the special playback data according to the generated recording format, the generated recording format being such that the transport packets and the special playback data are recorded at predefined positions on tracks of the recording medium.

9. The digital signal recording device according to claim 8, wherein the recording means generates the recording format such that the special playback data is positioned along scanning traces which a head scans at a fast playback speed for each one of the plurality of recording modes.

10. The digital signal recording device according to claim 9, wherein the recording means generates the recording format such that the special playback data is positioned along scanning traces which a head scanning a subcode area also scans at a fast playback speed for each one of the plurality of recording modes.

11. The digital signal recording device of claim 10, wherein the scanned subcode area stores data other than special playback data.

12. The digital signal recording device according to claim 8, wherein the recording means converts two transport packets into five sync blocks.

13. The digital signal recording device according to claim 8, wherein the recording means generates a same recording format for each of the plurality of recording modes.

14. The digital signal recording device according to claim 8, wherein the recording means generates a different recording format for each of the plurality of recording modes.

15. A digital signal playback device reproducing data from a recording medium comprising:

playback means for reproducing data from the recording medium to generate a playback signal, the data including special playback data recorded in predetermined areas repeatedly a plurality of times on tracks of the recording medium;

recording mode detecting means for detecting a recording mode from the playback signal, the recording mode being a rate at which the data was recorded on the recording medium; and recording medium travel speed control means for controlling a travel speed of the recording medium based on the detected recording mode such that when the recording medium has been recorded at a travel speed 1/K times the speed for a standard recording mode, during a fast playback, the recording medium travel speed control means sets a driving speed for the recording medium substantially at a $\{\pm K^*(N+\frac{1}{2})\}x$ speed where N denotes a positive integer and $2^*K^*(N+\frac{1}{2}) \leq M^*K$, where M denotes a number of repetitions of the special playback data corresponding to the fast playback.

16. A digital signal playback device reproducing data from a recording medium, comprising:

playback means for reproducing data from the recording medium to generate a playback signal, the data including special playback data recorded in predetermined areas repeatedly a plurality of times on tracks of the recording medium;

recording mode detecting means for detecting a recording mode from the playback signal, the recording mode being a rate at which the data was recorded on the recording medium;

recording medium travel speed control means for controlling a travel speed of the recording medium based on the detected recording mode; and tracking control means for controlling tracking such that a head scans a subcode area during fast playback at a predefined fast playback speed for the detected recording mode, the scanned subcode area storing data other than special playback data.

17. A method of recording digital data on a recording medium, comprising:

receiving a data signal including a plurality of transport packets;

identifying a transmission rate of the transport packets;

setting a recording mode based on the identified transmission rate, the recording mode being a rate at which to record data on the recording medium;

extracting intra-frame or intra-field coded digital video data from the transport packets;

generating special playback data by reconstructing the extracted intra-frame or intra-field coded digital video data;

generating a recording format such that the transport packets and the special playback data are recorded at predefined positions on tracks of the recording medium; and recording the transport packets and the special playback data according to the generated recording format such that a number of repetitions of the special playback data are varied based on the set recording mode.

18. A method of recording digital data on a recording medium, comprising:

receiving a data signal including a plurality of transport packets;

identifying a transmission rate of the transport packets;

setting a recording mode based on the identified transmission rate, the recording mode being a rate at which to record data on the recording medium;

extracting intra-frame or intra-field coded digital video data from the transport packets;

generating special playback data by reconstructing the extracted intra-frame or intra-field coded digital video data; generating a recording format based on the set recording mode; and recording the transport packets and the special playback data according to the generated recording format, the generated recording format being such that the transport packets and the special playback data are recorded at predefined positions on tracks of the recording medium.

19. A method of reproducing digital data from a recording medium, comprising:

reproducing data from the recording medium to generate a playback signal, the data including special playback data recorded in predetermined areas repeatedly a plurality of times on tracks of the recording medium;

detecting a recording mode from the playback signal, the recording mode being a rate at which the data was recorded on the recording medium; and controlling a travel speed of the recording medium based on the detected recording mode such that when the recording medium has been recorded at a travel speed $1/K$ times the speed for a standard recording mode, during a fast playback, a driving speed for the recording medium is set substantially at a $\{+K*(N+\frac{1}{2})\}x$ speed, where N denotes a positive integer and $2*K*(N+\frac{1}{2}) \leq M*K$, where M denotes a number of repetitions of the special playback data corresponding to the fast playback.

20. A method of reproducing digital data from a recording medium, comprising:

reproducing data from the recording medium to generate a playback signal, the data including special playback data recorded in predetermined areas repeatedly a plurality of times on tracks of the recording medium;

detecting a recording mode from the playback signal, the recording mode being a rate at which the data was recorded on the recording medium;

controlling a travel speed of the recording medium based on the detected recording mode; and controlling tracking such that a head scans a subcode area during fast playback at a predefined fast playback speed for the detected recording mode, the scanned subcode area storing data other than special playback data.

* * * * *